United States Patent
Wang et al.

(10) Patent No.: US 10,776,885 B2
(45) Date of Patent: Sep. 15, 2020

(54) MUTUALLY REINFORCING RANKING OF SOCIAL MEDIA ACCOUNTS AND CONTENTS

(71) Applicant: FUJITSU LIMITED, Kawasaki-shi, Kanagawa (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 417 days.

(21) Appl. No.: 15/653,356

(22) Filed: Jul. 18, 2017

(65) Prior Publication Data

US 2017/0316519 A1 Nov. 2, 2017

Related U.S. Application Data

(63) Continuation-in-part of application No. 15/424,730, filed on Feb. 3, 2017, which is a continuation-in-part
(Continued)

(51) Int. Cl.
*G06Q 50/00* (2012.01)
*H04L 29/08* (2006.01)
(Continued)

(52) U.S. Cl.
CPC ....... *G06Q 50/01* (2013.01); *G06F 16/24578* (2019.01); *G06F 16/9574* (2019.01);
(Continued)

(58) Field of Classification Search
CPC .............. G06Q 50/01; G06F 16/9574; G06F 16/24578; G06F 16/9535; G06N 20/00; H04L 67/306
See application file for complete search history.

(56) References Cited

U.S. PATENT DOCUMENTS

| | | | | |
|---|---|---|---|---|
| 8,312,056 B1* | 11/2012 | Peng | ...................... | G06Q 50/01 705/319 |
| 8,443,005 B1* | 5/2013 | Goldman | ............... | G06Q 50/01 707/798 |

(Continued)

OTHER PUBLICATIONS

Non-Final Office Action issued in corresponding U.S. Appl. No. 15/043,406, dated Jul. 19, 2018.
(Continued)

*Primary Examiner* — Kris E Mackes
*Assistant Examiner* — Tiffany Thuy Bui
(74) *Attorney, Agent, or Firm* — Maschoff Brennan

(57) ABSTRACT

A general type weight and an individual weight are determined for each of multiple social media accounts. The general type weight may be based on a social media account type corresponding to the social media account. The method may include encoding a mutually reinforcing relationship between the social media accounts and contents promoted by each of the social media accounts. The mutually reinforcing relationship may be encoded as a promotional link between the social media accounts and a content item of the contents promoted by each of the social media accounts. The method may include calculating a basic link strength for each promotional link, where the basic link strength is based on the general type weight and the individual weight for each social media account of multiple social media accounts, and calculating a mutually reinforcing ranking of the multiple social media accounts and contents based on the basic link strengths.

8 Claims, 27 Drawing Sheets

Related U.S. Application Data of application No. 15/422,383, filed on Feb. 1, 2017, now abandoned, which is a continuation-in-part of application No. 15/043,406, filed on Feb. 12, 2016, now abandoned.

(51) Int. Cl.
*G06N 20/00* (2019.01)
*G06F 16/957* (2019.01)
*G06F 16/2457* (2019.01)
*G06F 16/9535* (2019.01)

(52) U.S. Cl.
CPC ........... *G06N 20/00* (2019.01); *H04L 67/306* (2013.01); *G06F 16/9535* (2019.01)

(56) References Cited

U.S. PATENT DOCUMENTS

| | | | |
|---|---|---|---|
| 8,572,094 B2 * | 10/2013 | Luo | G06Q 10/10 707/748 |
| 8,682,723 B2 | 3/2014 | Parsons et al. | |
| 8,799,455 B1 * | 8/2014 | Vora | H04L 67/22 709/224 |
| 9,081,777 B1 | 7/2015 | Krawczyk | |
| 9,342,624 B1 | 5/2016 | Ojha et al. | |
| 9,384,258 B1 | 7/2016 | Lee-chan et al. | |
| 9,390,166 B2 | 7/2016 | Wang et al. | |
| 9,536,269 B2 | 1/2017 | Chang et al. | |
| 2008/0215607 A1 | 9/2008 | Kaushansky et al. | |
| 2010/0010993 A1 | 1/2010 | Hussey, Jr. et al. | |
| 2010/0161662 A1 * | 6/2010 | Jonas | G06Q 10/107 707/780 |
| 2011/0184886 A1 * | 7/2011 | Shoham | G06Q 30/02 705/400 |
| 2012/0005224 A1 | 1/2012 | Ahrens et al. | |
| 2012/0041907 A1 | 2/2012 | Wang et al. | |
| 2012/0076367 A1 | 3/2012 | Tseng | |
| 2012/0109939 A1 | 5/2012 | Kravets | |
| 2012/0110071 A1 | 5/2012 | Zhou et al. | |
| 2012/0117059 A1 | 5/2012 | Bailey et al. | |
| 2012/0166530 A1 | 6/2012 | Tseng | |
| 2012/0239763 A1 * | 9/2012 | Musil | G06Q 50/01 709/206 |
| 2013/0103758 A1 | 4/2013 | Allison et al. | |
| 2013/0297543 A1 * | 11/2013 | Treiser | G06Q 30/02 706/45 |
| 2013/0297619 A1 * | 11/2013 | Chandrasekaran | G06Q 10/10 707/748 |
| 2014/0089239 A1 | 3/2014 | Hu et al. | |
| 2014/0188891 A1 | 7/2014 | Nath et al. | |
| 2015/0081725 A1 | 3/2015 | Ogawa et al. | |
| 2015/0120717 A1 | 4/2015 | Kim et al. | |
| 2015/0220836 A1 * | 8/2015 | Wilson | G06Q 30/0631 706/46 |
| 2015/0310504 A1 | 10/2015 | Potter | |
| 2016/0019579 A1 | 1/2016 | Sims et al. | |
| 2016/0078471 A1 | 3/2016 | Hamedi | |
| 2016/0286244 A1 * | 9/2016 | Chang | H04N 21/21805 |
| 2016/0371276 A1 | 12/2016 | Furtado et al. | |
| 2017/0017971 A1 * | 1/2017 | Moreau | G06Q 30/0202 |
| 2017/0193075 A1 * | 7/2017 | Hegelich | H04L 51/16 |

OTHER PUBLICATIONS

Coleman, V.: Social Media as a Primary Source: A Coming of Age. EDUCAUSE Review 48(6), (2013).

U.S. Office Action in U.S. Appl. No. 15/424,730 dated Apr. 21, 2020.

U.S. Office Action dated Jan. 28, 2019 in U.S. Appl. No. 15/422,383.

* cited by examiner

US 10,776,885 B2

MUTUALLY REINFORCING RANKING OF SOCIAL MEDIA ACCOUNTS AND CONTENTS

CROSS-REFERENCE TO RELATED APPLICATIONS

This application is a continuation-in-part of U.S. patent application Ser. No. 15/424,730, filed Feb. 3, 2017, which is a continuation-in-part of U.S. patent application Ser. No. 15/422,383, filed Feb. 1, 2017, which is a continuation-in-part of U.S. patent application Ser. No. 15/043,406, filed Feb. 12, 2016. The foregoing applications are incorporated herein by reference in their entireties.

FIELD

The embodiments discussed herein are related to information identification and extraction.

BACKGROUND

With the advent of computer networks, such as the Internet, and the growth of technology more and more information is available to more and more people. For example, many leading researchers are sharing information and exchanging ideas timely using social media.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a computer implemented method of ranking social media accounts and contents based on a mutually reinforcing relationship between the social media accounts and contents. The method may include determining a general type weight for each social media account of multiple social media accounts. The general type weight may be based on a social media account type corresponding to the social media account. The method may further include determining an individual weight for each of the social media accounts of the multiple social media accounts. The method may also include encoding a mutually reinforcing relationship between each of the social media accounts of the multiple social media accounts and contents promoted by each of the social media accounts of the multiple social media accounts. The mutually reinforcing relationship may be encoded as a promotional link between each of the social media accounts of the multiple social media accounts and a content item of the contents promoted by each of the social media accounts of the multiple social media accounts. The method may further include calculating basic link strengths. A basic link strength may be calculated for each promotional link and the basic link strength may be based on the general type weight for each social media account of the multiple social media accounts and the individual weight for each of the social media accounts of the multiple social media accounts. The method may also include calculating a mutually reinforcing ranking of the multiple social media accounts and contents based on the basic link strengths.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
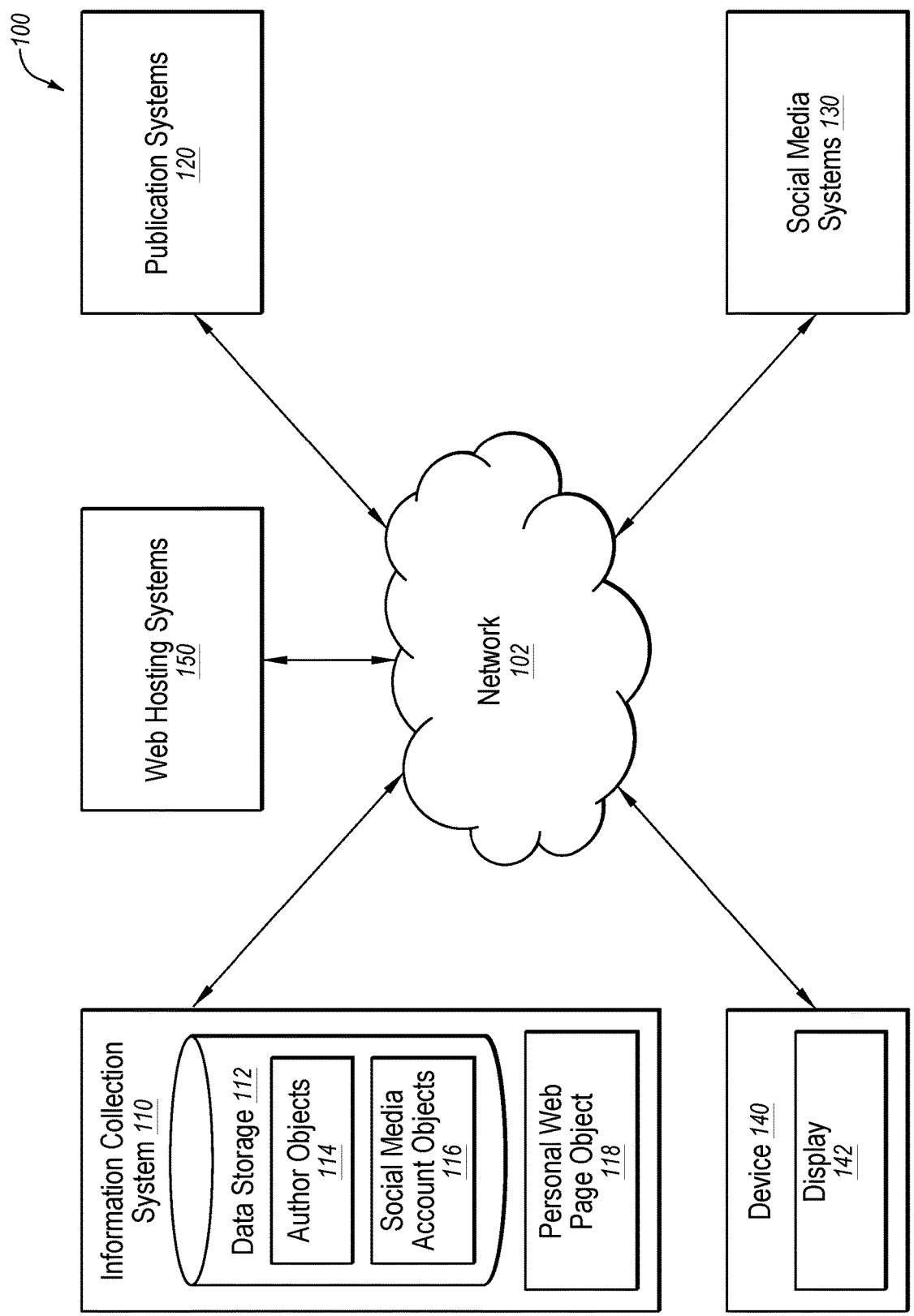
FIG. 1 is a diagram representing an example system configured to identify and extract information.

Some embodiments described herein relate to methods and systems of information identification and extraction. The current fast-pace of technology, research, and general knowledge creation has resulted in previous and current methods of knowledge dissemination not adequately providing up-to-date knowledge and information on recent developments. What is more, knowledge is no longer generated by a few select individuals in select regions. Rather, researchers, professors, experts, and others with knowledge of a given topic, referred to in this disclosure as knowledgeable people, are located around the world and are constantly generating and sharing new ideas.

As a result of the Internet, however, this vast wealth of newly created knowledge from around the world is being shared worldwide in a continuous manner. In some circumstances, this vast knowledge is being shared through social media. For example, knowledgeable people may share knowledge recently acquired through blogs, micro-blogs, and other social media.

Knowing that current information is being shared on social media does not result in the current information being readily accessible or that an individual could realistically access the information. In some fields, there may be thousands, tens of thousands, or hundreds of thousands of knowledgeable people. There is no database that includes the names of knowledgeable people from a specific field. However, even if a database included the names, the time spent for a person to determine if the knowledgeable people have social media accounts would be unreasonable for anyone to consider. Furthermore, even if a person could determine if a knowledgeable person had a social media account, the time to continually access and parse through the social media accounts to obtain the new knowledge shared therein would be unrealistic.

In short, due to the rise of computers and the Internet, mass amounts of information are available, but there is no realistic way for a person to reasonably access the information. Some embodiments described herein relate to methods and systems of information identification and extraction that may help people to access the information that was either previously unavailable or not reasonably obtainable by a human or even a group of humans without the aid of technology.

The methods and systems of information identification and extraction described in this disclosure include determining knowledgeable people by determining authors of publications and lectures. Metadata about the multiple authors is extracted from the publications and lectures. The author metadata is used to search social media accounts to determine the social media accounts of the authors. For example, in some embodiments, the author metadata may include information about the author's name, a profile of an author, and co-authors. The information from the social media accounts may be compared to the author metadata to match the authors to the social media accounts. In some embodiments, the systems and method in this disclosure may further consider the topic of information provided on the social media accounts. Thus, if an author has a social media account, but does not share knowledge related to the topic for which the author has published, the social media account may not be considered.

After identifying the social media accounts, information on the identified social media accounts may be collected, organized, and presented. For example, the information may be organized based on topics such that a person interested in a selected topic could be presented with the current knowledge from multiple different knowledgeable people with current updates. In this manner, new information from a number of sources that could not reasonably be identified or managed by a person may be accessed and shared. Thus, the system and methods in this disclosure provide a technical solution to a problem that arises from technology that could not reasonably be performed by a person.

Additionally, even if a social media account can be identified, automated systems or processes to identify a social media account associated with a knowledgeable person may be incorrect, or may be unable to decipher between multiple potential candidates of social media accounts. For example, over 70% of names have multiple Twitter accounts associated with that name. It may be very difficult for computing systems to automatically decipher which social media account is associated with a particular knowledgeable person. Also, many knowledgeable people have personal academic web pages. It may also be difficult to identify whether a website is a knowledgeable person's academic web page.

The present disclosure may relate to cross-validation of social media accounts and personal academic web pages of knowledgeable persons. For example, by using various aspects of a social media account and a personal academic web page, various consistent features or aspects between the two may confirm that both are associated with the same knowledgeable person. Consistent with the present disclosure, a set of candidate social media accounts and candidate personal academic web pages may be identified. Each of the candidates may be parsed or otherwise analyzed to identify various features or aspects of the social media account candidate and/or the personal academic web page candidate. Those various features and/or aspects may be cross-validated between the two to confirm that both the personal academic web page and the social media account are correctly associated with a particular author. According to the present disclosure, after the social media accounts have been cross-validated with the personal academic web pages, posts of the social media accounts may be organized based on topics such that a person interested in a selected topic could be presented with the current knowledge from multiple different knowledgeable people with current updates. In this manner, new information from a number of sources that could not reasonably be identified or managed by a person may be accessed and shared. Thus, the system and methods in this disclosure provide a technical solution to a problem that arises from technology that could not reasonably be performed by a person. Furthermore, it allows for the automated processing of a task that was not previously performed by a computer.

An additional difficulty in this space is identifying knowledgeable social media accounts on a given topic. Having individual people comb through the thousands or even millions of social media accounts to try and identify various accounts that are knowledgeable about a topic is unrealistic and virtually impossible to implement. Furthermore, any given topic may have a completely different set of knowledgeable people who would be able to even recognize knowledgeable social media posts. Similarly, a simple keyword search performed by a computer may pull in a vast number of false positives of accounts that simply mention a topic or may not actually be knowledgeable about the topic they are discussing. Furthermore, even more advanced computer-based analyses may not be as effective as relying on human judgment of a knowledgeable person as to whether another person may be considered knowledgeable on a given topic.

The present disclosure may relate to the use of social media accounts as sensors, such that human judgment may be indirectly used as a basis for determining whether or not a given social media account may be a knowledgeable account. In particular, people knowledgeable on a given topic are likely to know and recognize what other people are also knowledgeable on the same topic. Furthermore, people knowledgeable on a given topic are likely to seek information from others who are also knowledgeable on that topic, for example, by reading their publications and following their social media posts. For example, starting with one or more seed social media accounts, which are accounts known to be knowledgeable on a topic, a list of following and followed accounts may be compiled. Optionally, generic and/or non-person social media accounts may be removed from the lists. For those accounts followed by the seed account that are not already seed accounts themselves, an analysis may be performed on the account to determine whether it is a knowledgeable account. If it is a knowledgeable account (for example, if the account is associated with an author of an academic publication on the topic in question), the account may be added as a seed account. In this manner, the people actually knowledgeable about a topic are indirectly used (via the social media accounts they are following) to identify other accounts that are also knowledgeable. Furthermore, it does so in a manner that uses computers in a way that humans could not do. Thus, the system and methods in this disclosure provide a technical solution to a problem that arises from technology that could not reasonably be performed by a person. Furthermore, it allows for the automated processing of a task that was not previously performed by a computer through the implantation of a hybrid system that takes advantage of the judgment and knowledge of people.

As discussed above, researchers, scholars, professors, experts, and others with knowledge of a given topic are located around the world and are constantly generating and sharing new ideas. Many of these knowledgeable persons deem social media, such as twitter, to be an informative resource available for learning the latest domain-specific knowledge. Given the abundance of information and knowledge being shared through social media, it may be difficult for persons, such as learners of a specific domain, to identify various accounts that are knowledgeable about a topic.

The present disclosure may relate to mutually reinforcing ranking of social media accounts and social media contents based on social media account types. The premise is that, social media users with domain-specific expertise (e.g., knowledgeable in a given topic) are likely to promote quality content in that domain, and quality content in a domain is promoted by social media users with domain-specific expertise. In particular, if content (e.g., an article) is published or shared by more good social media accounts with domain-specific expertise, one may conclude that the content is good or quality content in that domain. Furthermore, if a social media account consistently publishes or shares good content (e.g., a good article) in a domain, one may conclude that the social media account is a good social media account with domain-specific expertise. Some embodiments of the present disclosure provide a mutually reinforcing ranking of the good or quality content in a domain and the good social media accounts with domain-specific expertise based on social media account types.

Embodiments of the present disclosure are explained with reference to the accompanying drawings.

FIG. 1 is a diagram representing an example system 100 configured to identify and extract information, arranged in accordance with at least one embodiment described in the present disclosure. The system 100 may include a network 102, an information collection system 110, publication systems 120, social media systems 130, a device 140, and web hosting systems 150.

The network 102 may be configured to communicatively couple the information collection system 110, the publication systems 120, the social media systems 130, the device 140, and the web hosting systems 150. In some embodiments, the network 102 may include any network or configuration of networks configured to send and receive communications between devices. In some embodiments, the network 102 may include a conventional type network, a wired or wireless network, and may have numerous different configurations. Furthermore, the network 102 may include a local area network (LAN), a wide area network (WAN) (e.g., the Internet), or other interconnected data paths across which multiple devices and/or entities may communicate. In some embodiments, the network 102 may include a peer-to-peer network. The network 102 may also be coupled to or may include portions of a telecommunications network for sending data in a variety of different communication protocols. In some embodiments, the network 102 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, and/or others. The network 102 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 102 may include one or more IEEE 802.11 wireless networks.

In some embodiments, any one of the information collection system 110, the publication systems 120, the social media systems 130, and the web hosting systems 150, may include any configuration of hardware, such as servers and databases that are networked together and configured to perform a task. For example, the information collection system 110, the publication systems 120, the social media systems 130, and the web hosting systems 150 may each include multiple computing systems, such as multiple servers, that are networked together and configured to perform and/or control performance of operations as described in this disclosure. In some embodiments, any one of the information collection system 110, the publication systems 120, the social media systems 130, and the web hosting systems 150 may include computer-readable-instructions that are configured to be executed by one or more devices to perform and/or control performance of operations described in the present disclosure.

The information collection system 110 may include a data storage 112. The data storage 112 may include a database in the information collection system 110 with a structure based on data objects. For example, the data storage 112 may include multiple data objects with different fields. In some embodiments, the data storage 112 may include author objects 114, social media account objects 116, and personal web page objects 118.

In general, the information collection system 110 may be configured to obtain author information of publications, such as articles, lectures, and other publications from the publication systems 120. Using the author information, the information collection system 110 may determine social media accounts associated with the authors and pull information from the social media accounts from the social media systems 130 and may determine personal academic web pages associated with the authors and pull information from the personal academic web pages from the web hosting systems 150. The information collection system 110 may organize and provide the information from the social media accounts and/or the personal academic web pages to the device 140 such that the information may be presented on a display 142 of the device 140.

The publication systems 120 may include multiple systems that host articles, publications, journals, lectures, and other digital documents. The multiple systems of the publication systems 120 may not be related other than they all host media that provides information. For example, one system of the publication systems 120 may include a university website that hosts lectures and papers of a professor at the university. Another of the publication systems 120 may include a website that hosts articles published in journals. In these and other embodiments, the publication systems 120 may or may not share a website, a server, a hosting domain, or an owner.

In some embodiments, the information collection system 110 may access one or more of the publication systems 120 to obtain digital documents from the publication systems 120. Using the digital documents, the information collection system 110 may obtain information about the authors of the digital documents and topics of the digital documents. In some embodiments, for each author of a digital document, the information collection system 110 may create an author object 114 in the data storage 112. In the created author object 114, the information collection system 110 may store information about the author obtained from the digital document. The information may include a name, profile, an image, co-authors of the digital document, an affiliation of the author (e.g., university with which the author is affiliated, or company at which the author is employed). The information collection system 110 may also determine topics of the digital document. The topics of the digital document may be stored in the author object 114.

In some embodiments, multiple digital documents from the publication systems 120 may include the same author. In these and other embodiments, the author object 114 for the author may be updated and/or supplemented with information from the other digital documents. For example, the topics from the other digital documents may be stored in the author object 114. In some embodiments, the topics of all of the digital documents of an author obtained by the information collection system 110 may be stored in the author object 114.

After creating the author objects 114, the information collection system 110 may be configured to determine social media accounts for each of the authors in the author objects 114. The information collection system 110 may determine social media accounts by accessing the social media systems 130. Additionally or alternatively, the information collection system 110 may be configured to determine a personal academic web page for each of the authors in the author objects 114. The information collection system 110 may determine social media accounts by accessing the web hosting systems 150. In these and other embodiments, the information system 110 may cross-validate a social media account and a personal academic web page of an author.

In some embodiments, each of the social media systems 130 may include a system configured to host a different social media. For example, one of the social media systems 130 may include a microblog social media system. Another of the social media systems 130 may include a blogging social media system. Another of the social media systems 130 may include a social network or other type of social media system. Another of the social media systems 130 may include a publication collection social media system.

The information collection system 110 may request each of the social media systems 130 to search its respective social media accounts for the names of each author in the author objects 114. For example, the information collection system 110 may include thousands, tens of thousands, or hundreds of thousands of author objects 114, where each of the author objects 114 includes the name of one author. In this example, there may be four social media systems 130 in which authors may share information. The number of social media systems 130 may be more or less than four. In these and other embodiments, the information collection system 110 may request a search be performed in each of the four social media systems 130 using the name of the author associated with each of the author objects 114. Thus, if there were four social media systems 130 and 100,000 authors, then the information collection system 110 may request 400,000 searches. The social media systems 130 may provide the results of the searches to the information collection system 110. In these and other embodiments, the results of the searches may include links and/or network addresses of social media accounts with an owner that has a name that at least partially matches the names of the authors of the author objects 114.

Using the links and/or network addresses of the social media accounts from the search, the information collection system 110 may request the social media accounts. The information collection system 110 may also create a social media account object 116 for each of the social media accounts. To create the social media account objects 116, the information collection system 110 may pull information from the social media accounts and store the information in the social media account objects 116. The social media account objects 116 may include information about the person associated with the social media account, such as a name, profile data, image, and/or social media contacts. The information collection system 110 may also obtain topics of posts in the social media accounts which may also be stored in the social media account objects 116.

In some embodiments, each of the web hosting systems 150 may include a system configured to host different web pages. For example, one of the web hosting systems 150 may include a university or college web hosting system including one or more web pages devoted to a faculty member or other person associated with the university or college. Another of the web hosting systems 150 may include a company's or private entity's web hosting system including one or more web pages devoted to a person employed by or otherwise associated with the company or private entity. Another of the web hosting systems 150 may include an individual person's web hosting system.

The information collection system 110 may request a general search engine to perform a search for web pages based on the names of each author in the author objects 114. Additionally or alternatively, the information collection system 110 may request a general search engine to perform a search for web pages based on the names of each author in the author objects 114 and an affiliation of the author. For example, the information collection system 110 may include thousands, tens of thousands, or hundreds of thousands of author objects 114, where each of the author objects 114 includes the name of one author and, optionally, an affiliation of the author. Thus, if there were 100,000 authors, then the information collection system 110 may request 200,000 searches (100,000 on the authors' names and 100,000 on the authors' names and affiliation). The web hosting systems 150 may provide the results of the searches to the information collection system 110. In these and other embodiments, the results of the searches may include links and/or uniform resource locators (URLs) of personal academic web page candidates.

Using the links and/or URLs of the personal academic web page candidates, the information collection system 110 may request the personal academic web page candidates. The information collection system 110 may also create a personal academic web page object 118 for each of the personal academic web page candidates. To create the personal academic web page objects 118, the information collection system 110 may pull information from the personal academic web page candidates and store the information in the personal academic web page objects 118. The personal academic web page objects 118 may include information about the person associated with the personal academic web page candidates, such as a name, publications, keywords, topics, affiliation, social, images, and/or others. In some embodiments, the personal academic web page candidates may be parsed or otherwise analyzed for various attributes, for example, as described in the method 900 of FIGS. 9a and 9b.

The information collection system 110 may compare the information from the author objects 114 with the information from the social media account objects 116 and/or the personal academic web page objects 118 to determine the social media accounts and/or the personal academic web pages associated with the authors in the author objects 114. For example, for a given author object 114, the search of the social media systems 130 may result in twenty-five accounts. The social media account objects 116 of the twenty-five accounts may be compared to the given author object 114 and the personal web page objects 118 to determine which of the twenty-five social media accounts and which of the personal web page candidates is associated with the author of the given author object 114. In some embodiments, an author may be associated with a social media account when the author is the owner of the social media account. In some embodiments, the social media account and the personal web page associated with the author of the author object 114 may be cross-validated to confirm that both the social media account and the personal web page may be associated with the author with a greater level of confidence. Various examples of such cross-validation are described in greater detail with respect to FIGS. 7 and 10-14.

After matching social media accounts with authors from the digital documents from the publication systems 120, including via cross-validation with a personal web page, the information collection system 110 may obtain information from the matching social media accounts. In these and other embodiments, the information collection system 110 may request the social media accounts and parse the social media accounts to obtain the information from the social media accounts. The information collection system 110 may collate the information from the social media accounts and organize the information based on topics to provide the information to users of the information collection system 110. For example, the information collection system 110 may provide the information to the device 140.

The device 140 may be associated with a user of the information collection system 110. In these and other embodiments, the device 140 may include any type of computing system. For example, the device 140 may include a desktop computer, a tablet computer, a mobile phone, a smart phone, or some other computing system. The device 140 may include an operating system that may support a web browser. Through the web browser, the device 140 may request webpages from the information collection system 110 that include information collected by the information collection system 110 from the social media accounts of the social media systems 130. The requested webpages may be displayed on the display 142 of the device 140 for presentation to a user of the device 140.

In some embodiments, the information collection system 110 may obtain information from social media accounts of a subset of the authors for a given topic, and present that information based on the subset of authors. In these and other embodiments, social media accounts may be used as sensors to identify what social media accounts may be included in that subset. For example, beginning with one or more seed social media accounts associated with people known to be knowledgeable persons on a given topic, a list of social media accounts followed by the knowledgeable persons may be obtained. From that list, social media accounts that are already seed accounts may be removed, as well as optionally removing generalist social media accounts. In these and other embodiments, the remaining social media accounts in the list may be analyzed to determine if they are knowledgeable social media accounts, and if they are, added as seed social media accounts. Such a process consistent with the present disclosure is described with additional detail in FIGS. 16a-18.

In these and other embodiments, another set of social media accounts may be generated that are learner accounts. For example, beginning with one or more seed social media accounts associated with people known to be knowledgeable persons on a given topic, a list of social media accounts following the knowledgeable persons may be obtained. From that list, social media accounts that are already seed accounts may be removed, as well as optionally removing generalist social media accounts. In these and other embodiments, the remaining social media accounts in the list may be analyzed to determine if they have interest in the topic, and if they are, added to the second list of social media accounts associated with those seeking to learn about the topic.

In some embodiments, first content may be delivered to the seed account social media accounts and second content may be delivered to the second list of social media accounts based on the respective group of which they are a part. For example, the seed social media accounts may be associated with knowledgeable persons such that scholarly publications or book chapters on the topic may be best suited for the seed social media accounts, while less rigorous materials may be better suited for the second set of leaning social media accounts, such as lecture notes or demonstrative videos.

In some embodiments, the information collection system 110 may determine a mutually reinforcing ranking of social media accounts and social media contents based on social media account types. The information collection system 110 may take as input extended seed social media accounts having domain-specific knowledge (e.g., knowledge in a given topic) including seed social media accounts associated with people known to be knowledgeable persons on a given topic and the social media accounts followed by the knowledgeable persons that are not already seed social media accounts. The social media accounts followed by the knowledgeable persons that are not already seed social media accounts may be associated with organizations, publications, vendors including software vendors, conferences, or the like. The information collection system 110 may determine the various types of social media accounts from the input extended seed social media accounts having domain-specific knowledge. For example, the information collection system 110 may utilize a machine learning tool, such as a decision tree, to determine the various types of social media accounts having domain-specific knowledge. The information collection system 110 may generate a mutually reinforcing ranking of the social media accounts having domain-specific knowledge and domain-specific content based on social media account type.

In some embodiments, the information collection system 110 may base the ranking on a mutually reinforcing relationship between the social media accounts and the social media contents promoted by the social media accounts. For example, an informative social media account may promote fresh and good content, and good content may be promoted by informative social media accounts. The information collection system 110 may determine or calculate link strengths between social media accounts and social media contents promoted by the social media accounts as a basis for the mutually reinforcing relationship. For example, for each social media account and social media content promoted by the social media account, the information collection system 110 may calculate a link strength (e.g., strength of the promotion), and may base the ranking on the link strength. In some embodiments, the information collection system 110 may utilize a machine learning tool, such as a decision tree, to determine the ranking of the social media accounts and the social media contents using the link strengths. In some embodiments, the information collection system 110 may consider promotions that include links, and not consider promotions that do not include links.

In some embodiments, the information collection system 110 may consider the timeliness of the promotion in determining the link strength. For example, a promotion that is earlier in time may be given a higher weight than a promotion that is later in time. That is, a link strength associated with an earlier promotion may be given higher weight as compared to a link strength associated with a later promotion. As another example, a promotion that is more recent in time may be given a higher weight than a promotion that is older in time. As still another example, a promotion of newer or more recent content may be given a higher weight than a promotion of older content.

In some embodiments, the information collection system 110 may consider the type of promotion in determining the link strength. For example, an initial or original promotion may be given a higher weight than a promotion that promotes an initial promotion. In some embodiments, some of the weight from a promotion that promotes an initial promotion may be given or transferred to the initial promotion.

Modifications, additions, or omissions may be made to the system 100 without departing from the scope of the present disclosure. For example, the system 100 may include multiple other devices that obtain information from the information collection system 110. Alternately or additionally, the system 100 may include one social media system.

Figure 2:
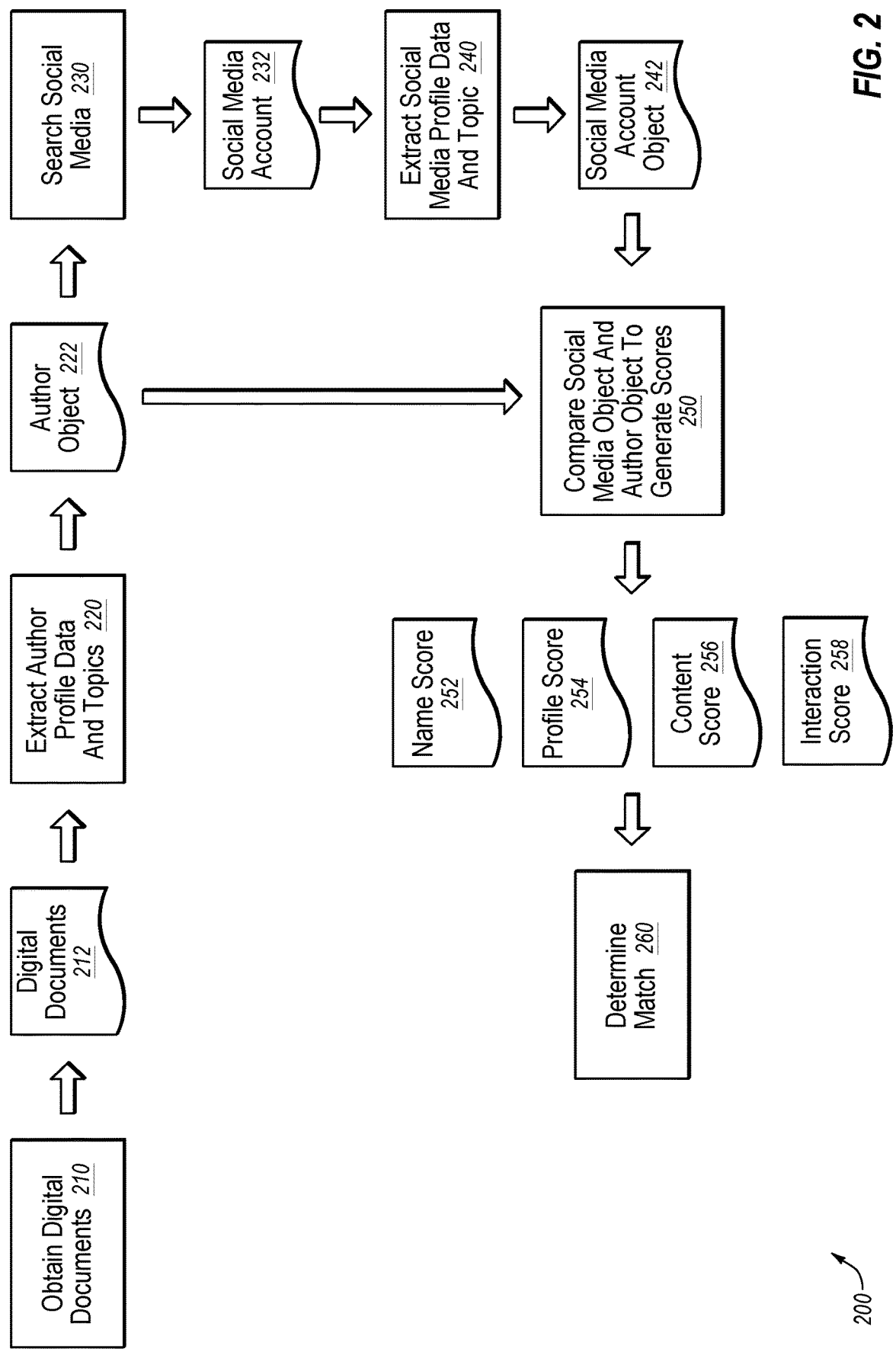
FIG. 2 is a diagram of an example flow that may be used with respect to information identification and extraction.

FIG. 2 is a diagram of an example flow 200 that may be used to identify and extract information, according to at least one embodiment described herein. In some embodiments, the flow 200 may be configured to identify and extract information from social media accounts. In particular, the flow 200 may be configured to determine if a social media account is associated with an author of a digital document. In these and other embodiments, a portion or all of the flow 200 may be an example of the operation of the system 100 of FIG. 1.

The flow 200 may begin at block 210, where digital documents 212 may be obtained. The digital documents 212 may be obtained from one or more sources, such as websites and other sources. The digital documents 212 may include a publication, lecture, article, or other document. In some embodiments, the digital documents 212 may include a recent document, such as a document released within a particular period, such as within the last week, month, or several months.

At block 220, author profile data and topics of all or some of the digital documents 212 may be extracted using methods such as topic model analysis. Author profile data about an author in one or more of the digital documents 212 may be extracted and stored in an author object 222. In some embodiments, the author profile data may include a full name of the author, an affiliation of the author, a title of the author, co-authors, a document image of the author, and an expertise or interest description of the author. The affiliation of the author may relate to a business, university, or other entity, with which the author affiliates. The title of the author may include a rank or position of the author. For example, the author may have the title of doctor, research manager, senior researcher, professor, lecturer and/or other title(s). To extract the author profile data, the digital documents 212 may be parsed and searched for keywords associated with the author profile data.

In some embodiments, a topic model analysis may be performed on the digital documents 212. In some embodiments, the topic model analysis may include a number of topics that may be determined and the digital documents 212 may be analyzed to determine which of the topics are in the digital documents 212. In these and other embodiments, the topic model analysis may output a word distribution from the digital documents 212 for each of the topics. Alternately or additionally, a topic distribution for each of the digital documents 212 may be determined. Thus, one or more topics for each of the digital documents 212 may be determined. Note that in some embodiments, one or more of the digital documents 212 may include multiple topics. In some embodiments, the topics for each of the digital documents 212 may be stored in the author object 222.

At block 230, social media may be searched for the author from the author object 222. In some embodiments, the social media may be searched using the full name of the author. The search for the author may identify a social media account 232 that may be owned, operated by, or associated with the author of the digital document 212.

At block 240, social media profile data may be extracted from the social media account 232. The social media profile data may be similar to the author data. For example, the social media profile data may include information about the person that owns, operates, or is associated with the social media account. The person that owns, operates, or is associated with the social media account may be referred to as a social media account owner. The social media profile data may include a name, affiliations, locations, titles, expertise, a social media image, interest description, and/or other information about the social media account owner. In some embodiments, the social media profile data may be collected by parsing and analyzing words from the social media account that is not a posting on the social media account, such as a biography, profile, or other information about the person that owns the social media account.

In some embodiments, a number of social media accounts connected to the social media account 232 may be determined. Alternately or additionally, the social media account owners of the social media accounts connected to the social media account 232 may be identified. In some embodiments, a number of social media accounts mentioned by the social media account 232 may be determined. Alternately or additionally, the social media account owners of the social media accounts mentioned by the social media account 232 may be identified. The information about the number of owners connected and/or mentioned in the social media account 232 may be part of social media interaction data.

In some embodiments, the expertise of the social media account owners for one or more of the social media accounts mentioned or connected to the social media account 232 may be determined. In these or other embodiments, the mentioned or connected social media accounts may be accessed. The expertise of the mentioned or connected social media accounts owners may be determined. In some embodiments, the expertise may be determined based on a description in a profile of the social media accounts owners. Alternately or additionally, the expertise may be determined based on the topics of the postings of the mentioned or connected social media accounts.

In some embodiments, topics of the postings on the social media account 232 may also be determined. To determine the topics of the postings, the postings shorter than a threshold number of words may be removed. The threshold number of words may depend on the form of the social media. For example, if the social media is a microblog, the threshold number may be smaller than the threshold number for a blog.

In addition to the postings on the social media account 232, content linked by the postings on the social media account 232 may be used to determine the topics or topic of the social media account 232. In these and other embodiments, the links within the postings of the social media account 232 may be accessed and the content collected. In particular, links within postings of social media accounts 232 that are micro blogs may be accessed and content collected. The collected content and the postings may be aggregated. A topic model analysis may be applied to determine topic distributions of the aggregated content. Using the topic model, topic distribution of the social media account 232 may be determined. In some embodiments, the authors of the content collected from the links in the postings of the social media account 232 may also be collected. The social media profile data, social media interaction data, and topics may be stored as the social media account object 242.

At block 250, the social media account object 242 associated with the social media account 232 that results from a search using the name of an author from the author object 222 is compared to the author object 222 to generate various scores. The scores include a name score 252, a profile score 254, a content score 256, and an interaction score 258.

The name score 252 may be determined based on comparison of the name from the author object 222 and the name from the social media account object 242. If the names fully match, the name score 252 may be a first value. If the names partially match, the name score 252 may be a second value, and if abbreviation of the names match, the name score 252 may be a third score. If there is not a match between the names, the name score 252 may be zero. The values for the first, second, and third scores may be determined based on ad-hoc heuristic rules or statistical machine learning.

The profile score 254 may be determined based on a comparison of one or more of the following from the author object 222 and the social media account object 242: title, affiliation, expertise description, image, and location. In these and other embodiments, the location of the author from the author object 222 and the location of the social media account owner from the social media account object 242 may be inferred from their respective affiliations. In these and other embodiments, the titles, the affiliations, the images, the expertise description, and the locations of the author and the social media account owner may be compared.

In some embodiments, the document image from the author object 222 may be analyzed using a facial recognition algorithm. For example, the document image from the author object 222 may be an image of the author. The social media image from the social media account object 242 may also be analyzed using a facial recognition algorithm. For example, the social media image from the social media account object 242 may be an image of the owner of the social media account 232. In some embodiments, the results from the analysis of the document image from the author object 222 may be compared with the results from the analysis of the social media image from the social media account object 242. The comparison may provide an indication of the likelihood that the images include the same person. The indication of the likelihood that the images include the same person may be used to generate the profile score 254.

In some embodiments, the title, the affiliations, the expertise description, the analysis of the document image, and the location from the author object 222 may be placed in an author profile vector. Similarly, the title, the affiliations, the expertise description, the analysis of the social media image, and the location from the social media account object 242 may be placed in a social media account profile vector. The author profile vector and the social media profile vector may be compared using vector space modeling. The result of the vector space modeling may be the profile score 254. In some embodiments, the profile score 254 may be based on another compilation of the comparisons between the title, affiliation, expertise, and location. For example, each comparison may be given the same or different weight and the scores of the comparison may be added together in a linear combination.

The content score 256 may be determined based on a comparison of the topic of the digital documents 212 associated with the author from the author object 222 and the main topic of the social media account from the social media account object 242. In some embodiments, the content score 256 may be increased when an author of the content that was linked in the postings matches the author and/or co-authors from the author object 222.

In some embodiments, to compare the topic of the digital documents 212 associated with the author and the main topic of the social media account from the social media account object, each of the digital documents 212 associated with the author may be presented in a bag-of-words vector. A centroid vector of digital documents 212 associated with the author may be determined using an average of the bag-of-words vectors for the digital documents 212. In some embodiments, each posting from the social media account 232 may also be presented as a bag-of-words vector. A centroid vector of all of the postings of the social media account 232 may be determined using an average of all the bag-of-words vectors for the postings. A vector space model may be used to calculate a similarity score S_bow, between the centroid vector of the postings of the social media account 232 and the centroid vector of the digital documents 212 of the author object 222.

In some embodiments, the topic distribution of all of the digital documents 232 of the author may be used to form an author topic vector. A topic distribution of all of the postings from a social media account 232 may be used to form a posting topic vector. A vector space model may be used to calculate a similarity score S_topic, between the author topic vector and the posting topic vector. A number of times when the author from the author object 212 is also the author of a document extracted from a link embedded in postings of the social media account may be a number N_author. In some embodiments, the content score may be represented by the following equation: a*S_bow+b*S_topic+c*log(N_author+1), where a, b, c are numbers and a+b+c=1.

The interaction score 258 may be determined based on a correlation between the co-authors of the digital document 212 and the social media account owners of the social media accounts connected and mentioned in the social media account 232. In these and other embodiments, a number of the social media account owners that are mentioned in the social media account 232 that are co-authors may be determined and be referred to as a mentioned account number. A number of the social media accounts owners that are connected to the social media account 232 that are co-authors may also be determined and be referred to as a connected account number. In some embodiments, the interaction score 258 may be a linear combination of the mentioned account number and the connected account number. In some embodiments, each of the mentioned account number and the connected account number may be weighted differently. The weights for the mentioned account number and the connected account number may be determined based on ad-hoc heuristic rules and statistical machine learning.

In some embodiments, the interaction score 258 may be determined based on the mentioned account number, the connected account number, and an average expertise score and/or content score of the other social media account owners of the connected and mentioned social accounts compared with the expertise of the author.

For example, in some embodiments, the number of connected social media accounts identified as co-authors may be represented as N_connected. A number of mentioned social media accounts identified as co-authors may be represented as N_mentioned. The average expertise score and/or content score between other connected social accounts and the author may be represented as S_average_connected. An average expertise score and/or content score between other mentioned social accounts and the author may be represented by S_average_mentioned.

In these and other embodiments, the interaction score 258 may be based on the following equation: P1*log(N_connected+1)+P2*log(N_mentioned+1)+P3*S_average_connected+P4*S_average_mentioned, where P1, P2, P3, and P4 are numbers and P1+P2+P3+P4=1.

At block 260, it may be determined if the social media account owner of the social media account 232 is the same as the author from the author object 222 using the name score 252, the profile score 254, the content score 256, and the interaction score 258. In some embodiments, the determination may be made based on a linear combination of the name score 252, the profile score 254, the content score 256, and the interaction score 258. For example, when the linear combination of the name score 252, the profile score 254, the content score 256, and the interaction score 258 is above a threshold, it may be determined that the social media account owner of the social media account 232 is the same as the author from the author object 222. In some embodiments, the threshold may be determined based on previous authentication of matches. For example, multiple iterations of the flow 200 may be determined for different authors and the matches determined outside of the flow 200. A threshold score with a particular confidence may be selected based on the multiple iterations.

In some embodiments, each of the name score 252, the profile score 254, the content score 256, and the interaction score 258 may be weighted differently. In these and other embodiments, the weights for the different scores may be determined using statistical machine learning or some other algorithm. For example, a machine learning algorithm may be trained based on predetermined matches and non-matches. After being trained, the machine learning algorithm may receive as an input each of the individual scores, may weight and linearly combine the scores, and may determine the likelihood that the social media account owner of the social media account 232 is the same as the author from the author object 222. In some embodiments, when the likelihood that the social media account owner of the social media account 232 is the same as the author from the author object 222 and is above a threshold, the machine learning algorithm may indicate that there is a match. In some embodiments, the threshold may be user selected or otherwise determined based on previous experience or iterations of the flow 200.

Modifications, additions, or omissions may be made to the flow 200 without departing from the scope of the present disclosure. For example, in some embodiments, the flow 200 may include multiple social media accounts 232. In these and other embodiments, a social media account object 242 may be created for each social media account 232 and the author object 222 may be compared to each social media account object 242 individually to determine a match. In some embodiments, if the author is determined to be the social media account owner of the single social media account 232, then no other social media account objects 242 may be created for the social media accounts 232 resulting from the search for the author.

In some embodiments, the social media account objects 242 for each of the different social media accounts 232 may be determined before comparisons to the author object 222. Alternately or additionally, the social media account object 242 of a single social media account 232 may be created and then compared to the author object 222 associated with the author that resulted in the single social media account 232, the scores generated, and a match determined before other social media account objects 242 are created.

In some embodiments, the digital documents 212 may include multiple authors. In these and other embodiments, author profile data about each of the authors may be collected and used to generate different author objects 222. A search for social media for each of the different author objects 222 may occur. In short, the flow 200 is merely one example of data flow for information identification and extraction and the present disclosure is not limited to such.

Figure 3A:
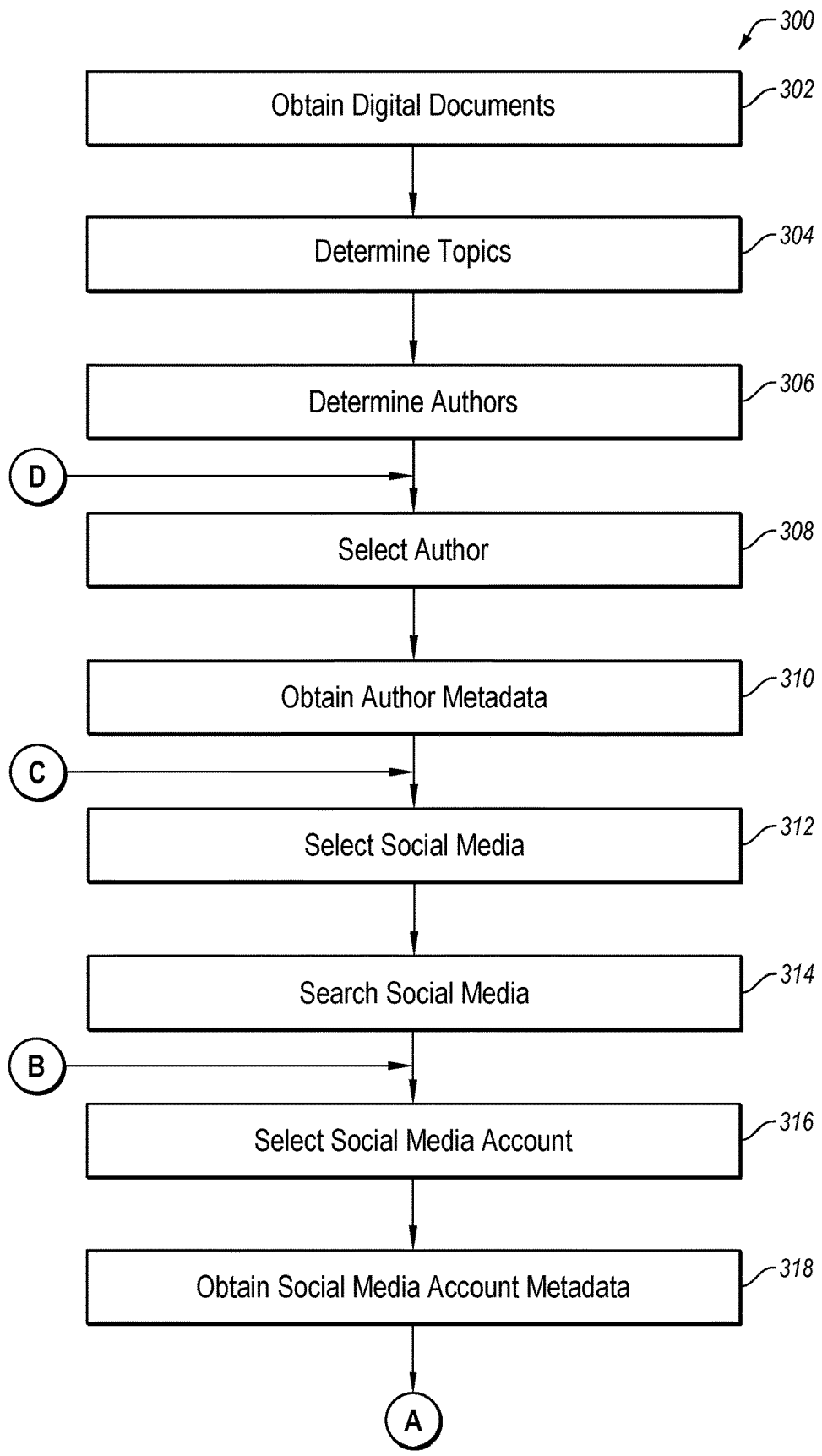
FIGS. 3a and 3b illustrate a flowchart of an example method of information identification and extraction.
Figure 3B:
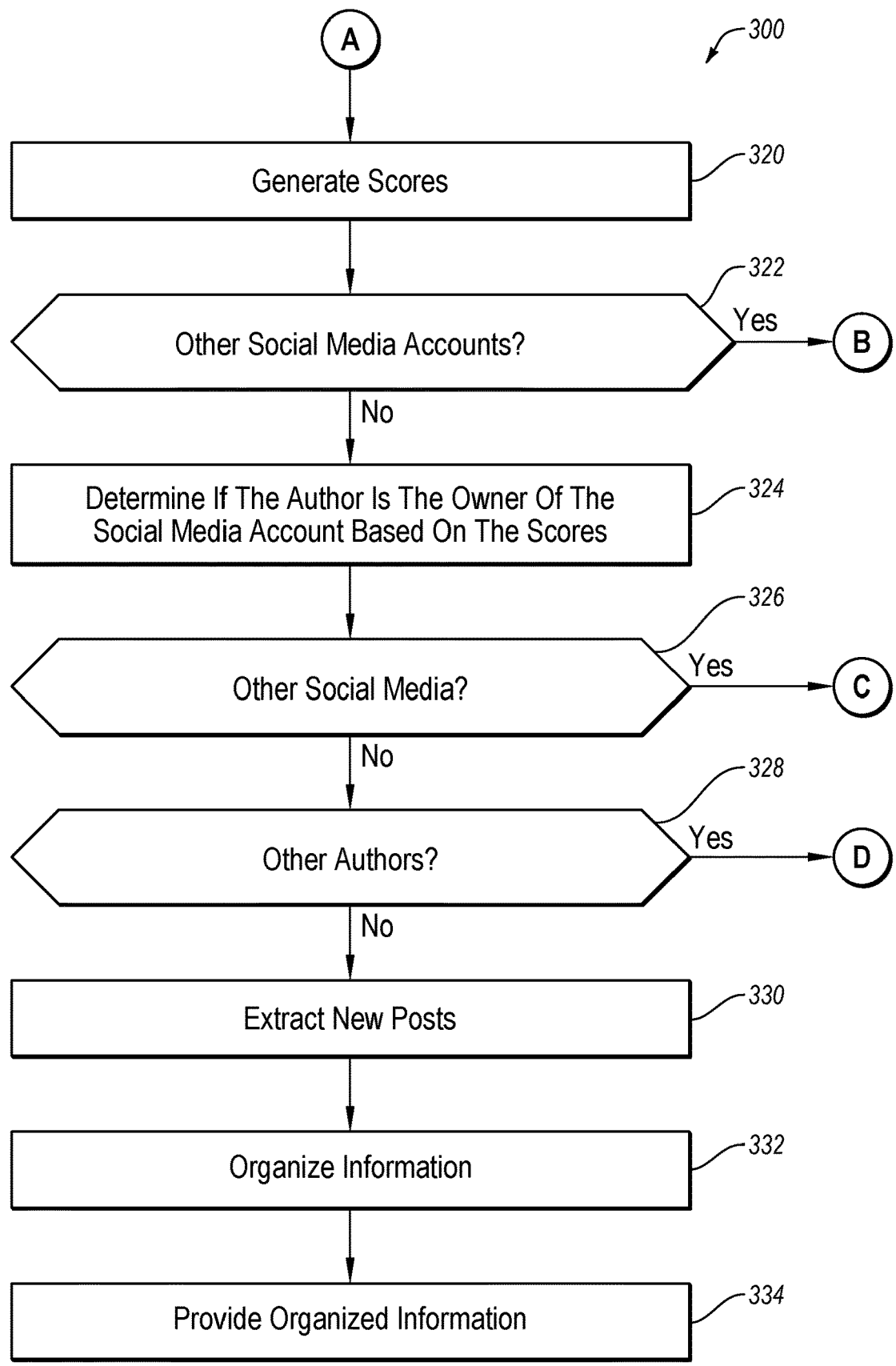

FIGS. 3a and 3b illustrate a flowchart of an example method 300 of information identification and extraction, according to at least one embodiment described herein. In some embodiments, one or more of the operations associated with the method 300 may be performed by the information collection system 110. Alternately or additionally, the method 300 may be performed by any suitable system, apparatus, or device. For example, a processor 2310 of a system 2300 of FIG. 23 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

The method 300 may begin at block 302 where multiple digital documents may be obtained from one or more sources using a processing system. The digital documents may be recent documents, such as documents released within a particular recent time period, such as within the last week, month, or several months. At block 304, topics of each of the digital documents may be determined using a topic model analysis.

At block 306, authors of the digital documents may be determined. In some embodiments, determining the authors may include extracting the names of the people indicated as authors in the digital documents. In these and other embodiments, the digital documents may be parsed and searched for words indicating that a name is an author of the digital document. In some embodiments, an author object may be obtained for each author from a database. In some embodiments, obtaining the author object may include creating the author object or searching and locating an existing author object in the database with the same name.

At block 308, an author may be selected. At block 310, metadata about the selected author may be obtained. In some embodiments, the metadata may be obtained from the digital documents that include the author. In some embodiments, the metadata may be author profile data and a topic of the digital documents that include the author. The metadata may be saved in an author object associated with the author.

At block 312, a social media may be selected. At block 314, the selected social media may be searched using the name of the selected author. The search may result in multiple social media accounts that may be associated with the author. At block 316, one of the social media accounts may be selected.

At block 318, social media account metadata of the selected social media account may be obtained. In some embodiments, the social media account metadata may be obtained from the selected social media account. In some embodiments, the social media account metadata may be social media account profile data and a topic or topics of the posts, linked documents, and other aspects of the selected social media account. The social media account metadata may be saved in an author object associated with the selected social media account.

At block 320, scores may be generated based on a comparison between the selected social media account and the selected author. In some embodiments, the scores may be generated based on a comparison of the social media account object and the author object. In some embodiments, the scores may include one or more of a name score, a profile score, a content score, and an interaction score.

At block 322, it may be determined if there are other social media accounts that resulted from the search of the social media at block 314 that have not been selected. When there are other non-selected social media accounts, the method 300 may proceed to block 316 where another of the non-selected social media accounts may be selected. When there are no other non-selected social media accounts, the method 300 may proceed to block 324.

At block 324, it may be determined if the selected author is a social media account owner of the selected social media accounts using the scores generated for each of the social media accounts at block 320. In some embodiments, it may be determined which of the social media account owners of the selected social media accounts is the selected author by comparing the scores generated for each of the social media accounts. In these and other embodiments, the social media account with the highest score may be determined to be the social media account of the selected author. Alternately or additionally, the social media accounts with scores higher than a selection threshold may be determined to be the social media accounts of the selected author. The selection threshold may be based on machine learning, previous experience, among other types of analysis. If the selected author is the social media account owner of one of the selected social media accounts, the selected author and the one of the selected social media accounts may be associated in the database that includes the author objects and the social media account objects.

At block 326, it may be determined if there are other social media that have not been selected at block 312. For example, the method 300 may be configured to match authors with social media accounts in multiple different social medias. When there are other non-selected social medias, the method 300 may proceed to block 312 where another of the non-selected social medias may be selected. When there are no other non-selected social medias, the method 300 may proceed to block 328.

At block 328, it may be determined if there are other authors from the digital documents that were determined at block 306 that have not been selected. When there are other non-selected authors, the method 300 may proceed to block 308 where another of the non-selected authors may be selected. When there are no other non-selected authors, the method 300 may proceed to block 330.

At block 330, new posts on the social media accounts that are associated with the authors in the database may be extracted. To extract the new posts, the database may include a network address for the social media accounts. A system may navigate to the social media accounts using the network address and extract the posts from a recent time period or if the social media accounts have had posts extracted before, from the last post extraction.

At block 332, the information extracted from the new posts may be organized. In some embodiments, the information may be organized based on the expertise of the authors associated with the social media accounts from which the information is extracted.

At block 334, the organized data may be provided according to the expertise of the authors associated with the social media accounts. In some embodiments, the information may be provided through a webpage.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
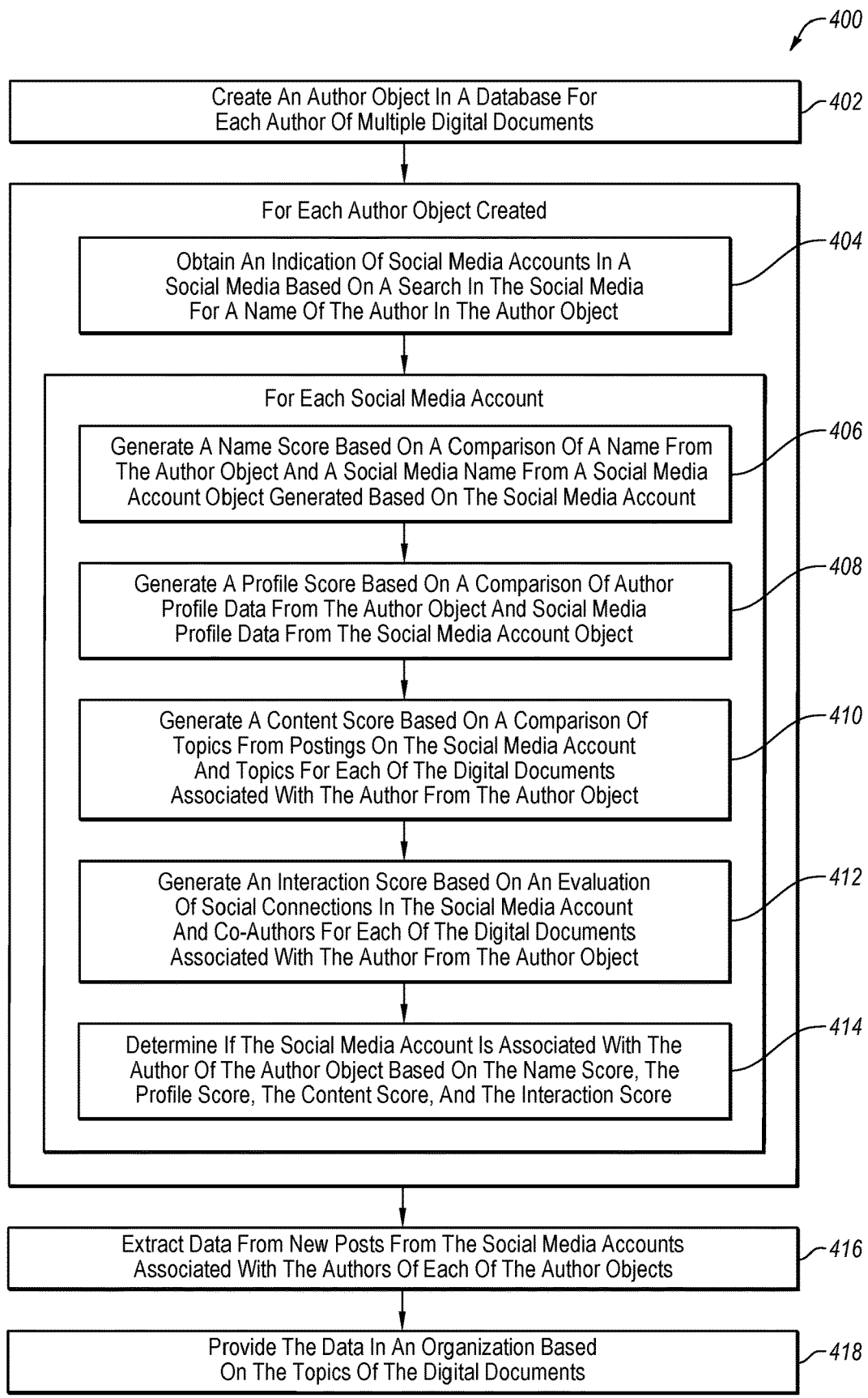
FIG. 4 illustrates a flowchart of another example method of information identification and extraction.

FIG. 4 is a flowchart of an example method 400 of information identification and extraction, according to at least one embodiment described herein. In some embodiments, one or more of the operations associated with the method 400 may be performed by the information collection system 110. Alternately or additionally, the method 400 may be performed by any suitable system, apparatus, or device. For example, the processor 2310 of the system 2300 of FIG. 23 may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

The method 400 may begin at block 402 where an author object may be created in a database for each author of multiple digital documents. The multiple digital documents may be obtained from one or more sources. In some embodiments, the author profile data may include one or more of a title of the author, an affiliation of the author, an expertise of the author, and a location of the author. In some embodiments, creating the author object may include extracting the name, the author profile data, and the co-authors from the digital documents.

At block 404, an indication of social media accounts in a social media may be obtained. The indication may be based on a search in the social media for a name of the author in the author object.

At block 406, a name score may be generated based on a comparison of a name from the author object and a social media name from a social media account object generated based on the social media account.

At block 408, a profile score may be generated based on a comparison of author profile data from the author object and social media profile data from the social media account object. In some embodiments, comparison of the author profile data and the social media profile data may include constructing an author vector using the author profile data, constructing a social media vector using the social media profile data, and calculating a similarity between the author vector and the social media vector, wherein the calculated similarity is the profile score.

At block 410, a content score may be generated based on a comparison of topics from postings on the social media account and topics for each of the digital documents associated with the author from the author object.

At block 412, an interaction score may be generated based on an evaluation of social connections in the social media account and co-authors for each of the digital documents associated with the author from the author object.

At block 414, it may be determined if the social media account is associated with the author of the author object based on the name score, the profile score, the content score, and the interaction score. In some embodiments, determining if the social media account is associated with the author of the author object based on the name score, the profile score, the content score, and the interaction score may include assigning each of the name score, the profile score, the content score, and the interaction score a weight. The determining may further include linearly combining the weighted name score, the weighted profile score, the weighted content score, and the weighted interaction score, and applying the linear combination to a machine learning algorithm to determine if the social media account is associated with the author of the author object.

At block 416, data may be extracted from new posts from the social media accounts associated with the authors of each of the author objects. At block 418, the data in an organization based on the topics of the digital documents may be provided.

For example, the method 400 may further include determining the topics from the postings on the social media account. In some embodiments, determining the topics may include removing the postings shorter than a threshold number of words and obtaining content from embedded links in the postings. Determining the topics may further include aggregating the content and determining topic distribution of the aggregating content.

In some embodiments, the method 400 may further include obtaining the multiple digital documents from one or more sources and determining topics of each of the digital documents using a topic model analysis.

Figure 5:
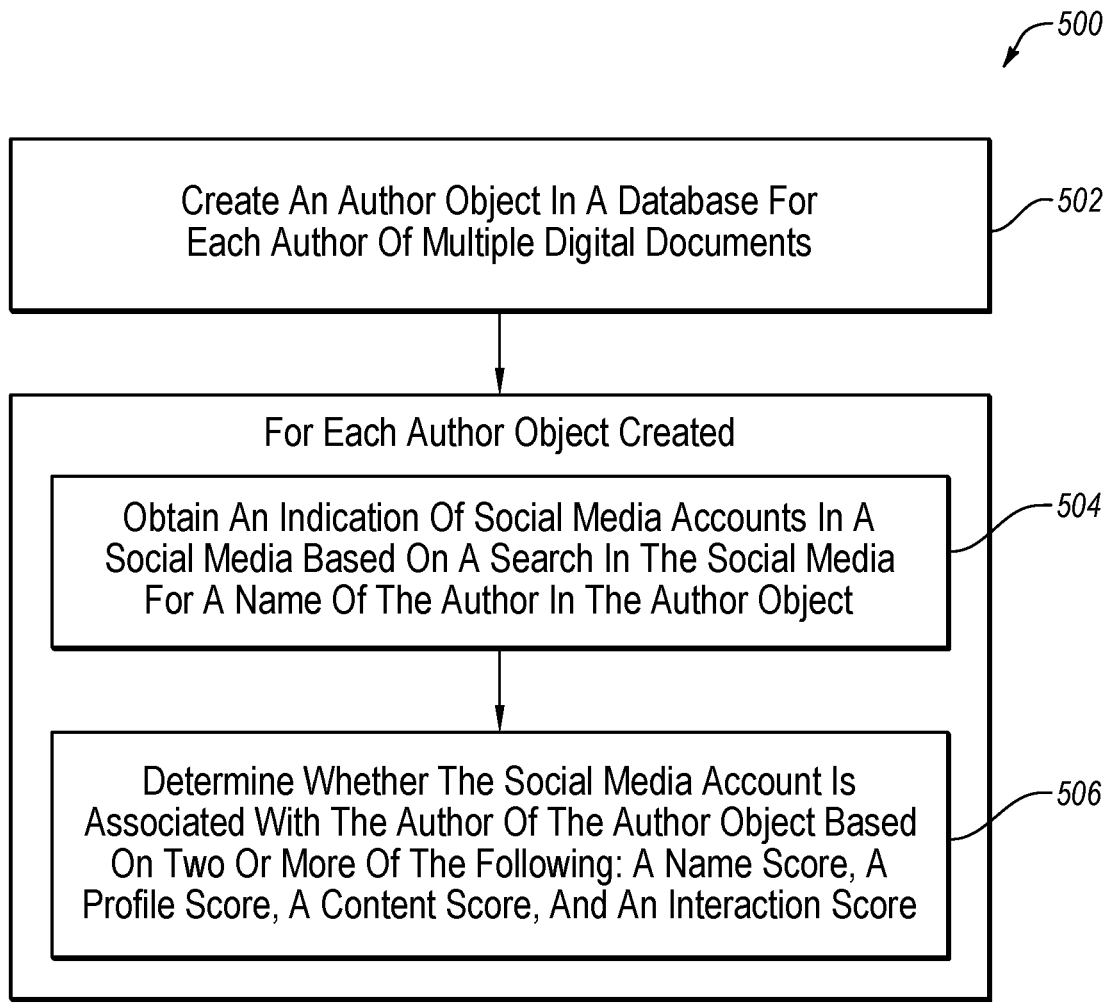
FIG. 5 illustrates a flowchart of another example method of information identification and extraction.

FIG. 5 is a flowchart of an example method 500 of information identification and extraction, according to at least one embodiment described herein. In some embodiments, one or more of the operations associated with the method 500 may be performed by the information collection system 110. Alternately or additionally, the method 500 may be performed by any suitable system, apparatus, or device. For example, the processor 2310 of the system 2300 of FIG. 23 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

The method 500 may begin at block 502 where an author object may be created in a database for each author of multiple digital documents. The multiple digital documents may be obtained from one or more sources. In some embodiments, the author profile data may include one or more of a title of the author, an affiliation of the author, an expertise description of the author, and a location of the author. In some embodiments, creating the author object may include extracting the name, the author profile data, and the co-authors from the digital documents.

At block 504, an indication may be obtained of social media accounts in a social media based on a search in the social media for a name of the author in the author object.

At block 506, it may be determined whether the social media account is associated with the author of the author object based on two or more of the following: a name score, a profile score, a content score, and an interaction score.

In some embodiments, determining if the social media account is associated with the author of the author object based on the name score, the profile score, the content score, and the interaction score includes assigning each of the name score, the profile score, the content score, and the interaction score a weight and linearly combining the weighted name score, the weighted profile score, the weighted content score, and the weighted interaction score. Determining may also include applying the linear combination to a machine learning algorithm to determine if the social media account is associated with the author of the author object.

In some embodiments, the name score may be generated based on a comparison of a name from the author object and a social media name from a social media account object generated based on the social media account.

In some embodiments, the profile score may be generated based on a comparison of author profile data from the author object and social media profile data from the social media account object. In some embodiments, comparison of the author profile data and the social media profile data may include constructing an author vector using the author profile data, constructing a social media vector using the social media profile data, and calculating a similarity between the author vector and the social media vector. In some embodiments, the calculated similarity may be the profile score.

In some embodiments, the content score may be generated based on a comparison of topics from postings on the social media account and topics for each of the digital documents associated with the author from the author object.

In some embodiments, the interaction score may be generated based on an evaluation of social connections in the social media account and co-authors for each of the digital documents associated with the author from the author object.

For example, the method 500 may further include determining the topics from the postings on the social media account. In some embodiments, determining the topics includes removing the postings shorter than a threshold number of words, obtaining content from embedded links in the postings, aggregating the content, and determining topic distribution of the aggregating content.

Cross-Validation of Social Media Accounts and Personal Academic Web Pages

In one or more embodiments, the present disclosure may include the cross-validation of a social media account with a personal academic web page. For example, in determining whether a social media account of multiple candidate social media accounts actually belongs to a person, the personal academic web page of the person and the social media account of the person may include common information or other aspects that may cross-validate the two such that both may be confirmed as properly being associated with the person. An example implementation of the use of such cross-validation is described with further detail in FIGS. 6-15.

Figure 6:
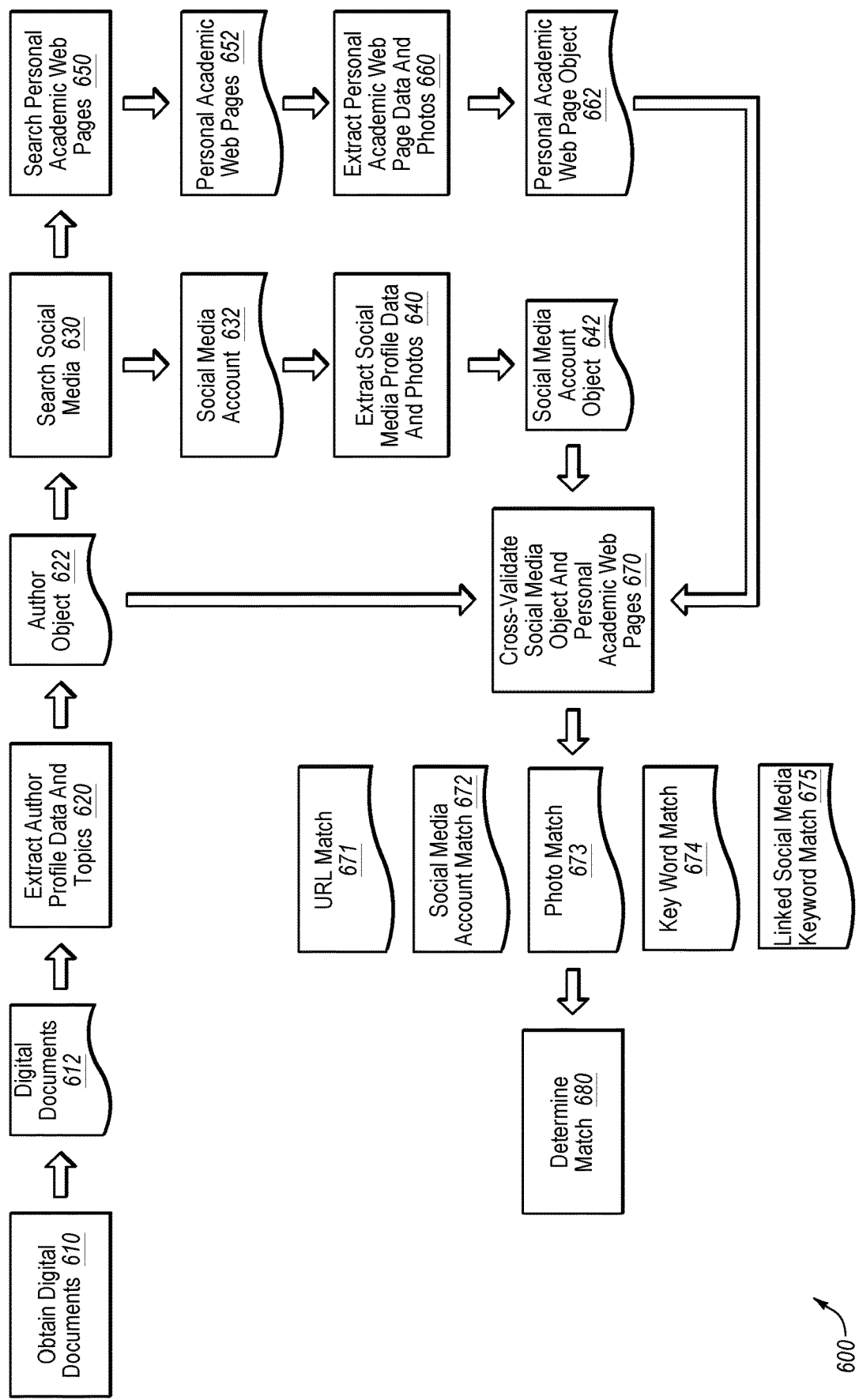
FIG. 6 illustrates a diagram of another example flow that may be used with respect to information identification and extraction.

FIG. 6 illustrates a diagram of an example flow 600 that may be used with respect to information identification and extraction, in accordance with one or more embodiments of the present disclosure. In some embodiments, the flow 600 may be configured to identify and extract information from social media accounts. In particular, the flow 600 may be configured to determine if a social media account and/or a personal academic web page is associated with an author of a digital document. In these and other embodiments, a portion of the flow 600 may be an example of the operation of the system 100 of FIG. 1.

The flow 600 may include the blocks 610, 612, 620, 622, 630, and 632 which may be similar or comparable to the blocks 210, 212, 220, 222, 230, and 232 respectively, of FIG. 2. All description of the corresponding blocks with reference to FIG. 2 are equally applicable to the blocks of FIG. 6.

With reference to block 640, social media profile data may be extracted from the social media account 632. The social media profile data may be similar to the author data. For example, the social media profile data may include information about the person that owns, operates, or is associated with the social media account. The person that owns, operates, or is associated with the social media account may be referred to as a social media account owner. The social profile data may include a name, affiliations, locations, titles, expertise, a social media image, personal web page URL, or interest description, and other information about the social media account owner. In some embodiments, the social profile data may be collected by parsing and analyzing words from the social media account that is not a posting on the social media account, such as a biography, profile, or other information about the person that owns the social media account.

In some embodiments, a number of social media accounts connected to the social media account 632 may be determined. Alternately or additionally, the social media account owners of the social media accounts connected to the social media account 632 may be identified. In some embodiments, a number of social media accounts obtaining information from the social media account 632 may be determined. Alternately or additionally, the social media account owners of the social media accounts followed by the social media account 632 may be identified. In some embodiments, a first social media account that obtains information from a second social media account may be referred to as the first social media account following the second social media account, and the second social media account being followed by the first social media account.

In some embodiments, the expertise of the social media account owners for one or more of the social media accounts mentioned or connected to the social media account 632 may be determined. In these or other embodiments, the connected social media accounts may be accessed. The expertise of the connected social media accounts owners may be determined. In some embodiments, the expertise may be determined based on a description in a profile of the social media accounts owners. Alternately or additionally, the expertise may be determined based on the topics of the postings of the connected social media accounts.

In some embodiments, topics of the postings on the social media account 632 may also be determined. To determine the topics of the postings, the postings shorter than a threshold number of words may be removed. The threshold number of words may depend on the form of the social media. For example, if the social media is a microblog, the threshold number may be smaller than the threshold number for a blog.

In addition to the postings on the social media account 632, content linked by the postings on the social media account 632 may be used to determine the topics or topic of the social media account 632. In these and other embodiments, the links within the postings of the social media account 632 may be accessed and the content collected. In particular, links within postings of social media accounts 632 that are micro blogs may be accessed and content collected. The collected content and the postings may be aggregated. A topic model analysis may be applied to determine topic distributions of the aggregated content. Using the topic model, topic distribution of the social media account 632 may be determined. In some embodiments, the authors of the content collected from the links in the postings of the social media account 632 may also be collected. The social media profile data, social media interaction data, and topics may be stored as the social media account object 642.

At block 650, a search may be performed for personal academic web pages 652 that may be candidates as personal academic web pages of the authors. For example, a general search engine may be requested to perform a search for web pages based on the names of each author in the author objects 622. Additionally or alternatively, a general search engine may be requested to perform a search for web pages based on the names of each author in the author objects 622 and an affiliation of the author in the author objects 622. For example, if in parsing the digital documents 612, an author name of Andrew Ng is found with an affiliation with Stanford University, a search may be run on the name Andrew Ng and a search may be run on the combined terms of "Andrew Ng" and "Stanford University." The results of the two searches may be merged by combining the two lists and removing any duplicates to generate a list of potential personal academic web pages 652. In some embodiments, a limited number of top results may be included as candidates, such as the top ten results from each search, and the lists may then be merged.

In some embodiments, after merging the results, one or more specific social media or other profile-based pages may be identified. For example, based on a template for a Google scholar page, a LinkedIn page, a ResearchGate page, and/or others, the social media or other profile-based pages may be identified. Such identified pages may be removed from the list of potential candidates. Additionally or alternatively, such pages may be used as a social media account in cross-validation, or may be used as a potential candidate for a personal academic web page. In some embodiments, the merged search results of web pages may be analyzed to identify what results are personal academic web pages 652. For example, the content of a particular webpage may be parsed and analyzed to classify the page and determine whether it is a personal academic web page 652 or not. An example method 900 describing such an analysis is described with reference to FIGS. 9a and 9b.

With reference to block 660, the candidate sites identified as personal academic web pages 652 in block 650 may be used to extract information to generate personal academic web page objects 662. For example, various features or aspects of the personal academic web pages 652 may be parsed and added as data in the personal academic web page objects 662. In some embodiments, some of the data in the personal academic web page objects 662 may be similar or comparable to that of the author objects 622. For example, the personal academic web page data may include information about the person that owns, operates, or is associated with the web page. The personal academic web page data may additionally include a name, affiliations, locations, titles, expertise, a photographic image of the author, publications, curriculum vitae, classes taught or lectures given, interest description, social media accounts, contact information, URL, and/or other information about the person associated with the personal academic web page.

At block 670, the social media account object 642 associated with the social media account 632 that results from a search using the name of an author from the author object 622 may be cross-validated with one or more of the personal academic web page objects 662 associated with the personal academic web pages 652 using one or more cross-validation techniques. For example, the social media account object 642 and a given web page object 662 may be cross-validated using a URL match 671 (an example method of which is described with reference to FIG. 10), a social media account match 672 (an example method of which is described with reference to FIG. 11), a photo match 673 (an example method of which is described with reference to FIG. 12), a keyword match 674 (an example method of which is described with reference to FIG. 13), and/or a linked social media keyword match 675 (an example method of which is described with reference to FIG. 14). In some embodiments, these different cross-validating techniques may be used in a successive order until a cross-validation has occurred, for example, a URL match 671, a social media account match 672, a photo match 673, a keyword match 674, and a linked social media keyword match 675. In these and other embodiments, a single cross-validation technique may be used, or all cross-validation techniques may be used in confirming that a personal academic web page object 662 and the social media account object 242 are correctly associated with a given author object 222. Alternatively or additionally, two or more of the cross-validating techniques may be used in parallel.

With reference to block 680, based on the cross-validation of the block 670, a match may be determined between the author object 622, a given social media account object 642, and a given personal academic web page object 662. The match of block 680 may indicate that the given social media account object 642 and the given personal academic web page object 662 are correctly associated with the author object 622. For example, if one or more of the cross-validation techniques confirms the author is the same person who owns the social media account and the personal academic web page, a match may be found. In some embodiments, whether a match exists may be determined based on previous cross-validation of matches. For example, multiple iterations of the flow 600 may be determined for different authors and the matches determined outside of the flow 600. In some embodiments, if none of the cross-validation techniques identifies a social media account and a personal academic web page associated with the author, the social media account only may be compared to the author object, for example, as described with respect to the flow 200 of FIG. 2.

Modifications, additions, or omissions may be made to the flow 600 without departing from the scope of the present disclosure. For example, in some embodiments, the flow 600 may include multiple social media accounts 632 and/or multiple personal academic web page objects 662. In these and other embodiments, a social media account object 642 may be created for each social media account 632 and a personal academic web page object 662 may be created for each personal academic web page 652 and various combinations may be cross-validated individually to determine a match. For example, a single social media account object 642 may be cross-validated with the personal academic web page objects 662 until a match is found, and then a next social media account object 642 may be cross-validated with the personal academic web page objects 662, or vice versa (e.g., a personal academic web page object 662 cross-validated with the social media account objects 642).

In some embodiments, the social media account objects 642 for each of the different social media accounts 632 and/or the personal academic web page objects 662 for each of the different personal academic web pages 652 may be determined before cross-validation. Alternately or additionally, the social media account object 642 of a single social media account 632 and/or a single personal academic web page objects 662 may be created and then cross-validated before other social media account objects 642 and/or personal academic web page objects 662 are created.

In some embodiments, the digital documents 612 may include multiple authors. In these and other embodiments, author profile data about each of the authors may be collected and used to generate different author objects 622. A search for social media for each of the different author objects 622 may occur. In short, the flow 600 is merely one example of data flow for information identification and extraction and the present disclosure is not limited to such.

Figure 7:
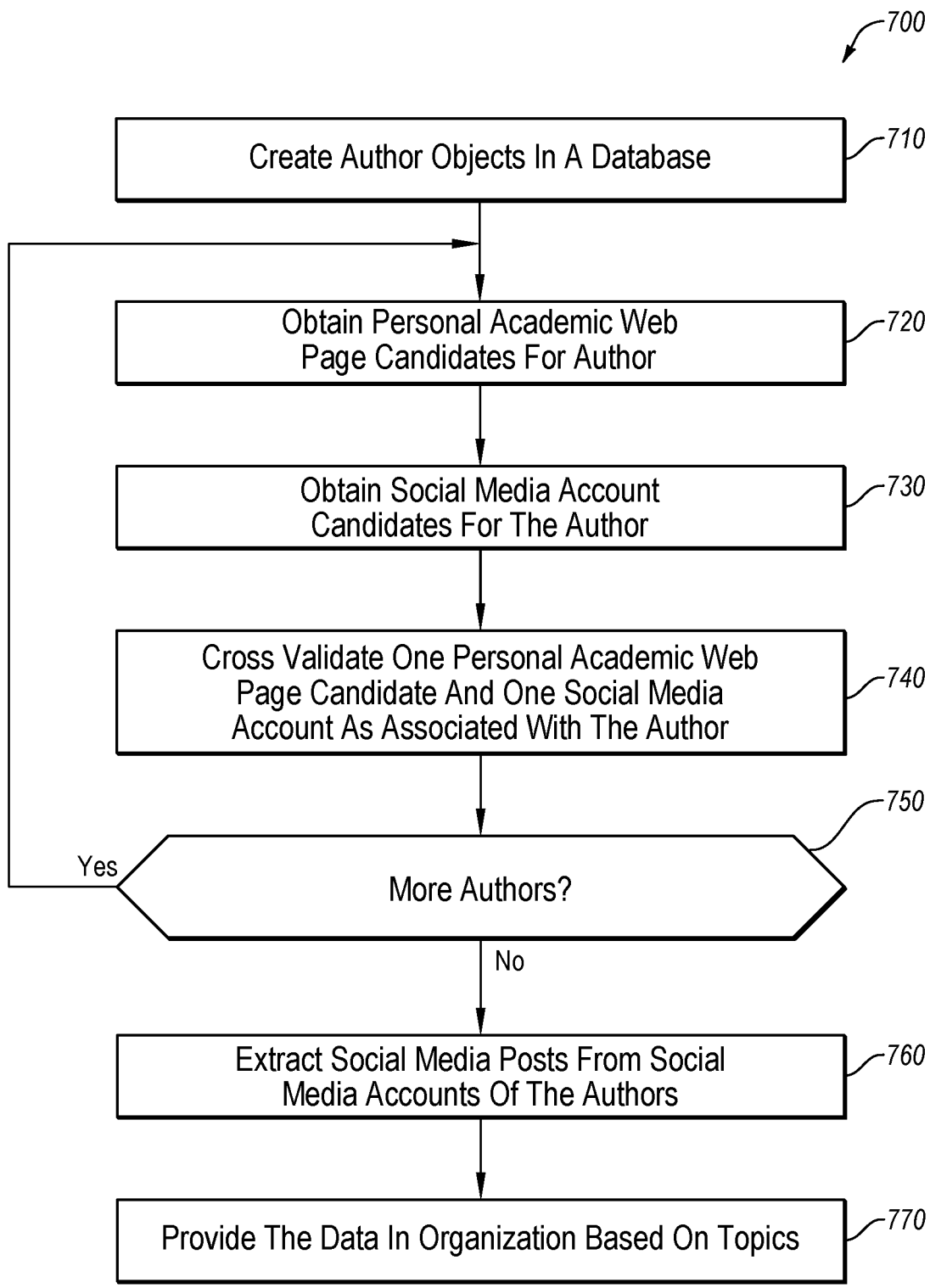
FIG. 7 illustrates a flowchart of an example method of information identification and extraction.

FIG. 7 illustrates a flowchart of an example method 700 of information identification and extraction, according to at least one embodiment described herein. In some embodiments, one or more of the operations associated with the method 700 may be performed by the information collection system 110. Alternately or additionally, the method 700 may be performed by any suitable system, apparatus, or device.

Figure 23:
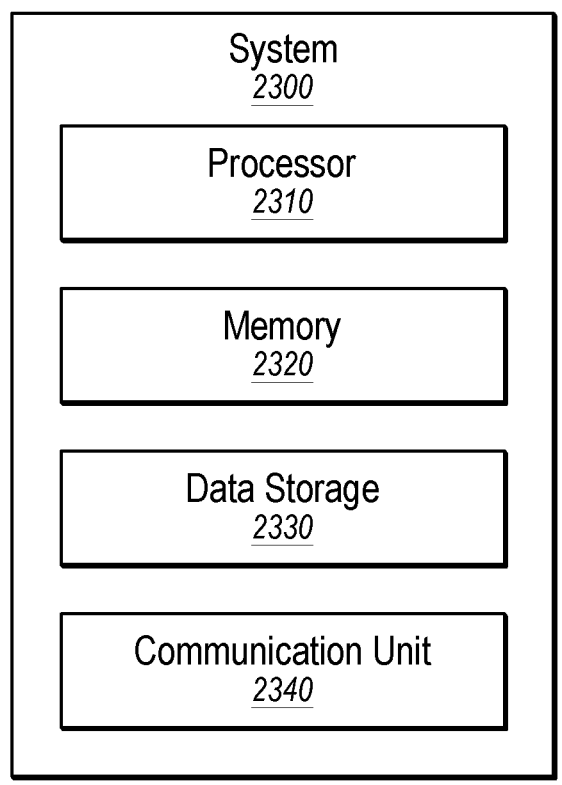
FIG. 23 illustrates an example system that may identify and extract information.

For example, the processor 2310 of the system 2300 of FIG. 23 may perform one or more of the operations associated with the method 700. Although illustrated with discrete blocks, the steps and operations associated with one or more of the blocks of the method 700 may be divided into additional blocks, combined into fewer blocks, or eliminated, depending on the desired implementation.

At block 710, an author object may be created in a database. For example, an information collection system (such as the information collection system 110 of FIG. 1) may obtain one or more publications from publication systems (such as the publication systems 120 of FIG. 1). The publications may be parsed and analyzed to extract the authors of the publication, and author profile data about the authors. In these and other embodiments, the author profile data may include one or more of a title of the author, an affiliation of the author, an expertise description of the author, and a location of the author. In some embodiments, creating the author object may include extracting the name, the author profile data, any images of the author, and the co-authors from the digital documents. Additionally or alternatively, the author object may also include a topic associated with the publication. For example, one or more keywords of the publication may be added as topics on which the author is a knowledgeable person.

Figure 8:
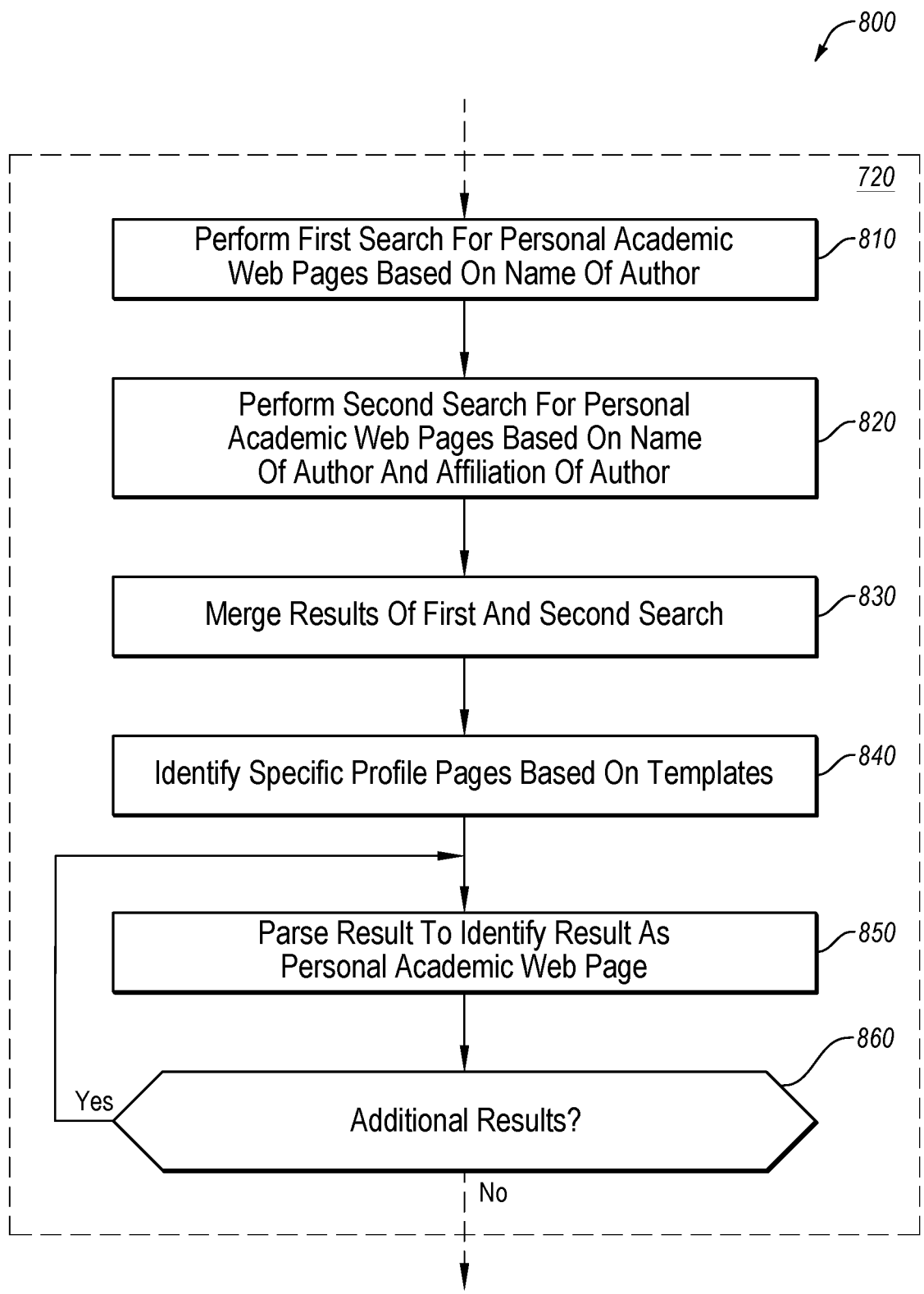
FIG. 8 illustrates a flowchart of an example method of identifying personal academic web pages.
Figure 9A:
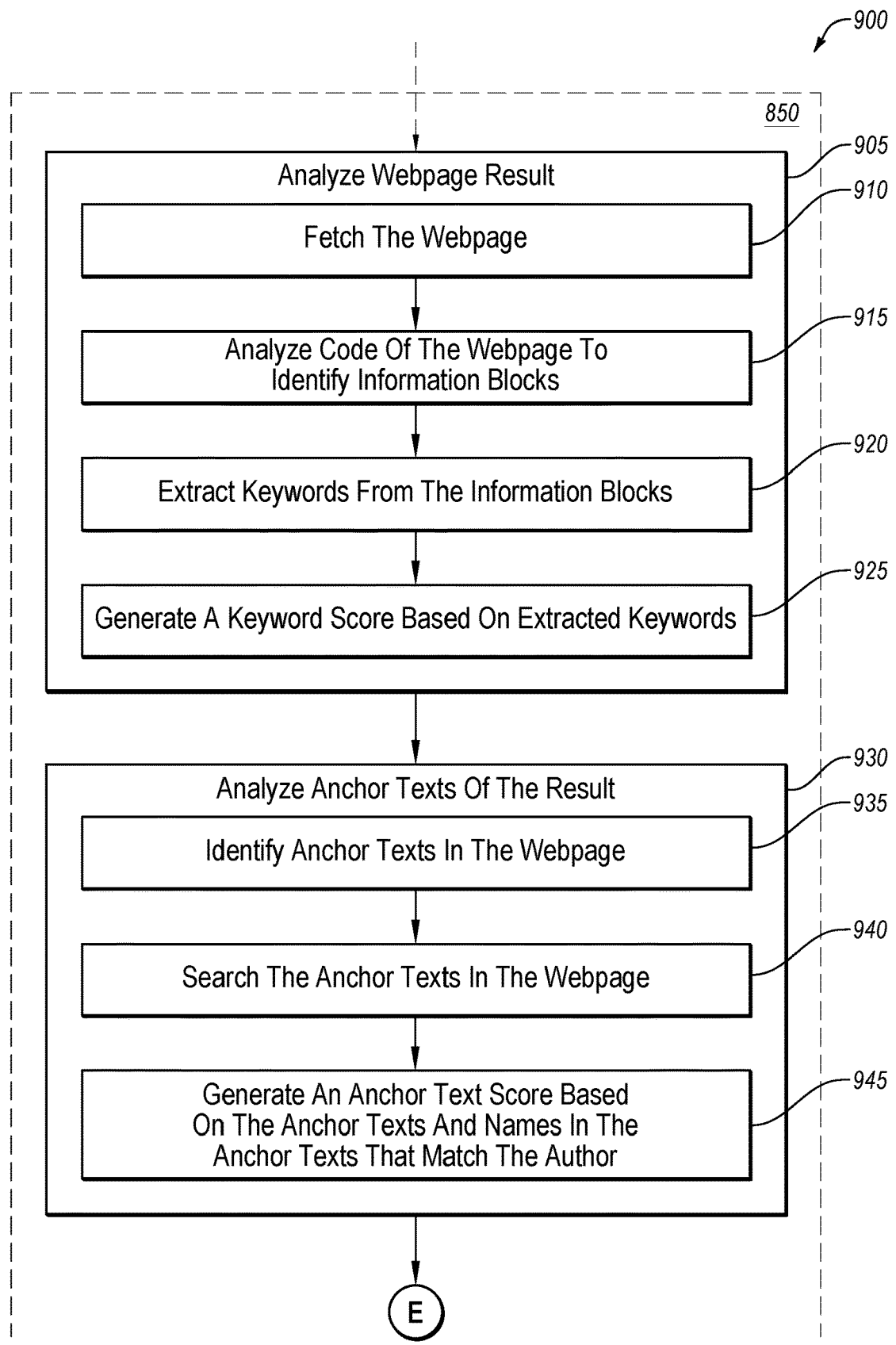
FIGS. 9a and 9b illustrate a flowchart of another example method that may be used in information identification and extraction.
Figure 9B:
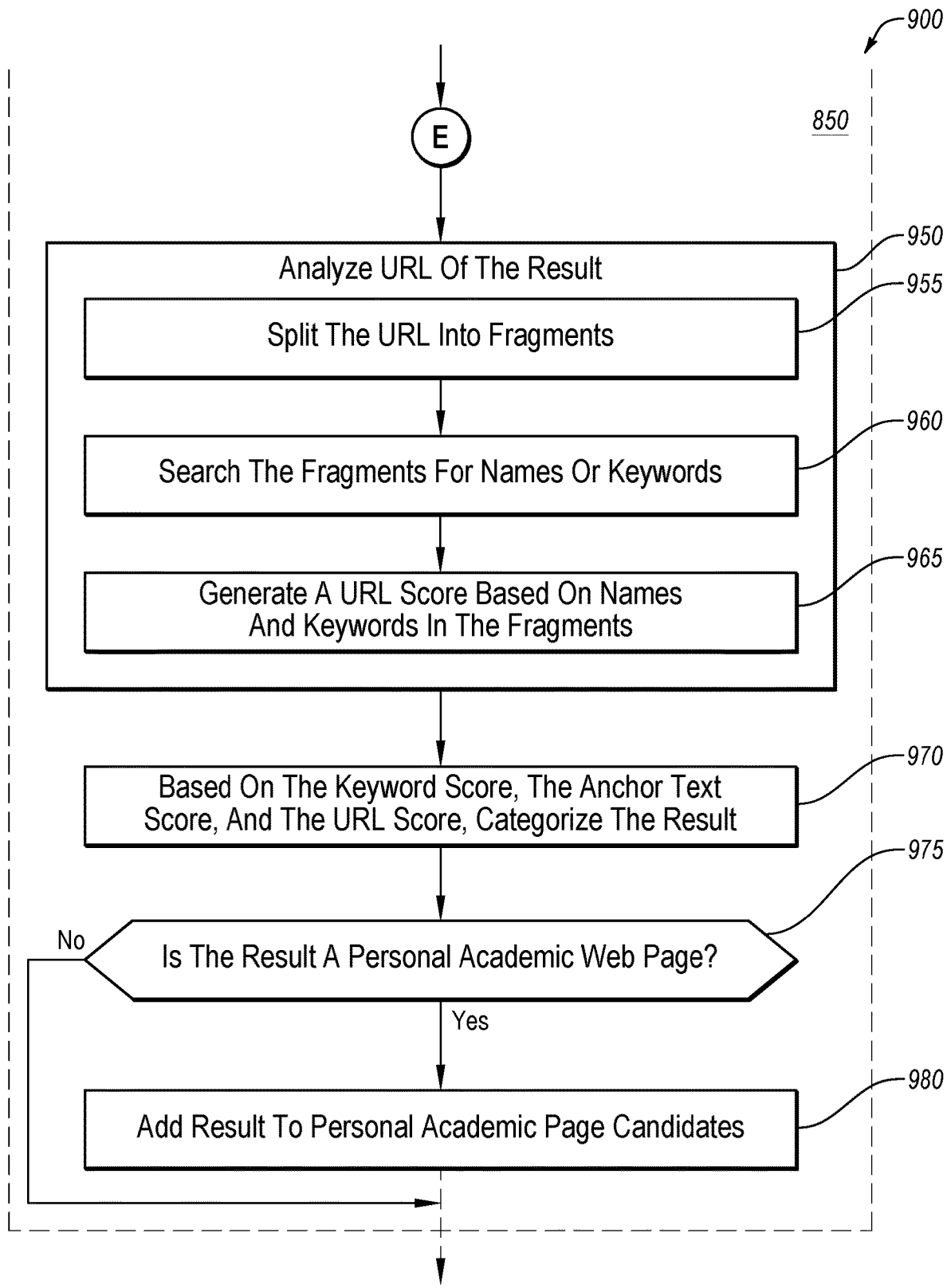

At block 720, for a given author, personal academic web page candidates that include a possibility of being associated with the author may be obtained. For example, the information collection system may request that a general search engine perform a search on the name of the author and/or the name of the author and an affiliation of the author among the web pages hosted on web hosting systems (such as the web hosting systems 150 of FIG. 1). Additionally or alternatively, another search based on one or more terms related to the author may be used, such as a title of the author (e.g., department chair), expertise description of the author, and/or other terms. Any number of searches may be performed. In some embodiments, the number of searches may be fewer than five. In some embodiments, the results of the searches may be merged and one or more types of web pages may be removed from the list, such as a Google Scholar page or a LinkedIn page. The remaining results may be parsed or otherwise analyzed to determine which of the results are personal academic web pages, and the results that are personal academic web pages may be included as personal academic web page candidates. In these and other embodiments, the personal academic web page candidates may have data extracted therefrom to generate personal academic web page objects. An example method of obtaining personal academic web pages is illustrated in FIG. 8, and an example method of determining which of the results are personal academic web pages is illustrated in FIGS. 9a and 9b.

At block 730, for the given author, social media account candidates that include a possibility of being associated with the author may be obtained. For example, the information collection system may request that a search be performed among one or more social media systems (such as the social media systems 130 of FIG. 1). Such a search may be performed based on the name of the author, or may additionally or alternatively include one or more terms otherwise related to the author. Additionally, such a search may be performed for multiple social media platforms across multiple social media systems. The returned results may include the social media account candidates. For the social media account candidates, social media account objects may be generated, for example, by parsing profiles of the social media account candidates and/or otherwise extracting various components of information as social media account data.

At block 740, one of the personal academic web page candidates and one of the social media account candidates may be cross-validated as being associated with the given author. For example, using any of the cross-validation techniques described in FIGS. 10-14, or others, the information collection system may confirm that a given personal academic web page and social media account are correctly associated with the given author. In some embodiments, a series of cross-validation techniques may be used, for example, using a first technique and then moving on to a next technique if the first technique failed to determine a match between the social media account candidate and the personal academic web page candidate. For example, the information collection system could first use a URL matching technique, followed by a social media account matching technique, followed by a photo matching technique, followed by a keyword match technique, followed by a linked social media keyword match technique. In some embodiments, the block 740 may proceed through multiple cross-validation techniques and obtain results for each of the cross-validation techniques before making a final determination regarding cross-validation. In these and other embodiments, the block 740 may include each of the cross-validation techniques of FIGS. 10-14.

In some embodiments, the block 740 may begin with one social media account candidate and cross-validate it with each of the personal academic web page candidates until a match is found. Alternatively, the block 740 may begin with one personal academic web page candidate, and cross-validate it with each of the social media account candidates until a match is found. At the conclusion of the block 740, a social media account and a personal academic web page may be associated with the given author.

In some embodiments, a given author may have more than one personal academic web page and/or more than one social media account. For example, for an author who is a faculty member at a university and a consultant with a company, the author may have a university-hosted personal academic web page, a company-hosted personal academic web page, and an individually-hosted personal academic web page. Additionally or alternatively, the author may have a Twitter account, an Instagram account, and a Facebook account. In these and other embodiments, the present disclosure may cross-validate more than one personal academic web page with more than one social media account. In these and other embodiments, the one or more processes described in the present disclosure may not terminate once one social media account is cross-validated with one personal academic web page, but may proceed through all social media account candidates and/or all personal web page candidates. In these and other embodiments, all social media accounts and personal academic web pages cross-validated as being associated with an author may be so associated. Additionally or alternatively, a single social media account and/or a single personal academic web page may be associated with the author. For example, a preference may be given to a Twitter account over a Facebook account. As another example, a university-hosted web page may be given preference over an individually-hosted web page.

At block 750, a determination may be made as to whether any additional authors are remaining that have not been analyzed to associate a social media account and a personal academic web page with the additional authors. After a determination that there are remaining authors, the method

700 may return to the block 720 to obtain personal academic web page candidates for the next author. After a determination that there are no remaining authors, the method 700 may proceed to the block 760.

At block 760, new social media posts from the social media accounts associated with the authors may be extracted. For example, to extract the new posts, the social media object and/or the author object may include a network address for the social media accounts. The information collection system may navigate to the social media accounts using the network address and extract the posts from a recent time period or if the social media accounts have had posts extracted before, from the last post extraction. In these and other embodiments, the information extracted from the new posts may be organized. In some embodiments, the information may be organized based on the expertise of the authors associated with the social media accounts from which the information is extracted, such as the topics about which they are knowledgeable.

At block 770, the organized data may be provided according to the expertise of the authors associated with the social media accounts, for example, in a topical organization. In some embodiments, the information may be provided through a webpage. Additionally or alternatively, the information may be collected and communicated to a set of social media accounts, such as the social media accounts linked to the authors, or another set of knowledgeable social media account owners.

FIG. 8 illustrates a flowchart of an example method 800 of identifying personal academic web pages, according to at least one embodiment described herein. While articulated with respect to one author, the method 800 may be repeated for any number of authors. The method 800 may reflect one embodiment of performing one or more operations of the block 720 of FIG. 7. In some embodiments, one or more of the operations associated with the method 800 may be performed by the information collection system 110. Alternately or additionally, the method 800 may be performed by any suitable system, apparatus, or device. For example, the processor 2310 of the system 2300 of FIG. 23 may perform one or more of the operations associated with the method 800. Although illustrated with discrete blocks, the steps and operations associated with one or more of the blocks of the method 800 may be divided into additional blocks, combined into fewer blocks, or eliminated, depending on the desired implementation.

The dashed arrow leading into block 810 indicates that the method 800 may be a continuation of another method, such as continuing from block 710 of the method 700 of FIG. 7.

At block 810, a first search may be performed for potential personal academic web pages based on a name of an author, such as the name of an author in an author object generated at the block 710. For example, an information collection system (such as the information collection system 110) may request a general search engine to perform a search for web pages hosted by one or more web hosting systems (such as the web hosting systems 150 of FIG. 1) based on the name of the author. The results may be placed in a first list. The number of results placed in the first list may be limited or truncated based on a numerical value or any other basis.

At block 820, a second search may be performed for potential personal academic web pages based on the name of the author and an affiliation of the author. For example, the information collection system may request a general search engine to perform a search for web pages hosted by one or more web hosting systems based on the name of the author and the affiliation of the author. The results may be placed in a second list. The number of results placed in the second list may be limited or truncated based on a numerical value or any other basis. In some embodiments, the size of the first list and the second list may be the same size or may be different sizes. Additionally or alternatively, other search terms may be used and/or additional searches may be performed to generate additional lists beyond the first and second lists. For example, a search may be performed including a title of a publication and the author name, or using any other author data of the author object.

At block 830, the results from the first search and the second search may be merged. For example, the results may be combined in an every-other manner (e.g., result one from first list, result one from second list, result two from first list, results two from second list, result three from first list, and/or others), or any other combination technique. In some embodiments, the merged lists may be deduplicated.

At block 840, one or more social media accounts may be identified as being profile pages based on a template of profile pages of the social media accounts. For example, the results may be compared to a known template for one or more social media account profiles for social media accounts such as a LinkedIn page, a ResearchGate page, or a Google Scholar page. One or more of the results may be analyzed to determine a format including the location and style of one or more web elements and compared to the known layout and/or format of a template social media page. After identifying the page as such a social media page, the social media page may be added to the list of personal academic web page candidates and removed from the merged list of search results. In some embodiments, such social media account pages may be limited to academic or business based social media accounts.

At block 850, a given result from the list of results may be parsed to identify whether or not the given result is a personal academic web page. For example, various textual or visual elements of the given result may be parsed and analyzed to determine whether those textual and/or visual elements are consistent with a personal academic web page. Based on the given result being a personal academic web page, the given result may be included in a list of personal academic web page candidates. One example of a method that may be utilized to parse a result to identify whether or not the result is a personal academic web page is described with respect to FIGS. 9a and 9b. Another example of a method that may be utilized to parse a result to identify whether or not the result is a personal academic web page is described with respect to U.S. patent application Ser. No. 13/732,036, including, for example, FIG. 6. The entirety of U.S. patent application Ser. No. 13/732,036 is hereby incorporated by reference.

At block 860, a determination may be made as to whether any additional results remain to be parsed and a determination made as to whether or not the result is a personal academic web page. After a determination that there are additional results, the method 800 may return to block 850 such that the next result may be parsed and determined whether or not the result is a personal academic web page. After a determination that there are no remaining results that have not been parsed, the method 800 may output the obtained resulting personal web page candidates.

The dashed arrow at the end of the method 800 may indicate that the personal web page candidates may be used by one or more further processes or blocks, such as by the block 730 of the method 700 of FIG. 7.

In some embodiments, rather than identifying the social media accounts at block 840, the method 800 may proceed directly to parsing the results.

FIGS. 9*a* and 9*b* illustrate a flowchart of another example method 900 that may be used in information identification and extraction, in accordance with one or more embodiments of the present disclosure. For example, FIGS. 9*a* and 9*b* illustrate a flowchart of an example method 900 of parsing one or more web pages to determine if that web page is a personal academic web page. While articulated with respect to one web page, the method 900 may be repeated for any number of web pages. The method 900 may reflect one embodiment of performing one or more operations of the block 850 of FIG. 8. In some embodiments, one or more of the operations associated with the method 900 may be performed by the information collection system 110. Alternately or additionally, the method 900 may be performed by any suitable system, apparatus, or device. For example, the processor 2310 of the system 2300 of FIG. 23 may perform one or more of the operations associated with the method 900. Although illustrated with discrete blocks, the steps and operations associated with one or more of the blocks of the method 900 may be divided into additional blocks, combined into fewer blocks, or eliminated, depending on the desired implementation.

With reference to FIG. 9*a*, the dashed arrow leading into block 905 indicates that the method 900 may be a continuation of another method, such as continuing from block 840 of the method 800 of FIG. 8.

At block 905, a web page result may be analyzed. The web page analysis may yield a keyword score associated with content of the result. The block 905 may include one or more operations that may be included in analyzing of the web page result, including one or more of blocks 910, 915, 920, and 925.

At block 910, the web page may be fetched. For example, an information collection system (such as the information collecting system 110 of FIG. 1) may communicate over a network to request a web page from a web hosting system (such as one of the web hosting systems 150 of FIG. 1).

At block 915, computer-readable code of the web page may be analyzed to identify one or more information blocks contained in the web page. For example, code used by a computer to display a web page may be analyzed to determine the location of fields that may include blocks of information. In some embodiments, the web page may be presented using hypertext markup language (HTML), extensible hypertext markup language (XHTML), extensible markup language (XML), cascading style sheets (CSS), JavaScript, and/or any other language or technique used for providing computer-readable code describing a web page. In some embodiments, the code may be analyzed to identify text blocks with more than a threshold number of words. As another example, text blocks with a title such as "publications," "interests," "contact information," "summary," and/or others may be searched for.

At block 920, keywords may be extracted from the information blocks identified at the block 915. For example, the words of the information blocks may be compared to one or more topics identified by the information collection system or other list of keywords associated with one or more topics. As another example, certain types of words may be removed from the words in the information blocks (e.g., "a," "the," "interested," "enjoys," "university," "department," and/or others) and the remaining words may be sorted. Additionally or alternatively, any other keyword extraction technique may be used.

At block 925, a keyword score may be generated based on the extracted keywords. For example, a keyword score may represent the number of keywords identified (such as a score reflecting that eight keywords were found), a number of keywords of all keywords for a topic identified (such as a score reflecting that eight out of twelve keywords for a topic were found), a frequency of keywords (such as a score reflecting that one fourth of the words used in the information blocks were keywords for a topic), and/or others.

At block 930, one or more anchor texts of the result may be analyzed. An anchor text may include visible text associated with a hyperlink. For example, an anchor text may be highlighted, bolded, underlined, or otherwise formatted to indicate that the text is associated with a hyperlink. The anchor text analysis may yield an anchor text score based on the anchor texts. The block 930 may include one or more operations that may be included in analyzing the anchor texts, including one or more of blocks 935, 940, and 945.

At block 935, one or more anchor texts may be identified within the result web page. For example, the result web page may be parsed to identify all hyperlinks in the result. The visible text associated with the hyperlinks may be identified as the anchor texts.

At block 940, the anchor texts of the result web page may be searched for one or more textual elements. For example, the anchor texts may be searched for the name of the author. As another example, the anchor texts may be searched for one or more topics and/or keywords associated with the one or more topics. In these and other embodiments, the anchor texts may be categorized based on what the anchor text identifies. For example, if the anchor text is a person's name, it may be categorized as a "name."

At block 945, an anchor text score may be generated. In some embodiments, the anchor text score may be based on names in the anchor texts that correspond to the author name, keywords in the anchor texts, categories to which the anchor texts belong, and/or others. For example, the anchor text score may reflect that there is one anchor text with the author's name, and two anchor texts with keywords in the anchor texts, and two additional keywords in categories related to the topic.

With reference to FIG. 9*b*, at block 950, a URL of the result may be analyzed. The URL analysis may yield a URL score based on the URL. The block 950 may include one or more operations that may be included in analyzing the URL, including one or more of blocks 955, 960, and 965.

At block 955, the URL of the result may be split into fragments. For example, for a URL that includes online.stanford.edu/instructors/andrew-ng, the URL may be broken up into the fragments of "online," "stanford.edu," "instructors," and "andrew-ng." In these and other embodiments, special characters such as ~, -, *, and/or others may be removed from a fragment, or may be used as a separator between fragments. In some embodiments, the URL fragments may be categorized in a similar manner to the anchor texts. For example, the fragment "andrew-ng" may be categorized as a name category, and the fragment "stanford.edu" may be categorized as an affiliation or entity.

At block 960, the fragments may be searched for names and/or keywords. For example, the fragments may be searched for all or part of the name of the author. Additionally or alternatively, the fragments may be searched for topics or keywords associated with a topic. For example, the author may have one or more topics on which the author has published, and the keywords associated with that topic may be searched for among the fragments.

At block 965, a URL score may be generated. In some embodiments, the URL score may be based on names in the fragments that correspond to the author name, keywords in the fragments, categories to which the fragments belong, and/or others. For example, the fragment score may reflect that there is one fragment with the author's last name.

At block 970, based on the keyword score, the anchor text score, and/or the URL score, the result web page may be categorized as a personal academic web page or as another type of web page. In some embodiments, the keyword score, the anchor text score, and the URL score may each include a numerical value between 0 and 1 such that the sum of all potential scores equals 1. Additionally, the different scores may be weighted differently, for example, such that the URL score weights more heavily than the anchor text score. If the scores are all weighted equally, each score may have a possible value of 0.3333. In some embodiments, a machine learning engine may be utilized in the categorization of the web page. For example, one or more web pages of known personal academic web pages may be provided as positive training data for the machine learning engine such that the machine learning engine may identify various features and/or commonalities of the personal academic web pages. As another example, one or more web pages known to not be personal academic web pages may be provided as negative training data for the machine learning engine. In these and other embodiments, based on any positive and/or negative training data received, the machine learning engine may generate a classification algorithm.

In some embodiments, the various scores may be a representation of how similar the analyzed aspect of the result web page is to a typical personal academic web page. For example, most academic web pages may include a description of the person's research projects and research interests, a description of courses and lectures provided by the person, a description of publications by the person, and/or others. The keyword score, the anchor text score, and the URL score may collectively and/or individually reflect how likely it is that the result web page includes those types of features.

In some embodiments, rather than using scores, the result may be categorized based on one or more the keywords extracted at the block 920, the anchor texts identified in the block 935, or the fragments of the block 955. Additionally or alternatively, the categorization may be based on the categories to which the keywords, anchor texts, or fragments were sorted.

In some embodiments, the result may be categorized into one of multiple categories, such as a social media page, a personal academic web page, a project website, a business entity website, an academic department website, and/or others.

At block 975, a determination may be made as to whether the result was categorized as a personal academic web page at the block 970. If the result is categorized as a personal academic web page, the method 900 may proceed to block 980 where the result web page is added as a personal academic web page candidate. If the result is not categorized as a personal academic web page, the method 900 may proceed to the dashed arrow at the end of the method 900.

The dashed arrow at the end of the method 900 may indicate that the personal web page candidates identified in the method 900 may be used by one or more further processes or blocks, such as by the block 860 of the method 800 of FIG. 8.

Figure 10:
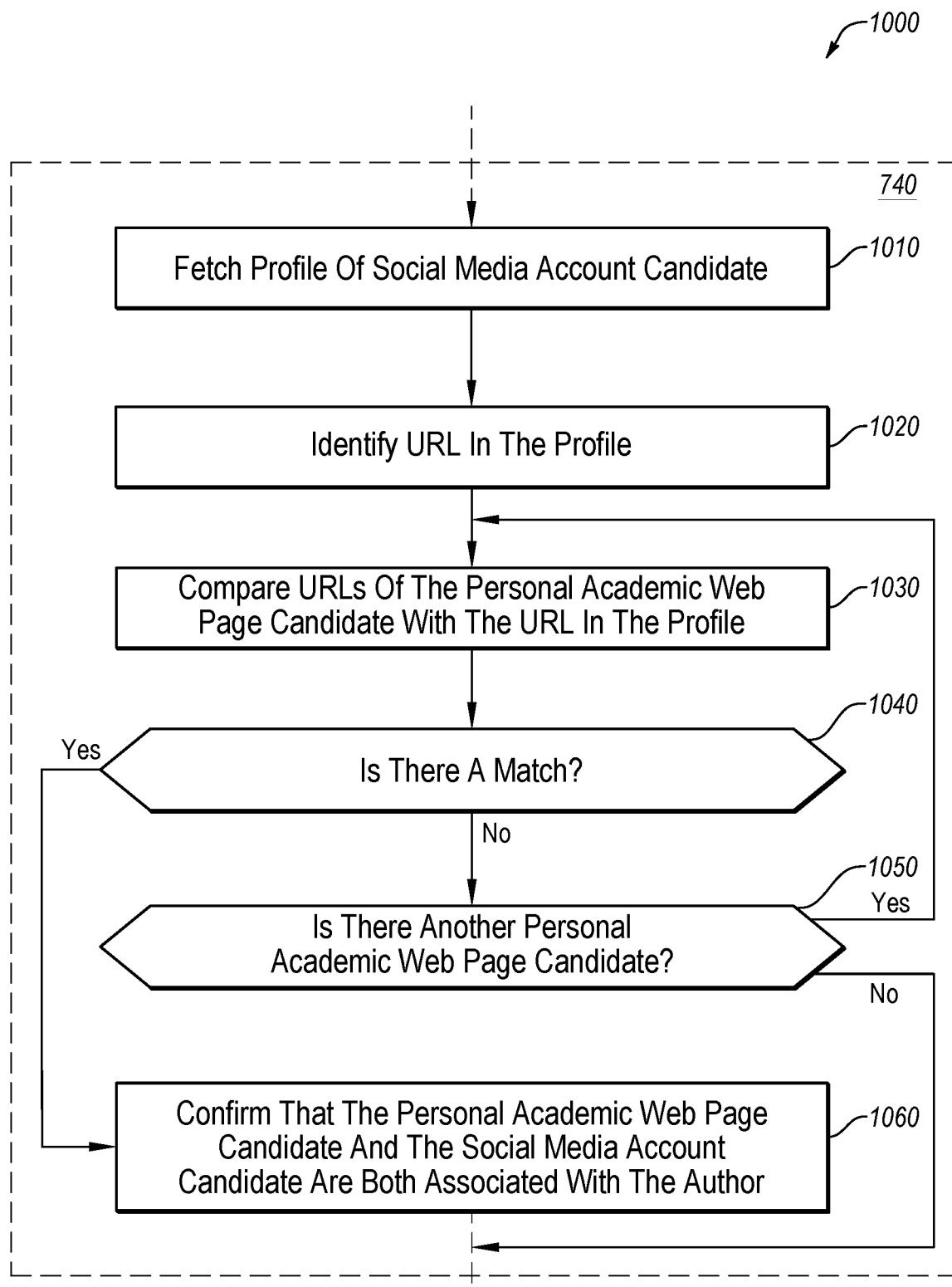
FIG. 10 illustrates a flowchart of an example method that may be used in cross-validating social media accounts and personal academic web page candidates.

FIG. 10 illustrates a flowchart of an example method 1000 that may be used in cross-validating social media accounts and personal academic web page candidates, in accordance with one or more embodiments of the present disclosure. While articulated with respect to one social media account candidate, the method 1000 may be repeated for any number of social media account candidates. The method 1000 may reflect one embodiment of performing one or more operations of the block 740 of FIG. 7. In some embodiments, one or more of the operations associated with the method 1000 may be performed by the information collection system 110. Alternately or additionally, the method 1000 may be performed by any suitable system, apparatus, or device. For example, the processor 2310 of the system 2300 of FIG. 23 may perform one or more of the operations associated with the method 1000. Although illustrated with discrete blocks, the steps and operations associated with one or more of the blocks of the method 1000 may be divided into additional blocks, combined into fewer blocks, or eliminated, depending on the desired implementation.

The dashed arrow leading into block 1010 indicates that the method 1000 may be a continuation of another method, such as continuing from block 730 of the method 700 of FIG. 7. Additionally or alternatively, the dashed arrows may be a continuation from one or more of the methods 1100 of FIG. 11, 1200 of FIG. 12, 1300 of FIG. 13, or 1400 of FIG. 14.

At block 1010, a profile of a social media account candidate may be fetched. For example, an information collection system (such as the information collection system 110 of FIG. 1) may query a social media system (such as one or more of the social media systems 130 of FIG. 1) to retrieve the profile of the social media account candidate. In some embodiments, only the profile is fetched such that the information collection system need not receive the entire social media account.

At block 1020, a URL in the profile may be identified. For example, the profile of the social media account may be parsed or analyzed to determine if the profile includes a field for a personal web page. In some embodiments, a particular social media account may not include such a field, or may not include an entry in such a field. When such a field exists and includes an entry, the corresponding entry may be identified as the URL in the profile. In some embodiments, if there is no such field or no entry in such a field, the method 1000 may end and proceed to the dashed arrow at the end of the method 1000 to proceed to another cross-validation technique.

At block 1030, the URL of the profile of the social media account candidate may be compared to the URL of a personal academic web page candidate.

At block 1040, a determination may be made as to whether there is a match between the URL of the profile of the social media account candidate and the URL of the personal academic web page candidate based on the comparison of the block 1030. In some embodiments, the determination may be an exact match inquiry. Additionally or alternatively, the inquiry may require similarity above a threshold, such as at least a 95% match, or at least a 90% match between the URLs. If there is a match, the method 1000 may proceed to the block 1060. If there is not a match, the method 1000 may proceed to the block 1050. In some embodiments, the protocol and/or sub-domain of the URL may be ignored for purposes of matching. For example, in such an embodiment, the URLs stanford.edu/instructors/andrew-ng and http://online.stanford.edu/instructors/andrew-ng may be found as a match.

At block 1050, a determination may be made as to whether or not there are additional personal academic web page candidates to compare to the URL of the profile of the social media account candidate. If there are no other personal academic web page candidates to compare, the method may proceed to the dashed arrow at the end of the method 1000. If there are additional personal academic web page candidates to compare, the method 1000 may return to the block 1030.

At block 1060, based on the match found at the block 1040, the personal academic web page and the social media account candidate may both be confirmed as being associated with the author. For example, the cross-validation via the URL of the social media account profile and the URL of the personal academic web page may increase the likelihood for both the social media account candidate and the personal academic web page to be correctly associated with the author. In some embodiments, the block 1060 may proceed to the dashed arrow at the end of the method 1000. Additionally or alternatively, the method 1000 may proceed from the block 1060 to the block 1050. For example, the method 1000 may return to the block 1050 if there are more than one URLs in the profile of the social media account candidate.

The dashed arrow at the end of the method 1000 may indicate that the cross-validated personal web page candidate and social media account candidate may be used by one or more processes or blocks, such as by the block 750 of the method 700 of FIG. 7. Additionally or alternatively, the dashed arrows may proceed to one or more of the methods 1100 of FIG. 11, 1200 of FIG. 12, 1300 of FIG. 13, or 1400 of FIG. 14.

Figure 11:
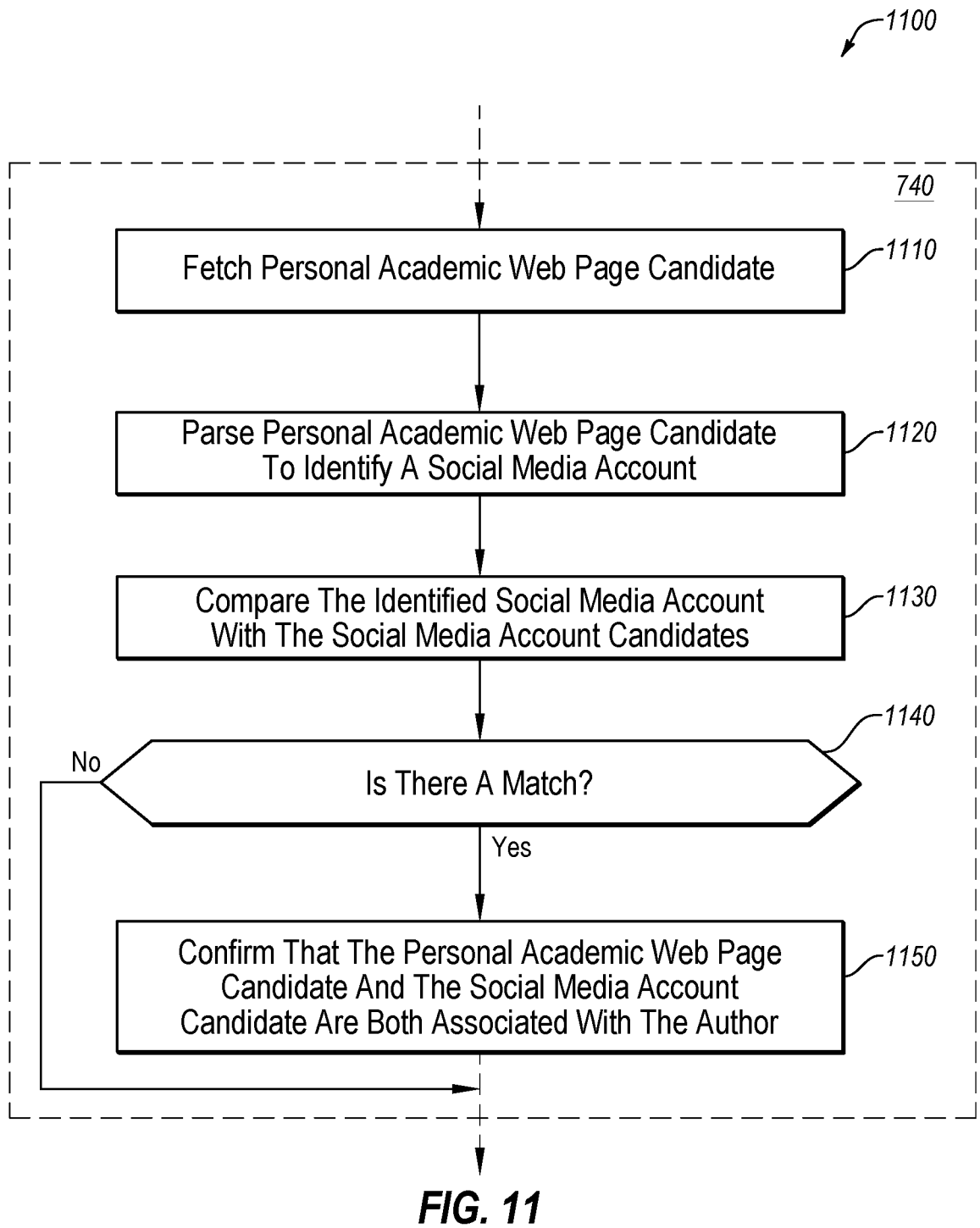
FIG. 11 illustrates a flowchart of another example method that may be used in cross-validating social media accounts and personal academic web page candidates.

FIG. 11 illustrates a flowchart of another example method 1100 that may be used in cross-validating social media accounts and personal academic web page candidates, in accordance with one or more embodiments of the present disclosure. While articulated with respect to one personal academic web page candidate, the method 1100 may be repeated for any number of personal academic web page candidates. The method 1100 may reflect one embodiment of performing one or more operations of the block 740 of FIG. 7. In some embodiments, one or more of the operations associated with the method 1100 may be performed by the information collection system 110. Alternately or additionally, the method 1100 may be performed by any suitable system, apparatus, or device. For example, the processor 2310 of the system 2300 of FIG. 23 may perform one or more of the operations associated with the method 1100. Although illustrated with discrete blocks, the steps and operations associated with one or more of the blocks of the method 1100 may be divided into additional blocks, combined into fewer blocks, or eliminated, depending on the desired implementation.

The dashed arrow leading into block 1110 indicates that the method 1100 may be a continuation of another method, such as continuing from block 730 of the method 700 of FIG. 7. Additionally or alternatively, the dashed arrows may be a continuation from one or more of the methods 1000 of FIG. 10, 1200 of FIG. 12, 1300 of FIG. 13, or 1400 of FIG. 14.

At block 1110, a personal academic web page candidate may be fetched. For example, an information collection system (such as the information collection system 110 of FIG. 1) may query a web hosting system (such as one of the web hosting systems 150 of FIG. 1) to retrieve the personal academic web page candidate.

At block 1120, the personal academic web page candidate may be parsed to identify a social media account listed on the personal academic web page candidate. For example, code used by a computer to display the personal academic web page candidate may be analyzed to determine the location of fields that include one or more social media platforms in the title or body of the field. In some embodiments, if there is no such field or body such that no social media account identifiers may be found in the personal academic web page candidate, the method 1100 may end and proceed to the dashed arrow at the end of the method 1100 to proceed to another cross-validation technique.

At block 1130, the identified social media account may be compared to the social media account candidates. For example, the comparison may include comparing a Twitter handle listed on the personal academic web page, a Facebook account name, or some other unique identifier of the social media account appearing on the personal academic web page.

At block 1140, a determination may be made as to whether there is a match between the social media account identified at the block 1120 and any of the social media account candidates based on the comparison at block 1130. In some embodiments, the comparison may be an exact match inquiry. Additionally or alternatively, the inquiry may require similarity above a threshold, such as at least a 95% match, or at least a 90% match. If there is a match, the method 1100 may proceed to the block 1150. If there is not a match, the method 1100 may proceed to the dashed arrows at the end of the method 1100.

At block 1150, based on the match found at the block 1140, the personal academic web page and the social media account candidate matching the identified social media account may both be confirmed as being associated with the author. For example, the cross-validation via the personal academic web page and the identified social media account may increase the likelihood for both the social media account candidate and the personal academic web page to be correctly associated with the author.

The dashed arrow at the end of the method 1100 may indicate that the cross-validated personal web page candidate and social media account candidate may be used by one or more processes or blocks, such as by the block 750 of the method 700 of FIG. 7. Additionally or alternatively, the dashed arrows may proceed to one or more of the methods 1000 of FIG. 10, 1200 of FIG. 12, 1300 of FIG. 13, or 1400 of FIG. 14.

Figure 12:
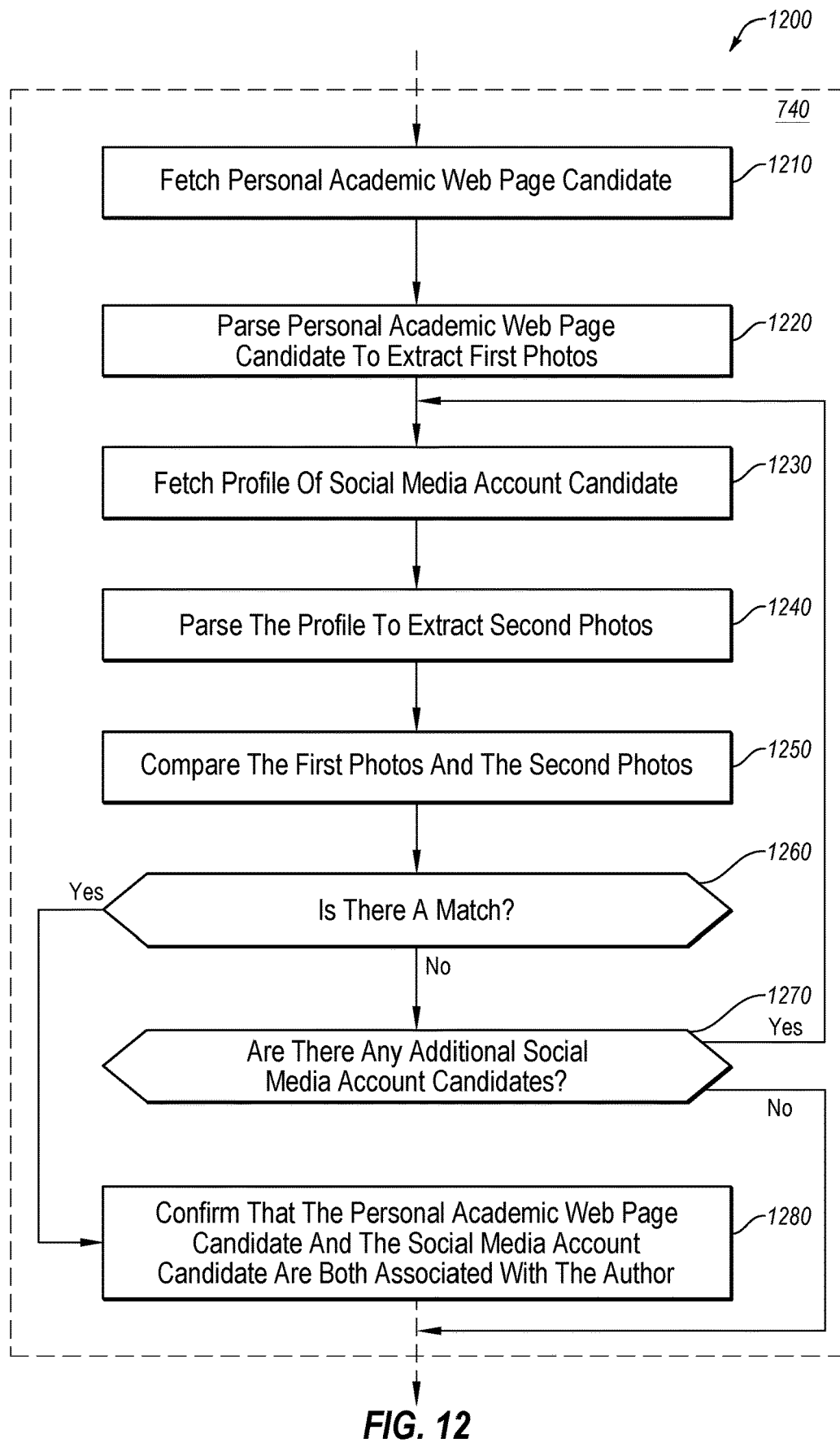
FIG. 12 illustrates a flowchart of another example method that may be used in cross-validating social media accounts and personal academic web page candidates.

FIG. 12 illustrates a flowchart of another example method 1200 that may be used in cross-validating social media accounts and personal academic web page candidates, in accordance with one or more embodiments of the present disclosure. While articulated with respect to one personal academic web page candidate, the method 1200 may be repeated for any number of personal academic web page candidates. The method 1200 may reflect one embodiment of performing one or more operations of the block 740 of FIG. 7. In some embodiments, one or more of the operations associated with the method 1200 may be performed by the information collection system 110. Alternately or additionally, the method 1200 may be performed by any suitable system, apparatus, or device. For example, the processor 2310 of the system 2300 of FIG. 23 may perform one or more of the operations associated with the method 1200. Although illustrated with discrete blocks, the steps and operations associated with one or more of the blocks of the method 1200 may be divided into additional blocks, combined into fewer blocks, or eliminated, depending on the desired implementation.

The dashed arrow leading into block 1210 indicates that the method 1200 may be a continuation of another method, such as continuing from block 730 of the method 700 of FIG. 7. Additionally or alternatively, the dashed arrows may be a continuation from one or more of the methods 1000 of FIG. 10, 1100 of FIG. 11, 1300 of FIG. 13, or 1400 of FIG. 14.

At block 1210, a personal academic web page candidate may be fetched. For example, an information collection system may query a web hosting system to retrieve the personal academic web page candidate.

At block 1220, the personal academic web page candidate may be parsed to identify and extract one or more photos of the personal academic web page candidate, referred to as first photos. For example, code used by a computer to display the personal academic web page candidate may be analyzed to determine the location of images in the personal academic web page. In some embodiments, the extracted photos may be analyzed using image recognition to determine whether the photos are photos of people. In some embodiments, if there are no photos in the personal academic web page candidate, the method 1200 may end and proceed to the dashed arrow at the end of the method 1200 to proceed to another cross-validation technique.

At block 1230, a profile of a social media account candidate may be fetched. For example, an information collection system may query a social media system to retrieve the profile of the social media account candidate. In some embodiments, only the profile is fetched such that the information collection system need not receive the entire social media account.

At block 1240, the profile of the social media account candidate may be parsed to identify and extract one or more photos in the social media account candidate profile, referred to as second photos. For example, social media account profiles often include a photo or other image associated with the social media account as a visual identifier of the social media account. In some embodiments, if there are no photos in the social media account candidate profile, the method 1200 may end and proceed to the dashed arrow at the end of the method 1200 to proceed to another cross-validation technique.

At block 1250, the first photos and the second photos may be compared. Any image comparison technique may be used, such as a feature comparison technique, a point by point technique, and/or others. In some embodiments, the first photos and/or the second photos may be preprocessed to align orientation, scale, crop, and/or other features of the first and second photos. In some embodiments, the comparison of the block 1250 may only be performed for images of people. Additionally or alternatively, the comparison of the block 1250 may be performed for any photos, as some researchers may post photos of their research projects or other similar photos in their social media profiles and their personal academic web pages. If there are multiple first photos and/or multiple second photos, any or all of the first photos may be compared with any or all of the second photos.

In some embodiments, the first photos and/or the second photos may be analyzed using a facial recognition algorithm. For example, the first photos may include photos of the owner of the personal academic web page candidate and the second photos may include photos of the owner of the social media account candidate. In some embodiments, the results from the facial recognition analysis of the first photos may be compared with the results from the facial recognition analysis of the second photos. The comparison may provide an indication of the likelihood that the images include the same person.

At block 1260, a determination may be made as to whether there is a match between the first photos and the second photos. In some embodiments, the comparison may be an exact match inquiry. Additionally or alternatively, the inquiry may require similarity above a threshold, such as at least a 95% match, or at least a 90% match between the first photos and second photos. If there is a match, the method 1200 may proceed to the block 1280. If there is not a match, the method 1200 may proceed to the block 1270.

At block 1270, a determination may be made as to whether or not there are additional social media account candidates to be fetched to extract photos. After a determination that there are no other social media account candidates to be fetched to extract photos, the method may proceed to the dashed arrow at the end of the method 1200. After a determination that there are additional social media account candidates to be fetched to extract photos, the method 1200 may return to the block 1230.

At block 1280, based on the match found at the block 1260, the personal academic web page candidate and the social media account candidate may both be confirmed as being associated with the author. For example, the cross-validation via the first photos of the personal academic web page and the second photos of the of the social media account profile may increase the likelihood for both the social media account candidate and the personal academic web page candidate to be correctly associated with the author. In some embodiments, the block 1280 may proceed to the dashed arrow at the end of the method 1200. Additionally or alternatively, the method 1200 may proceed from the block 1280 to the block 1270. For example, the method 1200 may return to the block 1270 as the author may have multiple social media accounts.

The dashed arrow at the end of the method 1200 may indicate that the cross-validated personal web page candidate and social media account candidate may be used by one or more processes or blocks, such as by the block 750 of the method 700 of FIG. 7. Additionally or alternatively, the dashed arrows may proceed to one or more of the methods 1000 of FIG. 10, 1100 of FIG. 11, 1300 of FIG. 13, or 1400 of FIG. 14.

Figure 13:
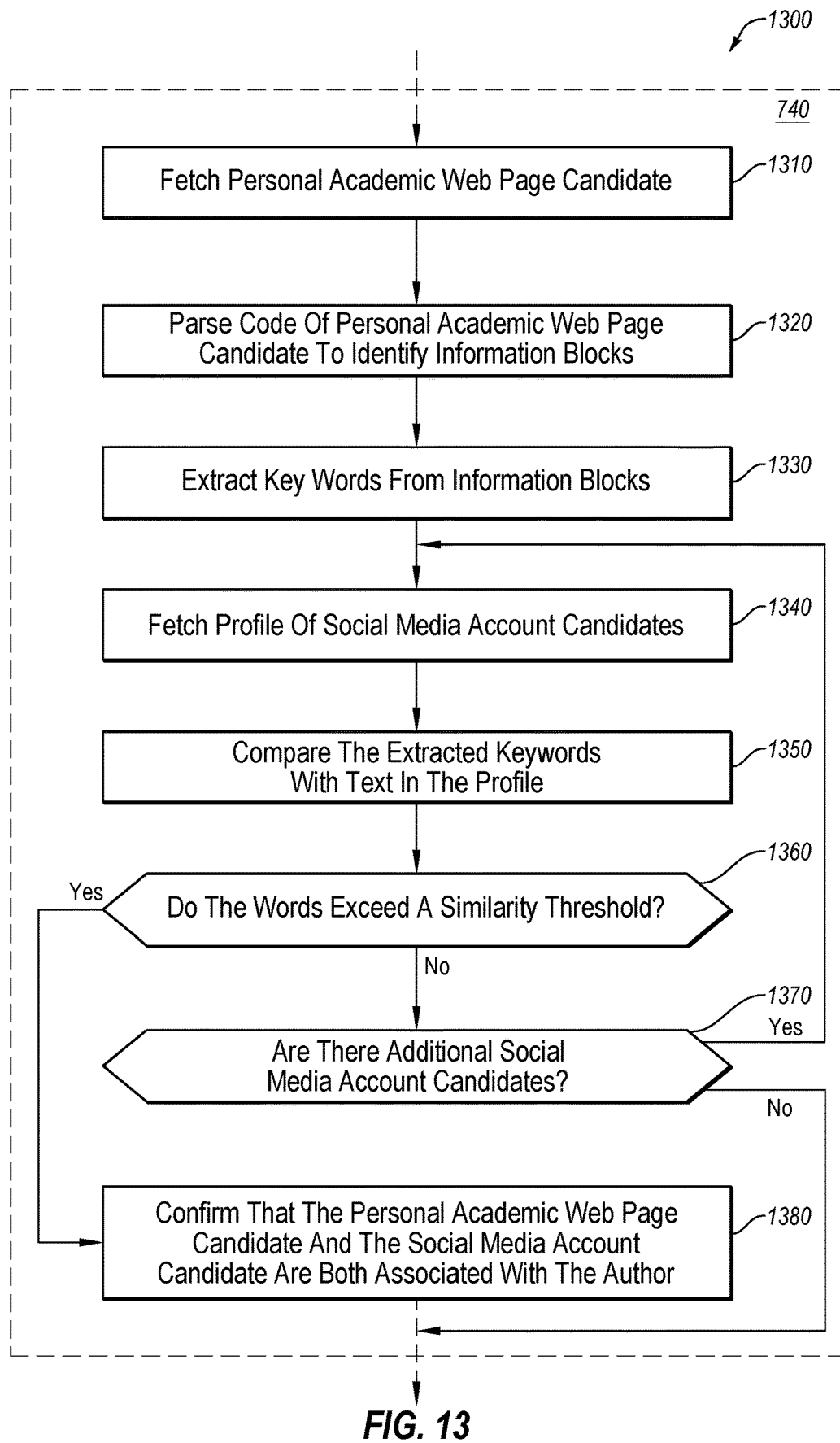
FIG. 13 illustrates a flowchart of another example method that may be used in cross-validating social media accounts and personal academic web page candidates.

FIG. 13 illustrates a flowchart of another example method 1300 that may be used in cross-validating social media accounts and personal academic web page candidates, in accordance with one or more embodiments of the present disclosure. While articulated with respect to one personal academic web page candidate, the method 1300 may be repeated for any number of personal academic web page candidates. The method 1300 may reflect one embodiment of performing one or more operations of the block 740 of FIG. 7. In some embodiments, one or more of the operations associated with the method 1300 may be performed by the information collection system 110. Alternately or additionally, the method 1300 may be performed by any suitable system, apparatus, or device. For example, the processor 2310 of the system 2300 of FIG. 23 may perform one or more of the operations associated with the method 1300. Although illustrated with discrete blocks, the steps and operations associated with one or more of the blocks of the method 1300 may be divided into additional blocks, combined into fewer blocks, or eliminated, depending on the desired implementation.

The dashed arrow leading into block 1310 indicates that the method 1300 may be a continuation of another method, such as continuing from block 730 of the method 700 of FIG. 7. Additionally or alternatively, the dashed arrows may be a continuation from one or more of the methods 1000 of FIG. 10, 1100 of FIG. 11, 1200 of FIG. 12, or 1400 of FIG. 14.

At block 1310, a personal academic web page candidate may be fetched. For example, an information collection system (such as the information collection system 110 of FIG. 1) may query a web hosting system (such as one of the web hosting systems 150 of FIG. 1) to retrieve the personal academic web page candidate.

At block 1320, the personal academic web page candidate may be parsed to identify information blocks. For example, code used by a computer to display the personal academic web page may be analyzed to determine the location of fields that may include blocks of information. In some embodiments, the code may be analyzed to identify text blocks with more than a threshold number of words. As another example, text blocks with a title such as "publications," "interests," "contact information," "summary," and/or others. may be searched for.

At block 1330, keywords may be extracted from the information blocks identified at the block 1320. For example, the words of the information blocks may be compared to one or more topics identified by the information collection system or other list of keywords associated with one or more topics. In some embodiments, the keywords may be automatically extracted from academic publications on a topic. Additionally or alternatively, any other keyword extraction technique may be used. In some embodiments, the keywords may include occupation terms, such as "research physicist," or "post-doctoral candidate."

At block 1340, a profile of a social media account candidate may be fetched. For example, the information collection system may query a social media system (such as the social media systems 130 of FIG. 1) to retrieve the profile of the social media account candidate. In some embodiments, only the profile is fetched such that the information collection system need not receive the entire social media account.

At block 1350, the extracted keywords may be compared with text in the social media account candidate profile. For example, any text within the social media account profile may be searched for the keywords extracted at the block 1330. In some embodiments, any overlap may be given a score, and the score may increase with consecutive matching terms or may increase with an increasing number of matching terms in the same sentence.

At block 1360, a determination may be made as to whether the keywords extracted from the personal academic web page candidate exceed a similarity threshold with the text from the profile. For example, a determination may be made as to whether the score associated with the overlap exceeds a threshold indicating a high level of overlap in keywords. In some embodiments, the threshold may vary based on which keywords are found to appear in both the social media account candidate and the personal academic web page candidate. For example, for more common keywords, the threshold may be higher than for less common keywords. After a determination that the similarity threshold is exceeded, the method 1300 may proceed to the block 1380. After a determination that the similarity threshold is not exceeded, the method 1300 may proceed to the block 1370.

At block 1370, a determination may be made as to whether or not there are additional social media account candidates to be fetched to compare with the keywords. After a determination that there are no other social media account candidates to be fetched, the method may proceed to the dashed arrow at the end of the method 1300. After a determination that there are additional social media account candidates to be fetched, the method 1300 may return to the block 1340.

At block 1380, based on the determination at the block 1360, the personal academic web page candidate and the social media account candidate may both be confirmed as being associated with the author. For example, the cross-validation via the keywords of the personal academic web page and the text of the profile of the social media account profile may increase the likelihood for both the social media account candidate and the personal academic web page candidate to be correctly associated with the author. In some embodiments, the block 1380 may proceed to the dashed arrow at the end of the method 1300. Additionally or alternatively, the method 1300 may proceed from the block 1380 to the block 1370. For example, the method 1300 may return to the block 1370 as the author may have multiple social media accounts.

The dashed arrow at the end of the method 1300 may indicate that the cross-validated personal web page candidate and social media account candidate may be used by one or more processes or blocks, such as by the block 750 of the method 700 of FIG. 7. Additionally or alternatively, the dashed arrows may proceed to one or more of the methods 1000 of FIG. 10, 1100 of FIG. 11, 1200 of FIG. 12, or 1400 of FIG. 14.

Figure 14:
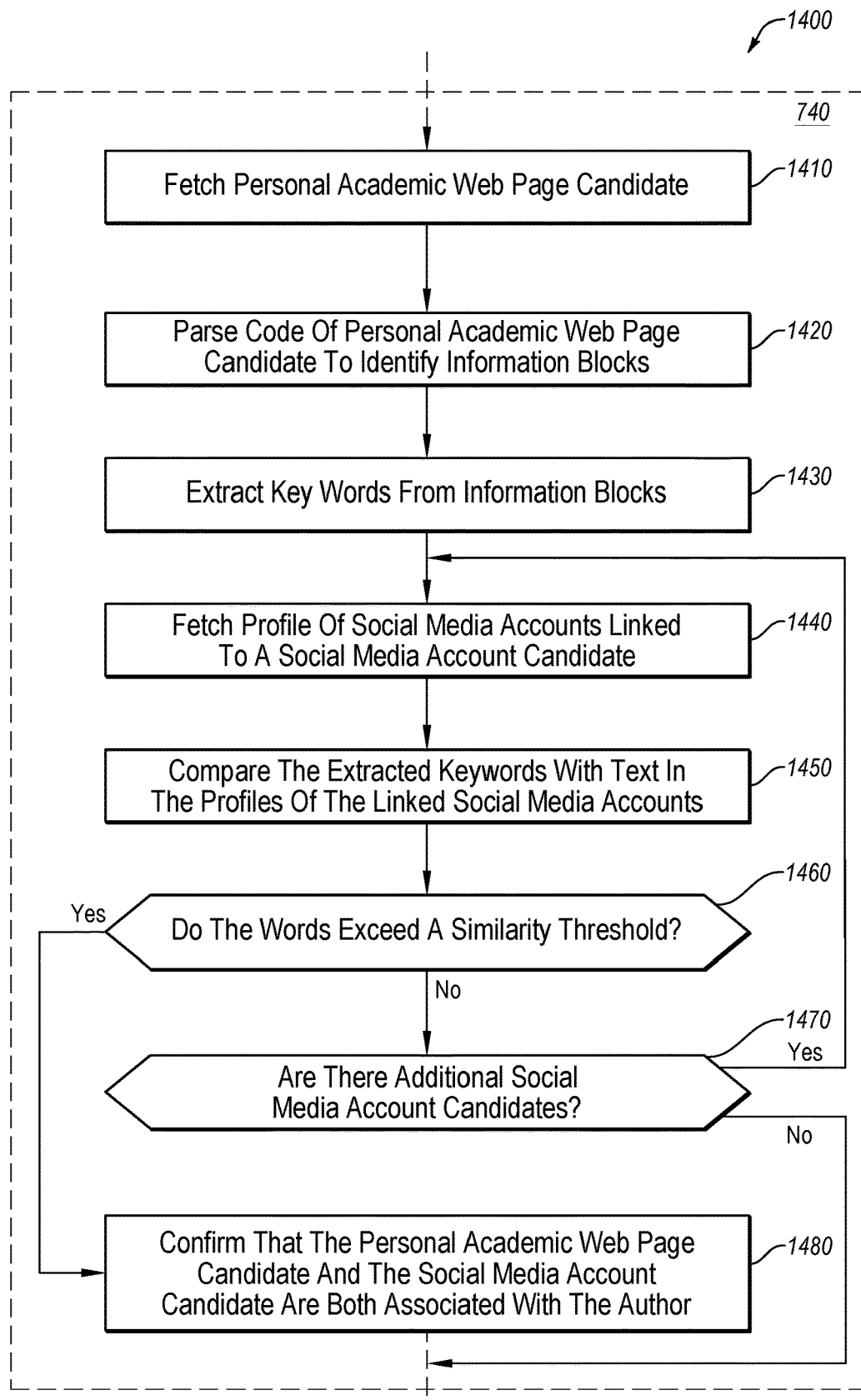
FIG. 14 illustrates a flowchart of another example method that may be used in cross-validating social media accounts and personal academic web page candidates.

FIG. 14 illustrates a flowchart of another example method 1400 that may be used in cross-validating social media accounts and personal academic web page candidates, in accordance with one or more embodiments of the present disclosure. While articulated with respect to one personal academic web page candidate, the method 1400 may be repeated for any number of personal academic web page candidates. The method 1400 may reflect one embodiment of performing one or more operations of the block 740 of FIG. 7. In some embodiments, one or more of the operations associated with the method 1400 may be performed by the information collection system 110. Alternately or additionally, the method 1400 may be performed by any suitable system, apparatus, or device. For example, the processor 2310 of the system 2300 of FIG. 23 may perform one or more of the operations associated with the method 1400. Although illustrated with discrete blocks, the steps and operations associated with one or more of the blocks of the method 1400 may be divided into additional blocks, combined into fewer blocks, or eliminated, depending on the desired implementation.

The dashed arrow leading into block 1410 indicates that the method 1400 may be a continuation of another method, such as continuing from block 730 of the method 700 of FIG. 7. Additionally or alternatively, the dashed arrows may be a continuation from one or more of the methods 1000 of FIG. 10, 1100 of FIG. 11, 1200 of FIG. 12, or 1300 of FIG. 13.

At block 1410, a personal academic web page candidate may be fetched. The block 1410 may be similar or comparable to the block 1310 of FIG. 13.

At block 1420, the personal academic web page candidate may be parsed to identify information blocks. The block 1420 may be similar or comparable to the block 1320 of FIG. 13.

At block 1430, keywords may be extracted from the information blocks identified at the block 1420. The block 1430 may be similar or comparable to the block 1330 of FIG. 13.

At block 1440, profiles of social media accounts linked to a social media account candidate may be fetched. For example, the information collection system may query a social media system to identify the social media accounts that obtain information from the social media account candidate (e.g., that follow the social media account candidate) and/or the social media accounts from which the social media account candidate obtains information (e.g., that the social media account candidate is following). The social media system may additionally be requested to send the profiles of the following and/or followed social media accounts. In some embodiments, the number of profiles requested may be truncated numerically, for example, at fifty profiles, or one hundred profiles, or two hundred profiles, and/or others.

At block 1450, the extracted keywords may be compared with text in the social media account profiles. In some embodiments, the block 1450 may be similar or comparable to the block 1350 of FIG. 13, with the variation that the comparison is performed for the profiles of the social media accounts linked to the social media account candidate rather than the profile of the social media account candidate itself.

At block 1460, a determination may be made as to whether the keywords extracted from the personal academic web page candidate exceed a similarity threshold with the text of one or more of the profiles of the linked social media accounts. In some embodiments, the determination may be made for each profile, or across the text of all profiles. After a determination that the similarity threshold is exceeded, the method 1400 may proceed to the block 1480. After a determination that the similarity threshold is not exceeded, the method 1400 may proceed to the block 1470. In some embodiments, there may be a minimum number and/or percentage of linked social media account profiles that exceed the similarity threshold before the method 1400 proceeds to the block 1480 instead of the block 1470.

At block 1470, a determination may be made as to whether or not there are additional social media account candidates to have profiles of linked accounts fetched to compare with the keywords. If there are no other social media account candidates to be fetched, the method may proceed to the dashed arrow at the end of the method 1400. If there are additional social media account candidates to be fetched, the method 1400 may return to the block 1440.

At block 1480, based on the determination at the block 1460, the personal academic web page candidate and the social media account candidate may both be confirmed as being associated with the author. For example, the cross-validation via the keywords of the personal academic web page and the text of the profiles of the linked social media accounts of the social media account candidate may increase the likelihood for both the social media account candidate and the personal academic web page candidate to be correctly associated with the author. In some embodiments, the block 1480 may proceed to the dashed arrow at the end of the method 1400. Additionally or alternatively, the method 1400 may proceed from the block 1480 to the block 1470. For example, the method 1400 may return to the block 1470 as the author may have multiple social media accounts.

The dashed arrow at the end of the method 1400 may indicate that the cross-validated personal web page candidate and social media account candidate may be used by one or more processes or blocks, such as by the block 750 of the method 700 of FIG. 7. Additionally or alternatively, the dashed arrows may proceed to one or more of the methods 1000 of FIG. 10, 1100 of FIG. 11, 1200 of FIG. 12, or 1300 of FIG. 13.

Social Media Accounts as Sensors

In one or more embodiments, the present disclosure may include the use of social media accounts as sensors for identifying other knowledgeable social media accounts. For example, in determining whether a social media account is associated with a knowledgeable person, the social media accounts following and/or followed by a social media account may be analyzed. One or more embodiments of the present disclosure may leverage the ability of knowledgeable people to recognize and seek information from others who are knowledgeable on a particular topic. For example, a professor who publishes on machine learning may follow or be followed on social media by other people knowledgeable about machine learning. Additionally, those accounts followed by knowledgeable people may be more likely to be accounts of persons knowledgeable on a given topic than accounts following a knowledgeable person. For example, graduate students may follow a particular professor known to be knowledgeable on a given topic, but that may not mean that the particular professor considers insight from the graduate student as knowledgeable. By analyzing and utilizing the links in seed social media accounts of known knowledgeable people, the seed social media accounts may function as sensors in identifying social media accounts of other knowledgeable people. In some embodiments, various sets of candidate social media accounts may be generated and then analyzed to determine whether or not the candidates are knowledgeable accounts or may be included in some other category, such as a learner social media account. A knowledgeable social media account may refer to a social media account associated with a person who is knowledgeable on a given topic. A learner social media account may refer to a social media account associated with a person who is interested in a given topic but may or may not be knowledgeable on the given topic.

Figure 15:
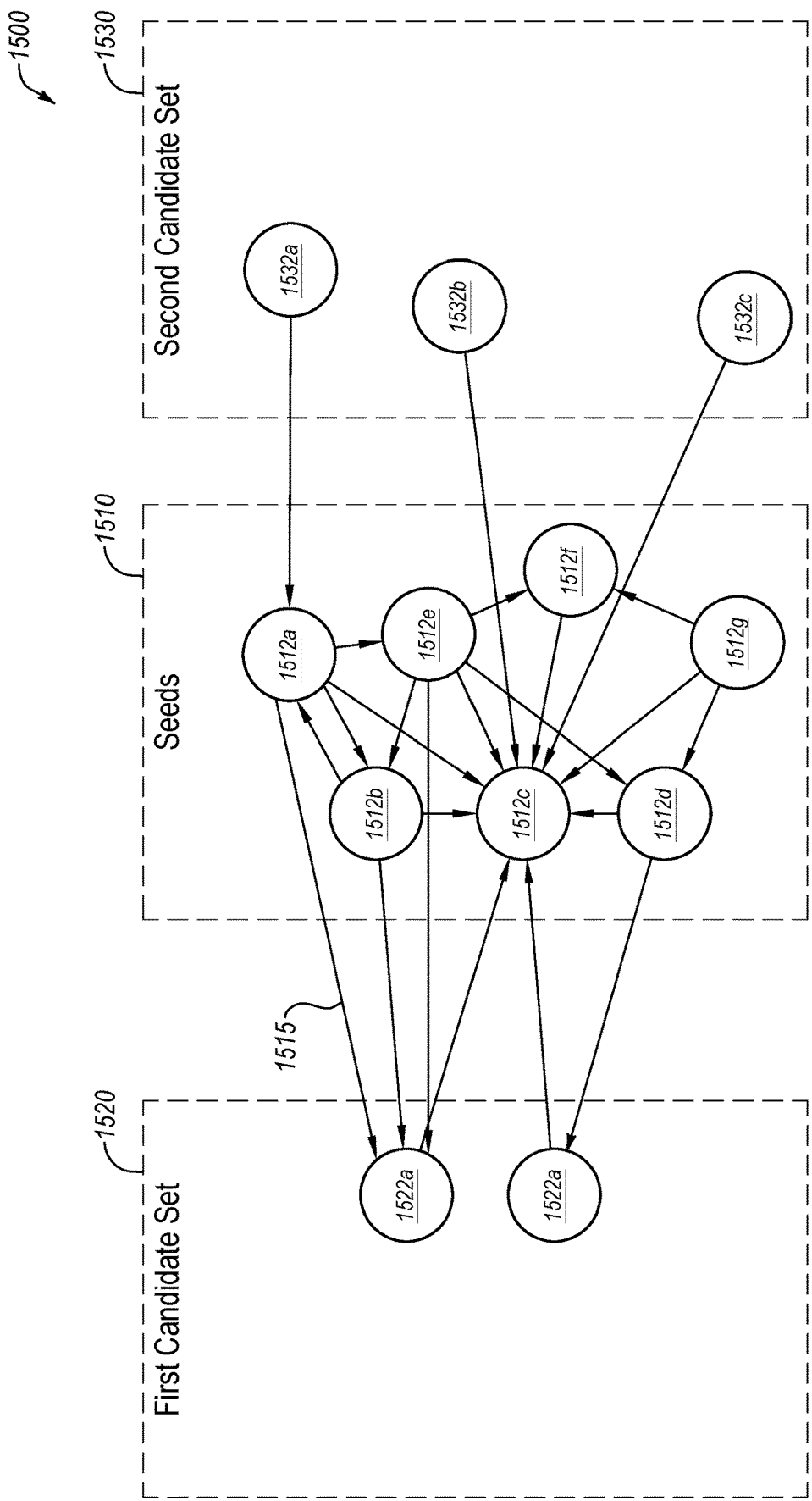
FIG. 15 illustrates an example schematic representation of generating candidate sets of social media accounts.

FIG. 15 illustrates an example schematic representation 1500 of generating candidate sets of social media accounts, in accordance with one or more embodiments of the present disclosure. In some embodiments, the schematic representation 1500 may illustrate a process or a portion of a process to identify social media accounts as candidates for knowledgeable social media accounts and/or learner social media accounts. In these and other embodiments, a portion of the process or a portion of a process illustrated by the schematic representation 1500 may be an example of the operation of the system 100 of FIG. 1. For example, in some embodiments, an information collection system 110 may be configured to generate the candidate sets as illustrated in the schematic representation 1500.

As illustrated in FIG. 15, a set of seed social media accounts 1510 may include one or more social media accounts 1512a-1512g (referred generally to as seed social media account(s) 1512). The set of seed social media accounts 1510 may include seed social media accounts 1512 known to be social media accounts knowledgeable about a given topic. For example, using a process of the present disclosure (such as illustrated in FIGS. 2 and/or 6), an author of a publication on a given topic may have a social media account associated with that author. The social media account associated with the author may be a social media account of a person knowledgeable on the topic of the publication. Such a social media account may be included as one of the seed social media accounts 1512. Additionally or alternatively, a user may submit themselves or another social media account as a social media account to be included as one of the seed social media accounts 1512. Any other method or process may be utilized to identify the seed social media accounts 1512, such as peer review, peer recommendation, university faculty identification, organization identification, or the like.

The arrows associated with the seed social media accounts 1512 may indicate social media accounts linked to the seed social media accounts 1512. For example, arrows going away from a given social media account may indicate social media accounts from which the given social media account obtains information, or social media accounts followed by the given social media account. Arrows going towards a given social media account may indicate social media accounts that obtain information from the given social media account, or social media accounts following the given social media account. For example, for the seed social media account 1512*a*, the seed social media account 1512*a* follows the social media accounts 1522*a*, 1512*b*, 1512*c* and 1512*e* and is followed by the social media accounts 1512*b* and 1532*e*. As another example, for the social media account 1522*a*, the social media account 1522*a* follows the social media account 1512*c* and is followed by the social media accounts 1512*a*, 1512*b*, and 1512*e*.

In some embodiments a first candidate set 1520 of social media accounts may be generated. For example, the first candidate set 1520 may be generated by fetching the social media account profiles of the seed social media accounts 1512 and identifying all social media accounts followed by the seed social media accounts 1512 and these accounts may be added to the first candidate set 1520 as social media accounts 1522*a* and 1522*b* (referred to as social media accounts 1522).

In some embodiments, one or more social media accounts may be removed from the first candidate set 1520. For example, the first candidate set 1520 may be analyzed to identify any social media accounts that are already in the set of seed social media accounts 1510. For example, the seed social media account 1512*a* follows the social media account 1512*b*. However, the social media account 1512*b* is already in the set of seed social media accounts 1510, and thus the social media account 1512*b* may be removed from the first candidate set 1520.

As another example, one or more of the social media accounts 1522 may be analyzed to determine whether they are owned by a person, an organization, a publication, a software vendor, a conference, or the like. For example, some conferences may include a Twitter account that generates social media posts that may be pertinent to a given topic, but is not associated with a person knowledgeable on the given topic. As another example, an organization may reference upcoming conferences or publications on a given topic, but is not associated with a person knowledgeable on the given topic. In some embodiments, social media accounts owned by actual people are included in the first candidate set 1520.

Figure 18:
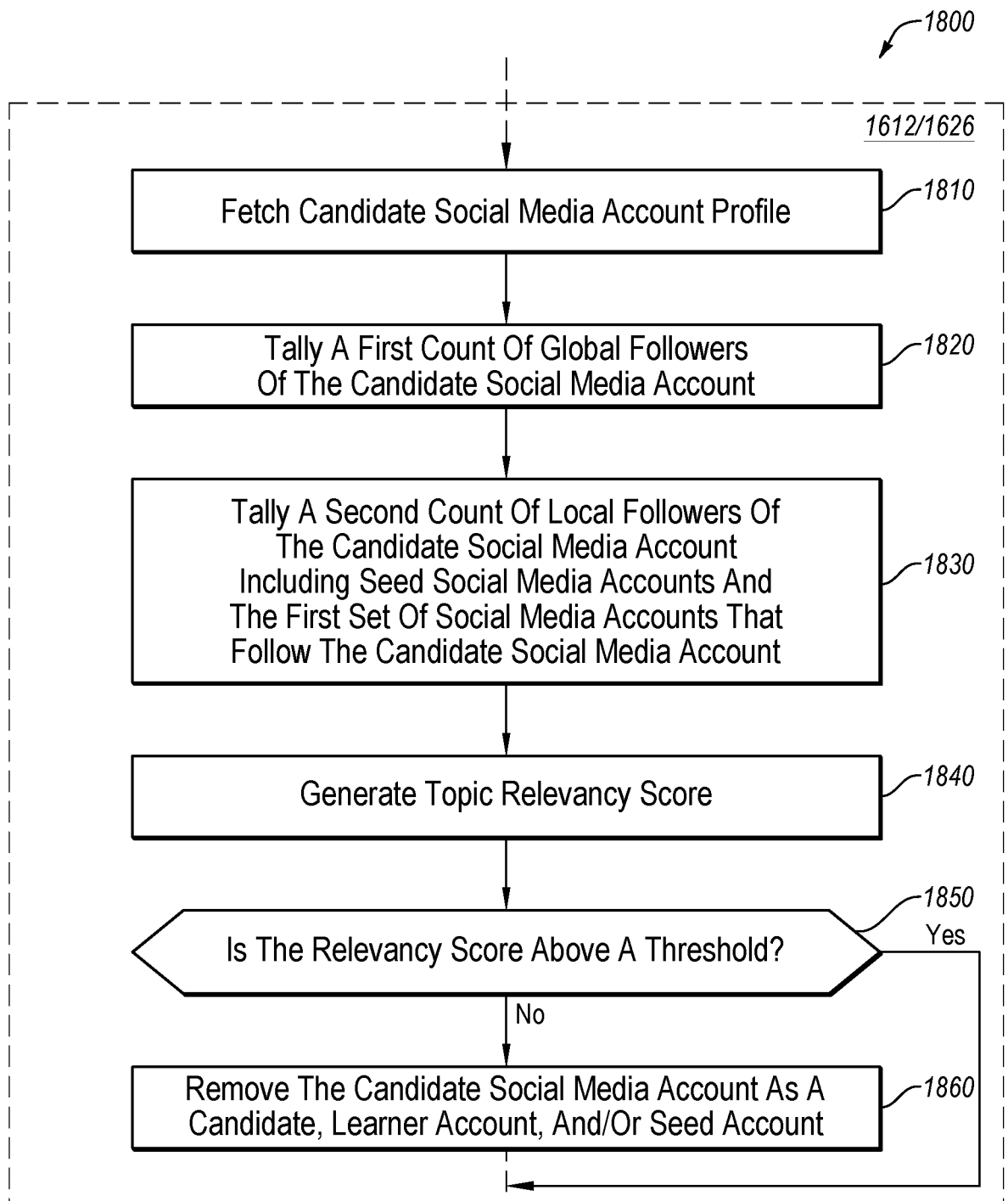
FIG. 18 illustrates a flowchart of another example method that may be used in information identification and extraction while using social media accounts as sensors.

Another example of social media accounts 1522 removed from the first candidate set 1520 may include social media accounts of general applicability, or generic social media accounts. For example, a popular movie star or political figure may be followed by multiple knowledgeable people on a topic, but that may not indicate that the movie star or political figure is necessarily knowledgeable on the topic. One or more embodiments of the present disclosure may remove such generic social media accounts. An example method of such an approach is illustrated in FIG. 18.

In some embodiments, the social media accounts 1522 of the first candidate set 1520 may be analyzed to determine whether the social media accounts 1522 may be included as seed social media accounts 1512. In some embodiments, such an analysis may include removing various social media accounts from the first candidate set 1520 and the remaining social media accounts 1522 may be added to the set of seed social media accounts 1510. Additionally or alternatively, additional analysis may be performed on the social media accounts 1522. In these and other embodiments, with the inclusion of additional seed social media accounts 1512, a process may be run using those newly added seed social media accounts to identify further seed social media accounts.

In addition or alternate to the first candidate set 1520, in some embodiments a second candidate set 1530 of social media accounts may be generated. For example, the second candidate set 1530 may be generated by fetching the social media account profiles of the seed social media accounts 1512 and identifying all social media accounts that follow the seed social media accounts 1512 and the following social media accounts may be added to the second candidate set 1530 as social media accounts 1532*a*-1532*c* (referred to as social media accounts 1532).

In some embodiments, one or more social media accounts may be removed from the second candidate set 1530. For example, the second candidate set 1530 may be analyzed to identify any social media accounts that are in the set of seed social media accounts 1510. For example, the seed social media account 1512*a* is followed by the social media account 1512*b*. However, the social media account 1512*b* is already in the set of seed social media accounts 1510, and thus the social media account 1512*b* may be removed from the second candidate set 1530. Additionally or alternatively, the second candidate set 1530 may be analyzed to identify any social media accounts that are already in the first candidate set 1520. For example, the social media account 1522*a* follows the seed social media account 1512*c* but is not in the set of seed social media accounts 1510. However, the social media account 1522*a* is already in the first candidate set 1520, and thus the social media account 1522*a* may be removed from the second candidate set 1530.

Another example of social media accounts 1532 removed from the second candidate set 1530 may include social media accounts of general applicability, or generic social media accounts in a similar or comparable manner to that described with reference to removing such accounts from the first candidate set 1520. An example method of such an approach is illustrated in FIG. 18.

In some embodiments, the social media accounts 1532 of the second candidate set 1530 may be analyzed to determine whether they may be included in a set of learner social media accounts. In some embodiments, such an analysis may include removing various social media accounts from the second candidate set 1530 and the remaining social media accounts 1532 may be added to the set of learner social media accounts. Additionally or alternatively, further analysis may be performed on the social media accounts 1532. For example, an analysis may be performed to determine an interest level of the social media account in a given topic.

In some embodiments, certain content may be delivered to the set of seed social media accounts 1510 and the set of learner social media accounts based on which set the social media account belongs to. For example, new publications may be provided to the set of seed social media accounts 1510 and lecture videos or class summaries may be provided to the set of learner social media accounts. In some embodiments, more advanced content may be provided to the set of seed social media accounts 1510 than is provided to the set of learner social media accounts. In such a manner, social media accounts may be utilized as sensors to identify and classify certain social media accounts based indirectly on human perception of the knowledge level of the owner of the social media account.

Modifications, additions, or omissions may be made to the schematic representation 1500 without departing from the scope of the present disclosure. For example, the schematic representation 1500 may include other sets or groups of social media accounts, such as a set of learner social media accounts. Additionally or alternatively, additional features or details of analyses described with respect to FIG. 15 may be described with reference to FIGS. 16a-18.

Figure 16A:
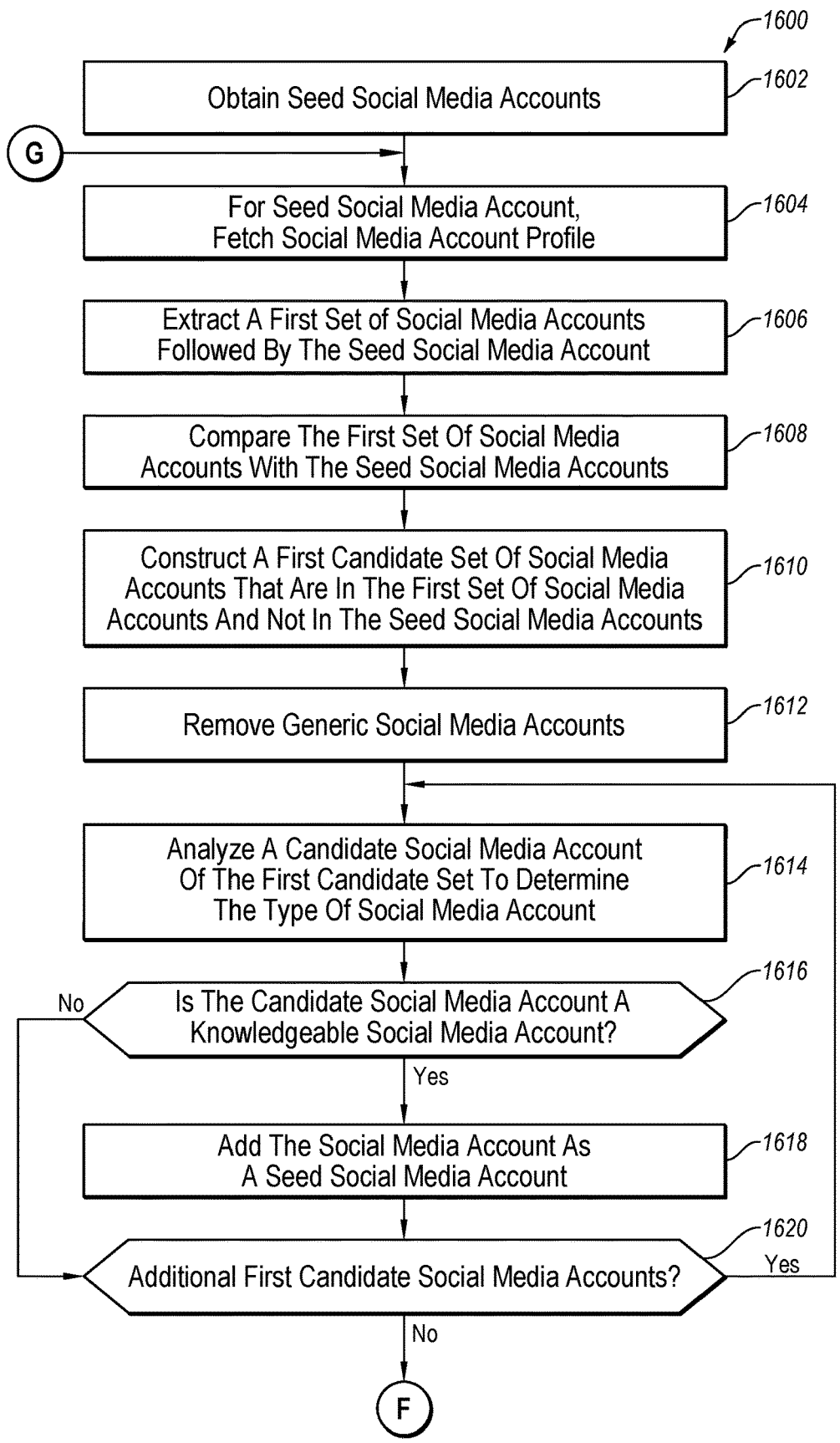
FIGS. 16a and 16b illustrate a flowchart of an example method of information identification and extraction while using social media accounts as sensors.
Figure 16B:
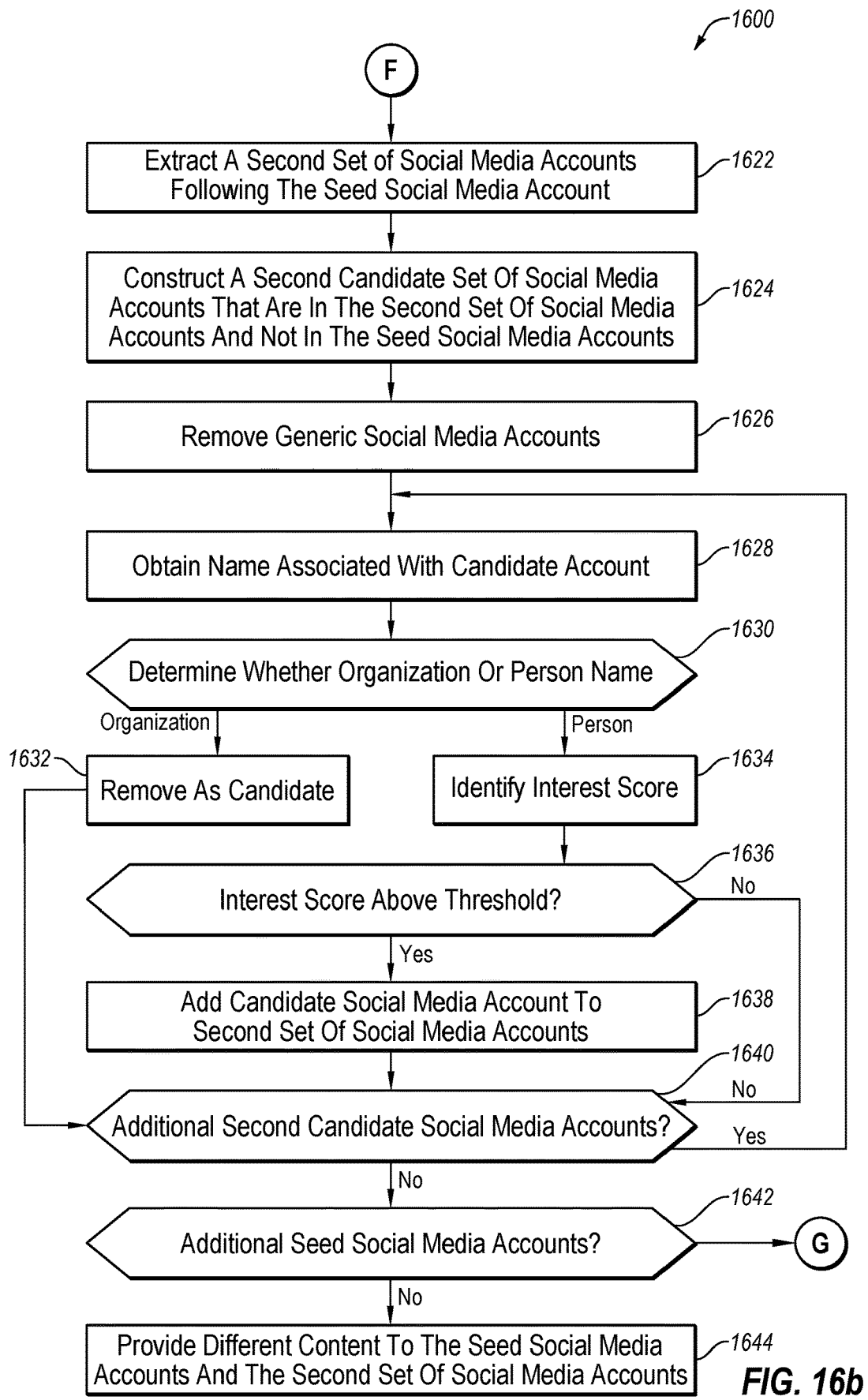

FIGS. 16a and 16b illustrate a flowchart of an example method 1600 of information identification and extraction while using social media accounts as sensors, in accordance with one or more embodiments of the present disclosure. In some embodiments, one or more of the operations associated with the method 1600 may be performed by the information collection system 110. Alternately or additionally, the method 1600 may be performed by any suitable system, apparatus, or device. For example, the processor 2310 of the system 2300 of FIG. 23 may perform one or more of the operations associated with the method 1600. Although illustrated with discrete blocks, the steps and operations associated with one or more of the blocks of the method 1600 may be divided into additional blocks, combined into fewer blocks, or eliminated, depending on the desired implementation.

At block 1602, seed social media accounts may be obtained. For example, an information collection system (such as the information collection system 110 of FIG. 1) may be provided a set of predetermined social media accounts that are knowledgeable on a given topic. Additionally or alternatively, the information collection system may identify one or more social media accounts associated with an author of a publication, for example, using one or more of the processes, systems, or devices of the present disclosure such as the flows of FIGS. 2 and/or 6.

At block 1604, for a given seed social media account, the social media account profile may be fetched. For example, the information collection system may query a social media system (such as one or more of the social media systems 130 of FIG. 1) to retrieve the profile of the social media account candidate. In some embodiments, only the profile is fetched such that the information collection system need not receive the entire social media account.

At block 1606, a first set of social media accounts may be extracted from the profile as social media accounts followed by the seed social media account. For example, a portion of the profile that includes a field that identifies social media accounts followed by the seed social media account may be identified and the social media accounts listed therein may be extracted as the first set of social media accounts.

At block 1608, the first set of social media accounts may be compared with the seed social media accounts. For example, such a comparison may identify any social media accounts that are in both the first set of social media accounts and the seed social media accounts.

At block 1610, a first candidate set of social media accounts may be constructed based on the comparison of the block 1608. For example, the first candidate set of social media accounts may include the social media accounts that are in the first set of social media accounts and not in the seed social media accounts. In some embodiments, the blocks 1608 and 1610 may occur simultaneously, for example, by removing the social media accounts in both the first set of social media accounts and the seed social media accounts as they are identified, and the remaining social media accounts of the first set becoming the first candidate set of social media accounts.

At block 1612, one or more generic social media accounts may be removed from the first candidate set of social media accounts. For example, social media accounts of celebrities may be followed by one or more of the seed accounts, but may not be knowledgeable regarding the topic about which the seed social media accounts are knowledgeable. An example of removing one or more generic social media accounts is described with reference to FIG. 18.

At block 1614, a candidate social media account of the first candidate set may be analyzed to determine a type of social media account. For example, an analysis may be performed to determine whether the candidate social media account is owned by a person or by an organization (such as a journal, conference, software tool, organization, or the like). As another example, an analysis may be performed to determine whether the candidate social media account has an interest score on a given topic above a threshold to determine whether the candidate social media account is a knowledgeable account. As another example, an analysis may be performed to determine whether an interest level of the candidate social media account is above a threshold. An example method of such an analysis is described, for example, in FIG. 17.

At block 1616, a determination may be made as to whether the candidate social media account is a knowledgeable social media account. For example, the determination may be based on the analysis performed at block 1614. After a determination that the candidate social media account is a knowledgeable account, the method 1600 may proceed to block 1618. After a determination that the candidate social media account is not a knowledgeable account, the method 1600 may proceed to block 1620.

At block 1618, the candidate social media account may be added as a seed social media account.

At block 1620, a determination may be made as to whether there are additional candidate social media accounts in the first set of social media account candidates. If there are additional candidates, the method 1600 may return to the block 1614. If there are no additional candidates, the method 1600 may proceed to block 1622.

With reference to FIG. 16b, at block 1622, a second set of social media accounts that are following the seed social media account may be extracted. For example, a portion of the profile that includes a field that identifies social media accounts that are following the seed social media account may be identified and the social media accounts listed therein may be extracted as the second set of social media accounts.

At block 1624, a second candidate set of social media accounts may be constructed. For example, the second candidate set of social media accounts may include the social media accounts that are in the second set of social media accounts extracted at block 1622, and not included in the first candidate set of social media accounts and the seed social media accounts. In some embodiments, the social media accounts in the second set of social media accounts may be compared to the seed social media accounts and the first candidate set of social media accounts and overlapping accounts may be removed from the second set of social media accounts, yielding the second candidate set of social media accounts.

At block 1626, one or more generic social media accounts may be removed from the second set of candidate social media accounts. The block 1626 may be similar or comparable to the block 1612, but performed on the second rather than the first set of candidate social media accounts.

At block 1628, a name associated with a candidate of the second candidate set of social media accounts may be obtained. For example, a social media system may be requested to provide a profile of the candidate social media account. As another example, a social media system may be queried to provide the name associated with a particular social media account without requesting or receiving additional data regarding the social media account.

At block 1630, a determination may be made as to whether the name associated with the candidate account is an organization account or a person name. For example, a textual analysis may be performed on the name obtained at block 1628 to determine if one or more indicators of an organization are present, such as the words "journal," "the" "inc." "co." "package," "group," or the like. Additionally or alternatively, the name obtained at block 1628 maybe compared to a name database to identify textual terms typically used as a name, such as "John," "Andrew," or "Sarah." In some embodiments, an information collection system may maintain a database of known organizations related to a topic (such as conferences, journals, universities, software vendors, and/or standards-settings bodies) and may compare the name with entries in the database of known organizations. In these and other embodiments, after a determination that the name is an organization, the method 1600 may proceed to block 1632. Additionally or alternatively, after a determination that the name is an organization, the organization may be added as another entry in the database of known organizations. After a determination that the name is a person, the method 1600 may proceed to block 1634.

At block 1632, based on the name being an organization name, the candidate social media account may be removed from the second set of candidate social media accounts. After block 1632, the method 1600 may proceed to the block 1640.

At block 1634, based on the name being a person name, an interest score may be identified representing the person's interest in a given topic. For example, the interest score may be based on a number of keywords related to the given topic that appear in social media posts of the candidate social media account. Additionally or alternatively, the interest score may be based on a percentage of social media posts of the candidate social media account that include a threshold number of keywords related to the given topic. Additionally or alternatively, the interest score may be based on interactions of the candidate social media account with one or more social media posts that include one or more keywords related to the given topic. In some embodiments, the interest score of the candidate may be based on any combination of the foregoing, or any other method to identify one or more topics of interest of a social media account.

At block 1636, a determination may be made as to whether the interest score is above a threshold. In some embodiments, the threshold level may be based on the popularity of a topic. Additionally or alternatively, the threshold level may be based on how frequently keywords related to the topic are used outside of the context of the topic. For example, the terms "machine" and "learning" may be used frequently outside of an academic context, while the term "Naive Bayes" is infrequently used outside of an academic context. After a determination that the interest score exceeds a threshold, the method 1600 may proceed to block 1638. After a determination that the interest score does not exceed the threshold, the method 1600 may proceed to block 1640.

At block 1638, the candidate social media account may be added to a second set of social media accounts based on the determination made at block 1636 that the interest score exceeds the threshold. For example, the second set of social media accounts may be a set of learner social media accounts. The second set of social media accounts may be those accounts that desire to obtain information on a particular topic while not necessarily having expertise or peer-recognized knowledge relative to the topic.

At block 1640, a determination may be made as to whether there are additional candidate social media accounts within the second set of candidate social media accounts that have not been analyzed. After a determination that there are remaining candidate accounts, the method 1600 may return to the block 1628. After a determination that there are no additional candidate social media accounts, the method 1600 may proceed to block 1642.

At block 1642, a determination may be made as to whether there are additional seed social media accounts that have not been analyzed. After a determination that there are additional seed social media accounts, the method 1600 may return to the block 1604. If there are no additional seed social media accounts, the method 1600 may proceed to block 1644.

At block 1644, different content may be provided to the seed social media accounts and the second set of social media accounts. In some embodiments, the different content may be related to the same topic but may be different for the two groups. For example, the seed social media accounts (which are known to be knowledgeable on a given topic) may be provided with first content, such as new publications, findings, or the like, related to the topic. The second set of social media accounts (which are known to be interested in the topic, but not necessarily knowledgeable on the topic) may be provided lecture notes, videos of lectures, class presentations, abstracts, or the like, related to the topic.

In some embodiments, the first and/or second sets of candidate social media accounts may be generated for all seed social media accounts before the first and/or second sets of candidate social media accounts are analyzed. Such an approach may avoid potentially duplicative analysis of candidate social media accounts. In these and other embodiments, after analyzing the candidates, any additional seed accounts may then be processed to generate additional candidate social media accounts. As another example, any of the blocks 1622 through 1640 may be omitted such that just the first candidate set is constructed and analyzed. Additionally or alternatively, just the second candidate set may be constructed and analyzed.

Figure 17:
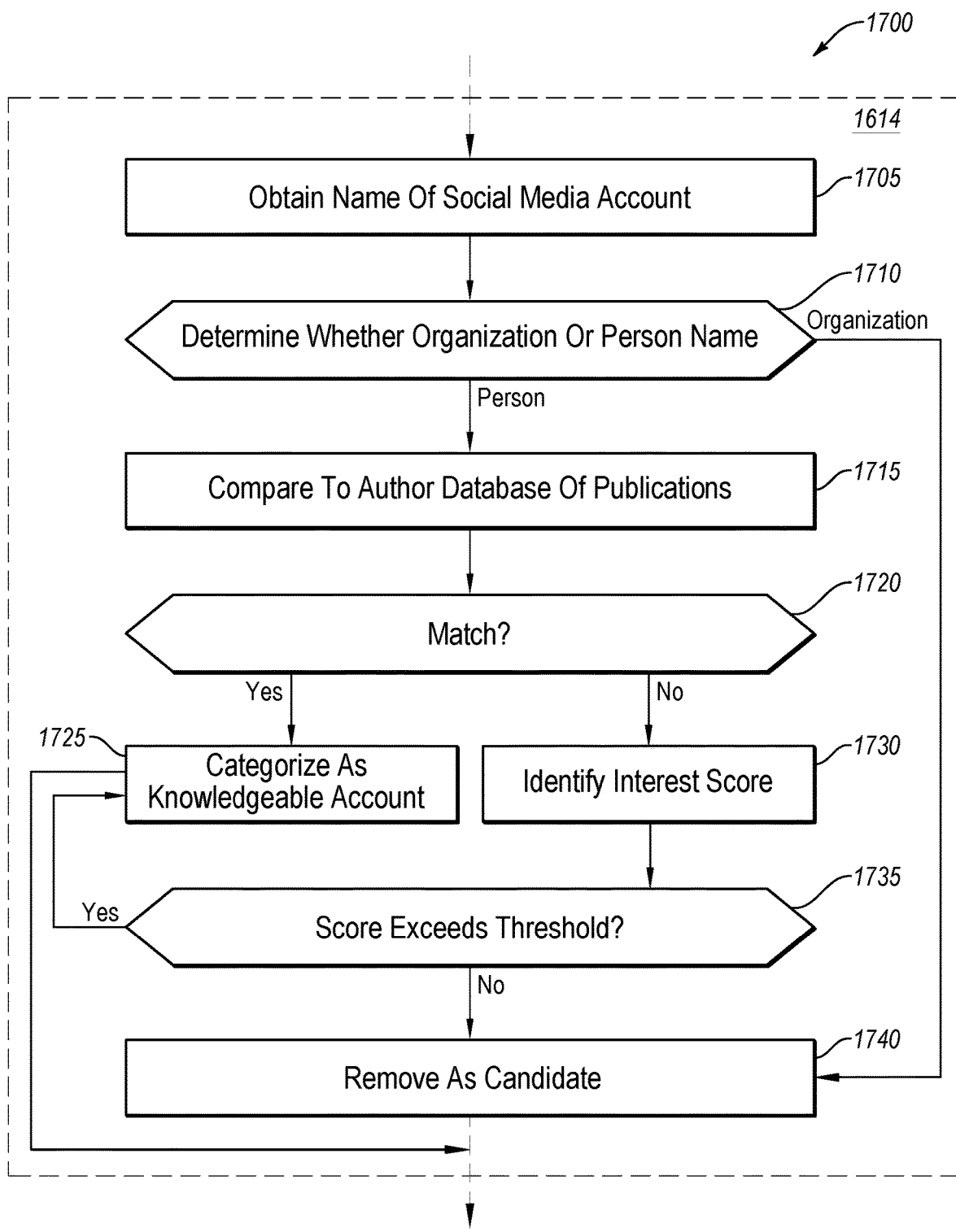
FIG. 17 illustrates a flowchart of an example method that may be used in information identification and extraction while using social media accounts as sensors.

FIG. 17 illustrates a flowchart of an example method 1700 that may be used in information identification and extraction while using social media accounts as sensors, in accordance with one or more embodiments of the present disclosure. While articulated with respect to one social media account, the method 1700 may be repeated for any number of social media accounts. The method 1700 may reflect one embodiment of performing one or more operations of the block 1614 of FIG. 16. In some embodiments, one or more of the operations associated with the method 1700 may be performed by the information collection system 110. Alternately or additionally, the method 1700 may be performed by any suitable system, apparatus, or device. For example, the processor 2310 of the system 2300 of FIG. 23 may perform one or more of the operations associated with the method 1700. Although illustrated with discrete blocks, the steps and operations associated with one or more of the blocks of the method 1700 may be divided into additional blocks, combined into fewer blocks, or eliminated, depending on the desired implementation.

The dashed arrow leading into block 1705 indicates that method 1700 may be a continuation of another method, such as continuing from block 1612 or 1620 of the method 1600 of FIG. 16.

At block 1705, a name may be obtained for a social media account that is a candidate social media account in a set of candidate social media accounts. The block 1705 may be similar or comparable to the block 1628 of FIG. 16.

At block 1710, a determination may be made as to whether the name is an organization name or a person name. The block 1710 may be similar or comparable to the block 1630 of FIG. 16. After a determination that the name is an organization name, the method 1700 may proceed to block 1740. After a determination that the name is a person name, the method 1700 may proceed to the block 1715.

At block 1715, based on the name being a person name, the name may be compared to one or more author names in a database of publications. For example, an information collection system (such as the information system 110 of FIG. 1) may include a database of publications and/or authors of publications and the name may be compared to such a database to determine if the name appears as an author on one or more publications.

At block 1720, a determination may be made as to whether there is a match between the person name and the authors in the database of publications. In some embodiments, the match may include an exact match, an exact last name match, an approximate percentage match (such as an 80% match), or some other variation thereof. For example, for an author name of Andrew Ng, in various embodiments, depending on the matching criteria, any of the following may be considered a match: Andy Ng, A. Ng, Drew Ng, Andi Ng, Andrew G. Ng, Dr. Ng, Doctor Ng, or the like. After a determination that the name does match, the method 1700 may proceed to the block 1725. After a determination that the name does not match, the method 1700 may proceed to block 1730.

At block 1725, based on the name matching an author name in the database, the candidate account may be categorized as a knowledgeable account, and the method 1700 may then proceed to the dashed lines at the end of the method 1700.

At block 1730, based on the name not matching an author in the database, an interest score may be identified for the candidate account. The block 1730 may be similar or comparable to the block 1634 of FIG. 16*b*.

At block 1735, a determination may be made as to whether the interest score of the candidate exceeds a threshold. In some embodiments, the threshold may be based on the rarity of the topic, a number of publications on a given topic, or any other of a variety of factors. After a determination that the interest score exceeds the threshold, the method may proceed to the block 1725. After a determination that the interest score does not exceed the threshold, the method 1700 may proceed to the block 1740.

At block 1740, the candidate may be removed from the set of candidate social media accounts. For example, the interest score being below the threshold may indicate that the account is not a knowledgeable account on the given topic. Therefore, the account may be removed as a potential candidate of a knowledgeable account. After the block 1740, the method 1700 may proceed from block 1740 to return to the method from which it was a continuation. For example, the method 1700 may proceed from the block 1745 to the block 1620 of FIG. 16.

The dashed arrow at the end of the method 1700 may indicate that the categorized social media account candidate may be used by one or more processes or blocks, such as by the block 1616 and/or the block 1620 of the method 1600 of FIG. 16 where a determination is made as to whether the account is a knowledgeable social media account. Additionally or alternatively, the dashed arrows may indicate that a social media account is not knowledgeable and has been removed from the candidate list.

FIG. 18 illustrates a flowchart of another example method 1800 that may be used in information identification and extraction while using social media accounts as sensors, in accordance with one or more embodiments of the present disclosure. While articulated with respect to one candidate social media account, the method 1800 may be repeated for any number of social media accounts, for example, to remove all generic social media accounts from the set of candidate social media accounts. Additionally or alternatively, the method 1800 may be performed for either or both of the first candidate set or the second candidate set of social media accounts. The method 1800 may reflect one embodiment of performing one or more operations of the blocks 1612 and/or 1626 of FIG. 16. In some embodiments, one or more of the operations associated with the method 1800 may be performed by the information collection system 110. Alternately or additionally, the method 1800 may be performed by any suitable system, apparatus, or device. For example, the processor 2310 of the system 2300 of FIG. 23 may perform one or more of the operations associated with the method 1800. Although illustrated with discrete blocks, the steps and operations associated with one or more of the blocks of the method 1800 may be divided into additional blocks, combined into fewer blocks, or eliminated, depending on the desired implementation.

The dashed arrow leading into block 1810 indicates that method 1800 may be a continuation of another method, such as continuing from block 1610 or 1624 of the method 1600 of FIG. 16.

At block 1810, a candidate social media account profile may be fetched. The block 1810 may be similar or comparable to the block 1604 except the candidate social media account profile may be fetched rather than a seed social media account profile.

At block 1820, a first count of global followers of the candidate social media account may be tallied. For example, a generic count may be made of all followers of the candidate social media account. In some embodiments, rather than fetching the profile and tallying the number of followers listed in the profile, one or more social media systems may be queried to provide a numerical value of the number of followers of a particular social media account. For example, if the candidate account has 1.3 million followers, the global followers tally may be 1.3 million. As another example, if the candidate account has 410 followers, the global followers tally may be 410.

At block 1830, a second count of local followers of the candidate social media account may be tallied. For example, the local follower social media accounts may include candidate social media accounts from the first set of candidate social media accounts and/or the set of seed social media accounts that are following the candidate social media account. In some embodiments, the local follower social media accounts may additionally include the second set of candidate social media accounts. For example, if there are 50 seed accounts following a social media account and 20 accounts from the first set of candidate social media accounts following the social media account, the local followers tally may be 70.

At block 1840, a topic relevancy score may be generated. The topic relevancy score may represent what portion of followers of the candidate social media account are knowledgeable or potentially knowledgeable about a given topic. For example, the topic relevancy score may be generated as the quotient of the local followers tally divided by the global followers tally. Using the first of the two examples above, the topic relevancy score may be determined as 70/1.3 million, or approximately $5.384 \times 10^{-5}$. For the second example, the topic relevancy score may be determined as 70/410, or approximately 0.1707.

At block 1850, a determination may be made as to whether the relevancy score is above a threshold. In some embodiments, the threshold may be based on the topic, or may be independent of the topic. For example, some topics may be more popular so there may be more people following that topic, which may make the relevancy score higher. In some embodiments, using the numerical examples above, the threshold may be between 0.01 and 0.0001, although the threshold may more generally take any value. After a determination that the relevancy score is above the threshold, the method 1800 may proceed to the dashed arrows at the end of the method 1800. After a determination that the relevancy score is below the threshold, the method 1800 may proceed to block 1860.

At block 1860, the candidate social media account may be removed from a set of candidate social media accounts. For example, based on the relevancy score not being above the threshold, the candidate social media account may be categorized as a generic social media account. Such a generic social media account may be removed from the first and/or second set of candidate social media accounts. Additionally or alternatively, such a generic social media account may be removed from a set of learner social media accounts, and/or seed social media accounts.

The dashed arrow at the end of the method 1800 may indicate that the abbreviated set of candidate social media accounts may be used by one or more processes or blocks, such as by the block 1614 and/or the block 1628 of the method 1600 of FIG. 16.

Mutually Reinforcing Ranking of Social Media Accounts and Contents

In one or more embodiments, the present disclosure provides a ranking of social media accounts and social media contents by modeling a mutually reinforcing relationship between the social media accounts and social media contents based on social media account types. The present disclosure may identify good social media accounts having domain-specific knowledge and recommend good domain-specific content based on the mutually reinforcing ranking that accounts for social media account types. Taking twitter as an example social media service, a twitter account may be created (e.g., owned) by a person, a corporation, an academic institution, a trade conference, an academic conference, an organization, a publication, a software vendor, or the like. A twitter account that repeatedly or consistently tweets or retweets good content in a specific domain may be considered a good twitter account having expertise that particular domain. Also, content that is tweeted or retweeted by many good twitter accounts in a specific domain may be considered good content in that particular domain. One or more embodiments of the present disclosure may leverage the relationship between the good twitter accounts having domain-specific expertise and good domain-specific content to rank the good twitter accounts having domain-specific expertise and good domain specific content based on twitter account types. In the description that follows, twitter accounts will be used as example social media accounts, and tweets and retweets will be used as example social media posts or promotions. Notwithstanding the examples with reference to twitter, those of ordinary skill in the art will appreciate that the various embodiments described herein are applicable to any of the numerous social media services.

Figure 19:
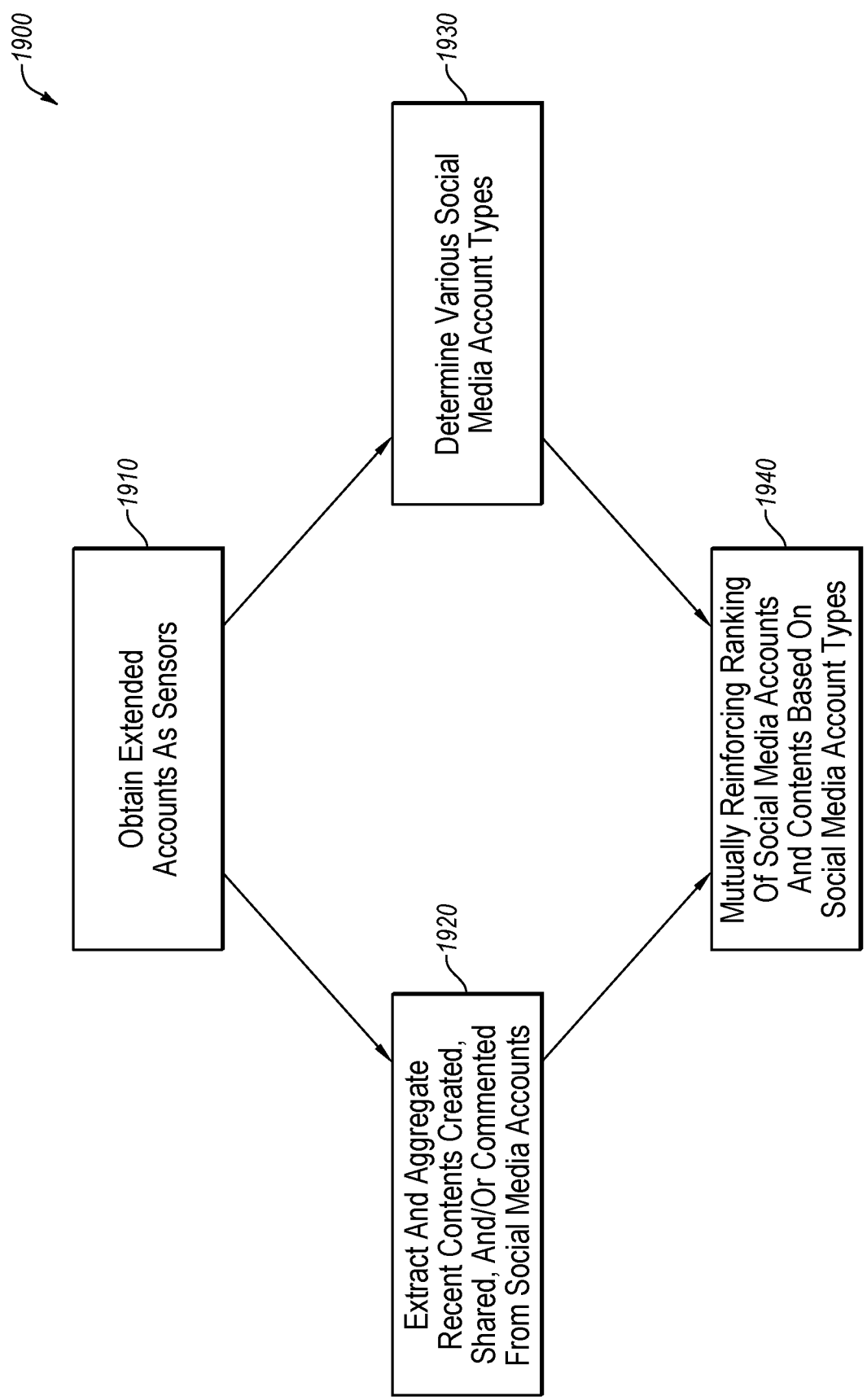
FIG. 19 is a diagram of an example flow that may be used with respect to mutually reinforcing ranking of social media accounts and contents based on social media account types.

FIG. 19 is a diagram of an example flow 1900 that may be used with respect to mutually reinforcing ranking of social media accounts and contents based on social media account types, in accordance with one or more embodiments of the present disclosure. In some embodiments, the flow 1900 may illustrate a process or a portion of a process to determine a mutually reinforcing ranking of social media accounts and social media contents based on social media account types. In these and other embodiments, a portion or all of the flow 1900 may be an example of the operation of the system 100 of FIG. 1. For example, in some embodiments, an information collection system 110 may be configured to generate the mutually reinforcing ranking of social media accounts and contents based on social media account types as illustrated in the flow 1900.

The flow 1900 may begin at block 1910, where extended accounts may be obtained as sensors. The accounts may be social media accounts, and the extended accounts may be extended seed social media accounts having domain-specific knowledge. The extended seed social media accounts with domain-specific knowledge may include seed social media accounts associated with people known to be knowledgeable persons on a given topic (e.g., the seed social media accounts 1510 of FIG. 15), and the social media accounts followed by the knowledgeable persons that are not already seed social media accounts (e.g., the first candidate set 1520 of FIG. 15). In some embodiments, the extended seed social media accounts having domain-specific knowledge may be used as sensors for identifying or discovering domain-specific contents and for identifying or determining the various types of social media accounts. Mutually reinforcing methods may be applied to identify informative social media accounts and recommend domain-specific contents in social media based on social media account types.

At block 1920, recent contents created, shared, and/or commented from the extended social media accounts may be extracted and aggregated. In some embodiments, social media posts or promotions that include links to contents may be considered, and the social media posts or promotions that do not include links to contents may be discarded (e.g., not considered in generating the mutually reinforcing ranking of social media accounts and contents). The links included within the social media postings from the extended social media accounts may be accessed and the contents extracted. The extracted content may be aggregated. In an example of twitter as the social media service, tweets or retweets from the extended twitter accounts (e.g., twitter accounts having domain-specific knowledge) that include links may be considered, and tweets or retweets that do not include links may be discarded. For each tweet, a link within the tweet may be followed to a target web page, and the contents from the target web page may be extracted. The extracted contents from the tweets may be aggregated. Accordingly, a tweet or retweet (e.g., tweeting or retweeting) that includes a link may be considered as a type of vote (e.g., voting) in the sense that, content (e.g., an article, publication, and the like) tweeted or retweeted (e.g., voted) by more people may be considered good content. Conversely, content tweeted or retweeted by less people may be considered not as good content.

In some embodiments, for each extended social media account of the extended social media accounts, contents created, shared, and/or commented from the most recent specific number of postings (e.g., most recent 1,000 postings, most recent 1,100 postings, etc.) may be extracted and aggregated. In the example of twitter, for each extended twitter account, the contents from the most recent specific number of tweets or retweets may be extracted and aggregated. That is, links included in the most recent specific number of tweets or retweets may be followed to corresponding target web pages, and the contents from the target web pages may be extracted and aggregated. In some embodiments, for each extended social media account of the extended social media accounts, contents created, shared, and/or commented from the postings made within a specific time period or time point (e.g., postings within the preceding one week, postings within the preceding two weeks, postings within the preceding one month, etc.) may be extracted and aggregated.

At block 1930, a determination may be made as to the various types of social media accounts that are included in the extended social media accounts having domain-specific knowledge. The seed social media accounts associated with people known to be knowledgeable persons on a given topic (e.g., the seed social media accounts 1510 of FIG. 15) may be social media accounts created by a person. For example, an author of a publication on a given topic or domain may have a social media account associated with that author. The social media account associated with the author may be a social media account of a person knowledgeable on the topic or domain of the publication. Such a social media account may be considered a personal social media account (e.g., personal social media account type). The social media accounts followed by the knowledgeable persons that are not already seed social media accounts (e.g., the first candidate set 1520 of FIG. 15) may be social media accounts created by persons, corporations, academic institutions, trade conferences, academic conferences, organizations, publications, software vendors, or the like. A determination may be made as to the types of social media accounts that are included in the social media accounts followed by the knowledgeable persons that are not already seed social media accounts. For example, for each of the social media accounts that are included in the social media accounts followed by the knowledgeable persons that are not already seed social media accounts, an analysis may be performed to determine whether the specific social media account is owned by a person, a corporation, an academic institution, a trade conference, an academic conference, an organization, a publication, a software vendor, or the like (e.g., personal social media account type, corporate social media account type, academic institution social media account type, trade conference social media account type, etc.). An example technique to determine the various types of social media accounts included in the extended social media accounts having domain-specific knowledge is illustrated in FIGS. 20a and 20b.

At block 1940, a mutually reinforcing ranking of the social media accounts and social media contents based on social media account types may be generated. For example, mutually reinforcing methods may be applied to identify the extended social media accounts having domain-specific knowledge (e.g., identify informative social media accounts) and recommend the contents created, shared, and/or commented from the extended social media accounts having domain-specific knowledge based on the mutually reinforcing ranking. In particular, the mutually reinforcing ranking may be based on the social media account types of the extended social media accounts having domain-specific knowledge. Such a process consistent with the present disclosure is described with additional detail with respect to FIG. 21.

Figure 20A:
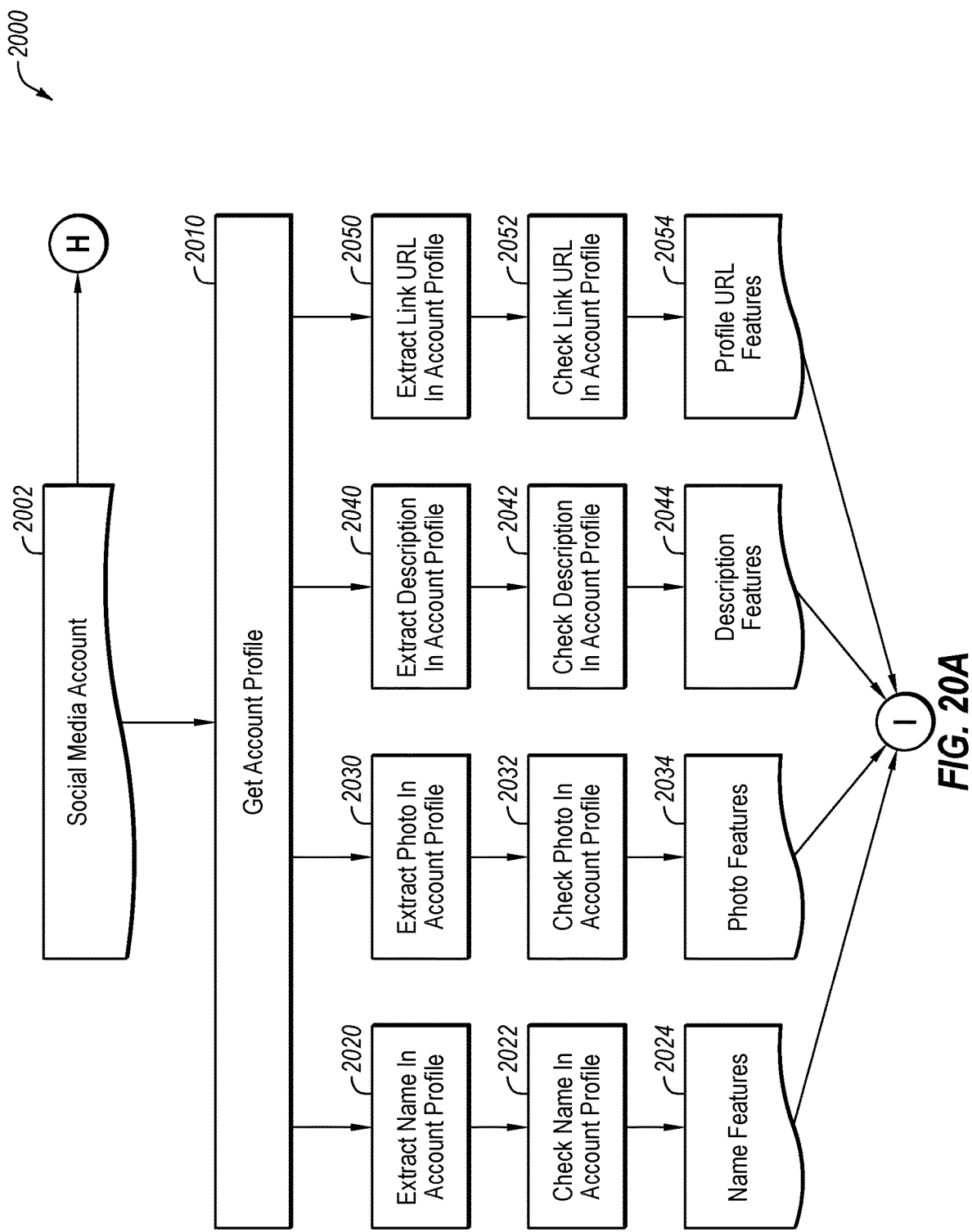
FIGS. 20a and 20b illustrate a diagram of an example flow that may be used with respect to determination of social media account type.
Figure 20B:
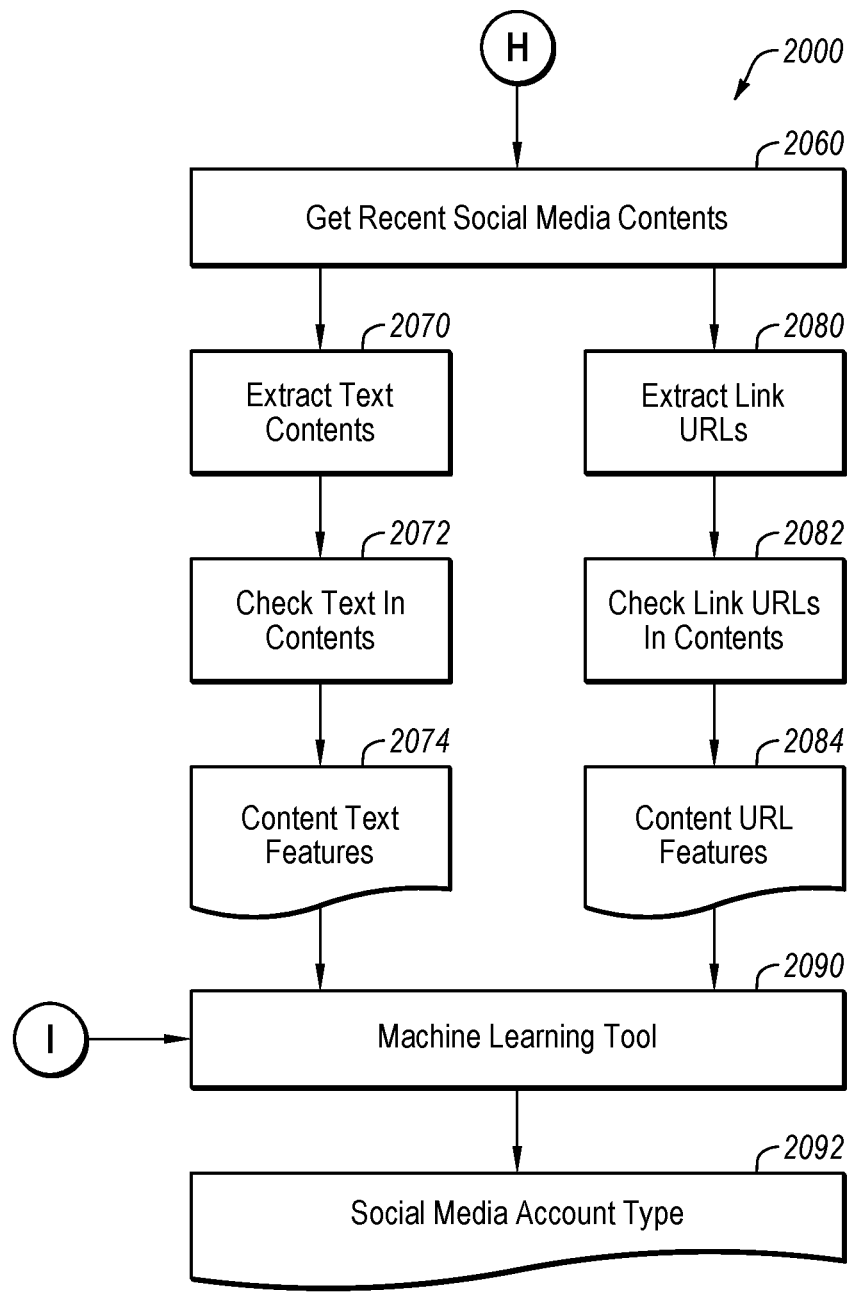

FIGS. 20a and 20b illustrate a diagram of an example flow 2000 that may be used with respect to determination of social media account type, in accordance with one or more embodiments of the present disclosure. In some embodiments, the flow 2000 may illustrate a process or a portion of a process to determine a social media account type for a social media account. That is, the flow 2000 may illustrate a process or a portion of a process to identify what type of social media account a social media account is. In these and other embodiments, a portion or all of the flow 2000 may be an example of the operation of the system 100 of FIG. 1. For example, in some embodiments, an information collection system 110 may be configured to, for each social media account included in the extended seed social media accounts having domain-specific knowledge, determine the type of social media account as illustrated in the flow 2000.

The flow 2000 may begin at block 2010, where an account profile corresponding to a social media account 2002 may be obtained. The social media account 2002 may be a social media account included in the extended seed social media accounts having domain-specific knowledge, and the social media account 2002 may be obtained or retrieved for determining a social media account type corresponding to the social media account 2002 in accordance with the flow 2000. In some embodiments, the social media account 2002 may be one of the social media accounts followed by the knowledgeable persons that are not already seed social media accounts (e.g., the first candidate set 1520 of FIG. 15) included in the extended seed social media accounts having domain-specific knowledge. In this instance, the seed social media accounts associated with people known to be knowledgeable persons on a given topic (e.g., the seed social media accounts 1510 of FIG. 15) included in the extended seed social media accounts having domain-specific knowledge may be social media accounts created by a person, and may be considered a personal social media account (e.g., personal social media account type).

The account profile may include information regarding the entity that owns, operates, or is associated with the social media account 2002. The entity that owns, operates, or is associated with the social media account may be referred to as a social media account owner. The account profile may include a name, a photo, a description, a link URL, and other information regarding the social media account owner. For example, the account profile may be a web page.

At block 2020, a name associated with the social media account 2002 may be extracted from the obtained account profile. The name may be a string or character string included in the account profile web page. For example, the account profile web page may be parsed and/or searched for a character string that may indicate a name. The extracted name may be a name of the social media account owner (e.g., the owner of social media account 2002). For example, the name may be a name of a person, a name of a journal, a name of a corporation, a name of a conference, and the like.

At block 2022, the extracted name may be checked to generate a name features 2024. The name features 2024 may be a vector of numerical features or signals that represents the extracted name. That is, the name features 2024 may be a numerical representation of the extracted name. In some embodiments, the extracted name may be checked against one or more databases of known names, such as an author name database, a common name database, a conference name database, a corporate name database, a name keyword database, and the like. The author name database may include the names of authors of published papers or publications in a specific domain or topic, such as computer science, electrical engineering, machine learning, and the like. The common name database may include common names of people, such as "Dave", "Diana", "Susan", and the like. The conference name database may include the names of conferences, trade shows, and the like. The corporate name database may include the names of corporations, companies, and the like. The name keyword database may include specific keywords accumulated from existing names of various social media account types, such as "machines", "research", "conference", and the like. If a match is found between the extracted name and a name in one of the databases, the name features 2024 may be set to indicate or represent the specific type of name. For example, if the extracted name matches a name of an author in the author name database, the name features 2024 may be set to indicate that the extracted name is that of an author. In another example, if the extracted name matches a common name in the common name database, the name features 2024 may be set to indicate that the extracted name is a common name. In still another example, if the extracted name includes or contains a specific keyword in the name keyword database, the name features 2024 may be set to indicate that the extracted name contains a specific keyword. If a match is found between the extracted name and a name in one of the databases, the name features 2024 may be set to indicate that the extracted name is not found in any of the name databases.

At block 2030, a photo associated with the social media account 2002 may be extracted from the obtained account profile. The photo may be an image included in the account profile web page. The account profile web page may be parsed to identify and extract one or more photos in the account profile. For example, social media account profiles often include a photo or other image associated with the social media account as a visual identifier of the social media account.

At block 2032, the extracted photo may be checked to generate a photo features 2034. The photo features 2034 may be a vector of numerical features or signals that represents the extracted photo. In some embodiments, the extracted photo may be checked to determine whether the photo is or includes a face of a person. For example, the extracted photo may be analyzed using a facial recognition algorithm to determine whether the photo is or includes a face of a person. If the photo is or includes a face of a person, the photo features 2024 may be set to indicate or represent that the photo is or includes a face of a person. Conversely, if the photo is not or does not include a face of a person, the photo features 2024 may be set to indicate or represent that the photo is not or does not include a face of a person.

At block 2040, a description associated with the social media account 2002 may be extracted from the obtained account profile. The description may be a text string or content included in the account profile web page, and may describe the social media account owner (e.g., the owner of social media account 2002). For example, the account profile web page may be parsed and/or searched for a text string or content that may indicate a description. In an example of a personal social media account, a description may describe the social media account owner (e.g., the person) as a "Ph.D. student in machine learning at Stanford." In an example of a social media account associated with a conference, a description may describe the social media account owner (e.g., the conference) as "A premiere international conference for researchers on machine learning. Jun. 19-24, 2016 in New York City."

At block 2042, the extracted description may be checked to generate a description features 2044. The description features 2044 may be a vector of numerical features or signals that represents the extracted description. In some embodiments, the extracted description may be checked against a description keyword database to determine whether the extracted description includes or contains one or more specific keywords in the description keyword database. The description keyword database may include specific keywords accumulated from existing description of various social media account types. If the extracted description includes or contains one or more specific keywords in the description keyword database, the description features 2044 may be set to indicate that the extracted description contains the one or more specific keywords. Conversely, if the extracted description does not include or contain any keyword in the description keyword database, the description features 2044 may be set to indicate that the extracted description does not contain any keyword.

At block 2050, a link URL associated with the social media account 2002 may be extracted from the obtained account profile. For example, the account profile web page may be parsed and/or analyzed to determine whether the account profile includes a link URL. If the account profile includes a link URL, the link URL may be extracted from the account profile web page.

At block 2052, the extracted link URL may be checked to generate a profile URL features 2054. The profile URL features 2054 may be a vector of numerical features or signals that represents the extracted link URL. In some embodiments, the extracted link URL may be accessed and the content pointed to by the link URL (e.g., the HTML page) fetched or downloaded. The downloaded content (e.g., the HTML page) may be analyzed to generate a keyword features vector. The keyword features vector may be included in or be a part of the profile URL features 2054. In some embodiments, the downloaded HTML page may be analyzed to identify one or more information blocks contained in the HTML page. For example, code used by a computer to display the downloaded HTML page may be analyzed to determine the location of fields that may include blocks (e.g., text blocks) of information. Keywords may be extracted from the identified information blocks. In an example of a social media account associated with a person (e.g., personal social media account), examples of keywords may include "Candidate", "Publications", "Teaching", "Student", and the like. In an example of a social media account associated with a corporation, examples of keywords may include "About Us", "Careers", "Join Us", and the like. In an example of a social media account associated with a conference, examples of keywords may include "Registration", "Call for Papers", "Editors", "Authors", "Reviewers", and the like. The extracted keywords may be checked against a keyword database for matches. The keyword database may include specific keywords accumulated from existing web pages of various social media account types. The keyword features vector may be set to indicate any matches between the extracted keywords and the specific keywords in the keyword database.

In some embodiments, the extracted link URL may be split into tokens, and the tokens may be analyzed to generate a URL features vector. The URL features vector may be included in or be a part of the profile URL features 2054. The tokens may be checked against a key URL token database for matches. The key URL token database may include specific URL tokens accumulated from existing link URLs of various social media account types. Examples of key URL tokens may include ".com", ".org", ".net", ".edu", ".gov", and the like. The URL features vector may be set to indicate any matches between the tokens and the specific URL tokens in the key URL token database.

At block 2060, recent social media contents associated with the social media account 2002 may be obtained. For example, the recent social media posts from the social media account 2002 may be obtained. In some embodiments, the number of social media posts obtained may be a specific number of the most recent social media posts. In some embodiments, the number of social media posts obtained may be the social media posts made during or over a specific time period or time point (e.g., postings within the preceding one week, postings within the preceding two weeks, postings within the preceding one month, etc.).

At block 2070, the text of the obtained recent social media contents may be extracted. At block 2072, the extracted social media text may be checked to generate a content text features 2074. Certain types of social media accounts may be more inclined to be self-promoting or promote their own contents. For example, a social media account associated with a conference may be more inclined to be self-promoting than a social media account associated with a person. As such, the extracted social media text may be checked, and the content text features 2074 may be a vector of numerical features or signals that represents the extent of self-promotion. In some embodiments, the extracted social media text may be checked to determine whether the social media account name is in or found in the social media text. If the social media account name is found in the social media text, a determination may be made as to the percentage of social media content items (e.g., percentage of social media posts) that contain the social media account name. The content text features 2074 may be set to indicate the percentage of social media content items that contain the social media account name. Additionally or alternatively, the extracted social media text may be checked to determine whether hashtags are in or found in the social media text. If hashtags are found in the social media text, the statistics of or associated with the hashtags may be determined, and the content text features 2074 may be set to indicate the hashtag statistics.

At block 2080, link URLs may be extracted from the obtained recent social media contents. At block 2082, the link URLs extracted from the social media contents may be checked to generate a content URL features 2084. As discussed above, certain types of social media accounts may be more inclined to be self-promoting or promote their own contents. As such, the link URLs extracted from the contents may be checked, and the content URL features 2084 may be a vector of numerical features or signals that represents the extent of self-promotion. In some embodiments, the link URLs extracted from the contents may be checked to determine whether the extracted link URLs are linking to the same domain of the social media account (e.g., the social media account 2002). For example, the link URLs extracted from the contents may be checked to determine whether any of the link URLs extracted from the contents is linking to the same domain of the link URL in the account profile (e.g., refer to block 2050 above). The content URL features 2084 may be set to indicate the percentage of the link URLs extracted from the contents that are linking to the same domain of the social media account.

At block 2090, the numerical features or signals that represents the social media account 2002 (e.g., the name features 2024, the photo features 2034, the description features 2044, the profile URL features 2054, the content text features 2074, and the content URL features 2084) may be input into a machine learning tool to determine a social media account type 2092 of the social media account 2002. The input numerical features or signals indicate whether a specific feature (e.g., aspect) is present or not present, for example, in a web page. The social media account types for each social media account of the social media accounts followed by the knowledgeable persons that are not already seed social media accounts (e.g., the first candidate set 1520 of FIG. 15) included in the extended seed social media accounts having domain-specific knowledge may be determined in accordance with the flow 2000.

Figure 21:
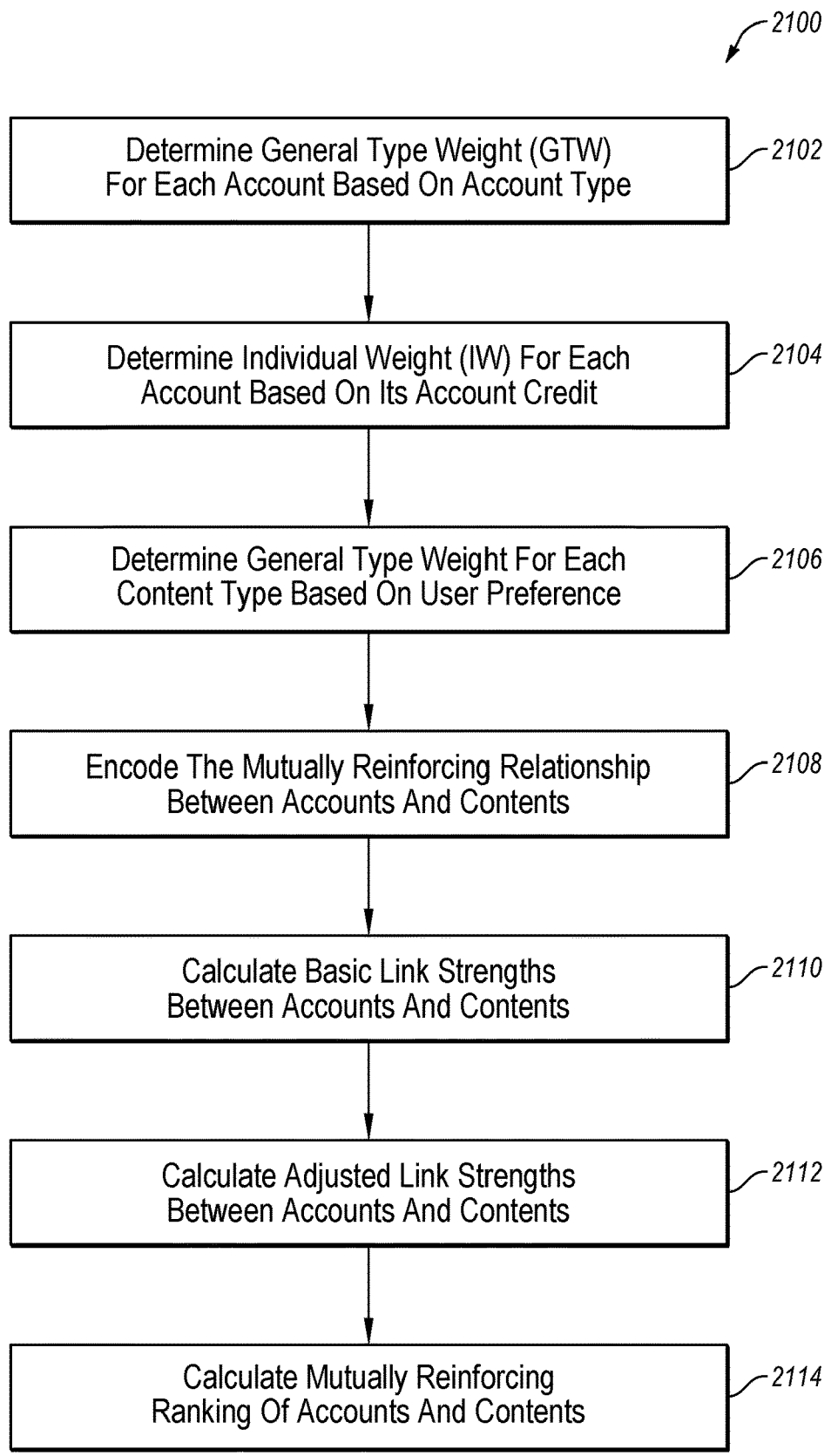
FIG. 21 illustrates a flowchart of an example method to calculate mutually reinforcing ranking of social media accounts and contents.

FIG. 21 illustrates a flowchart of an example method 2100 to calculate mutually reinforcing ranking of social media accounts and contents, in accordance with one or more embodiments of the present disclosure. In some embodiments, one or more of the operations associated with the method 2100 may be performed by the information collection system 110. Alternately or additionally, the method 2100 may be performed by any suitable system, apparatus, or device. For example, the processor 2310 of the system 2300 of FIG. 23 may perform one or more of the operations associated with the method 2100. Although illustrated with discrete blocks, the steps and operations associated with one or more of the blocks of the method 2100 may be divided into additional blocks, combined into fewer blocks, or eliminated, depending on the desired implementation.

The method 2100 may begin at block 2102 where a general type weight (gtw) may be determined for each social media account based on social media account type. A gtw may be determined for each social media account in the extended seed social media accounts having domain-specific knowledge. In some embodiments, a gtw may be arbitrarily assigned, for example, based on user preference, to each social media account. For example, one consideration or factor in assigning a gtw may be to assign a higher gtw to social media accounts that are less likely to promote their own content. That is, more credence may be given to social media accounts that are less likely to promote their own content. Based on this consideration, social media accounts that are less likely to promote their own content, such as social media accounts associated with a person, a conference, a journal, a news organization, a curation, a software tool, and the like, may be assigned a high gtw. Conversely, social media accounts that are more likely to promote their own content, such as social media accounts associated with a corporation, an academic institution, and the like, may be assigned a low gtw. The result may be that content promoted by social media accounts having a high or higher gtw are counted or valued more than content promoted by social media accounts having a low or lower gtw.

At block 2104, an individual weight (iw) may be determined for each social media account based on its account credit (e.g., a credit associated with each social media account). An iw may be determined for each social media account in the extended seed social media accounts having domain-specific knowledge. In some embodiments, an iw assigned to a social media account may be based on factors such as the number of re-posts, the number of likes, the number of bookmarks, the number of views, and the like.

These and other factors used in determining an iw may be determined based on ad-hoc heuristic rules or statistical machine learning. For example, a premise may be that some social media accounts are more popular, while other social media accounts are less popular. The more popular social media accounts may be assigned a high or higher iw, and less popular social media accounts may be assigned a low or lower iw. In some embodiments, each of the factors may be assigned a respective weight, and an iw assigned to a social media account may be a linear combination of the respective weights assigned to each of the factors.

At block 2106, a general type weight may be determined for each content type based on user preference. A general type weight may be arbitrarily assigned, for example, based on user preference, to each type of social media content. Types of social media contents may include articles, papers, slides (e.g., presentations), videos, pictures, audios, and the like. The general type weights assigned to the varying social media content types may indicate a preference (e.g., user preference) for the different types of content.

At block 2108, the mutually reinforcing relationship between social media accounts and contents may be encoded. The mutually reinforcing relationship may be encoded as links or promotional links between the social media accounts and the contents promoted by the social media accounts. For example, the contents may be the recent contents created, shared, and/or commented from the social media accounts as discussed above in reference to block 1920 of FIG. 19. In some embodiments, the mutually reinforcing relationship may be encoded by constructing a bipartite graph as illustrated in FIG. 22.

Figure 22:
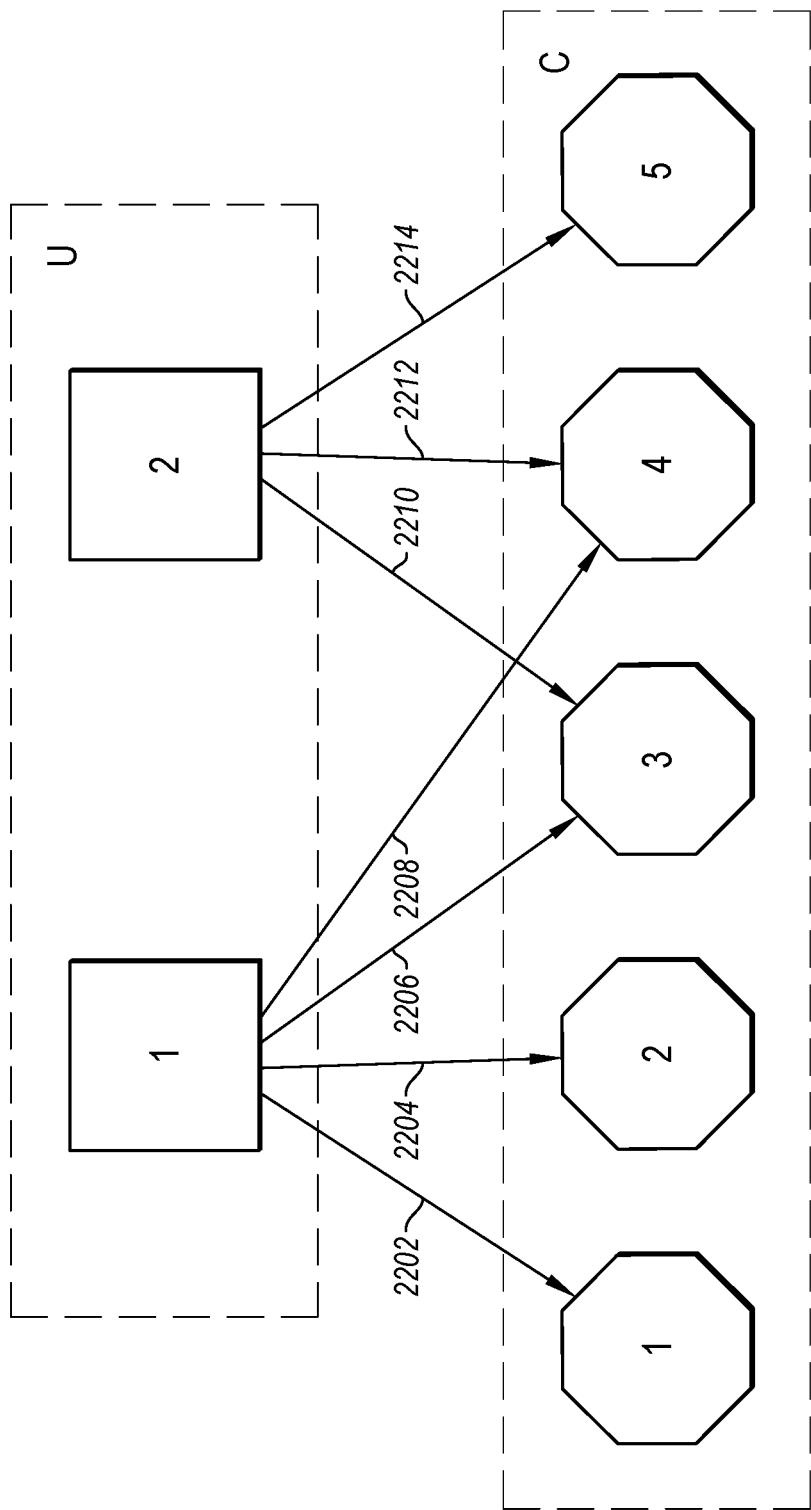
FIG. 22 is a diagram representing an example bipartite graph encoding mutually reinforcing relationships between accounts and contents.

FIG. 22 is a diagram representing an example bipartite graph encoding mutually reinforcing relationships between accounts and contents, in accordance with one or more embodiments of the present disclosure. More specifically, example mutually reinforcing relationships between social media accounts U and contents C is illustrated. For a social media account u, the set of all content items promoted (e.g., posted) by u may be defined as C_u, and for a content item c, the set of all social media accounts ever promoting (e.g., posting) c may be defined as U_c.

As illustrated, the bipartite graph includes two social media accounts, u1 and u2, and five content items, c1, c2, c3, c4, and c5. Social media account u1 may have promoted content items c1, c2, c3, and c4 as indicated by promotional links 2202, 2204, 2206, and 2208, respectively. Social media account u2 may have promoted content items c3, c4, and c5 as indicated by promotional links 2210, 2212, and 2214, respectively. Each promotional link may represent a promotion (e.g., a post) from the connected social media account. That is, each promotional link may represent a mutually reinforcing relationship between the connected social media account and the content item.

Although only two social media accounts and five content items are shown in FIG. 22 and used in the example for simplicity, and one skilled in the art will appreciate that there may be a different number of social media accounts and content items. For example, there may be hundreds, thousands, tens of thousands, or hundreds of thousands of social media accounts and/or content items.

Referring again to FIG. 21, at block 2110, basic link strengths between the social media accounts and contents may be calculated. Each promotional link may have or be associated with a respective promotion or voting strength, which may be an indication of the strength or weight of the promotion. That is, the promotional or voting strength may be an indication of the strength or weight of the mutually reinforcing relationship between the connected social media account and the content. For example, in some embodiments, a basic link strength may be determined based on a premise that good content in a specific domain is promoted by many good (e.g., knowledgeable) social media accounts in that domain, and good social media accounts in a specific domain promote good content in that domain. Accordingly, the basic link strength between a social media account and a content item promoted by the social media account may be calculated based on the gtw assigned to the social media account, the iw assigned to the social media account, and/or the general type weight assigned to the content type corresponding to the content item.

In some embodiments, a basic link strength may account for a timeliness factor, such as the timeliness or freshness of the promotion. For example, suppose a social media account u promotes a content item c, a promotional link may be defined as (u, c), and a basic link strength may be defined as $s(u, c)=t(u, c)*a(u)$, where $t(u, c)$ is a promotion timeliness, and $a(u)$ is an account score of u. The account score $a(u)$ of u may be dependent on the general type weight assigned to u, $gtw(u)$, and the induvial weight assigned to u, $iw(u)$. For example, the account score $a(u)$ may be defined as $gtw(u)*iw(u)$. The timeliness of a promotion $t(u, c)$ may be defined using a monotonically decreasing function to give higher weight to earlier promotions. For example, the timeliness of a promotion may be defined as $t(u, c)=\exp(-\beta*k(u, c))$, where $\beta$ is a scaling constant, and $k(u, c)$ is a timestamp function denoting that (u, c) is the k-th promotion of c. Accordingly, a promotion (e.g., post) that is earlier in time may be given or assigned a higher basic link strength that a promotion that is later in time. In some embodiments, a promotion that is more recent in time may be given or assigned a higher basic link strength than a promotion that is older in time. In some embodiments, a promotion of newer or more recent content may be given or assigned a higher basic link strength than a promotion of older content.

At block 2112, adjusted link strengths between the social media accounts and contents may be calculated. In some embodiments, a basic link strength may be adjusted based on a preference (e.g., user preference) of the content type associated with the promoted content. For example, a preference factor f_p may be assigned to each of the different types of content, and an adjusted link strength may be defined as $s(u, c)\_new=s(u, c)*f\_p$. Additionally or alternatively, a basic link strength may be adjusted based on a link or promotion type (e.g., the type of link or the type of promotion). For example, a basic link strength calculated for an initial or original promotion (e.g., a promotion that newly creates or promotes a content item) may be adjusted such that the resulting adjusted link strength is higher than an adjusted link strength of a promotion that re-promotes or likes the initial or original promotion. Likewise, a basic link strength calculated for a promotion that promotes or likes an initial or original promotion may be adjusted such that the resulting adjusted link strength is lower than an adjusted link strength of the initial or original promotion. In some embodiments, some or a part of the link strength from a promotion that promotes or likes an initial or original promotion (e.g., a retweet in the case of twitter) may be given or transferred to the initial or original promotion. For example, suppose social media account u re-promotes or likes content item c originally created or promoted by another social media account u'. An adjusted link strength for u may be defined as $s(u, c)\_new=(1-f\_t)*s(u, c)$, and an adjusted link strength for u' may be defined as $s(u', c)\_new=s(u', c)+(f\_t*s(u, c))$, where f_t is a transfer factor. In this instance, s(u, c) may transfer a portion of its link strength to s(u', c) by a transfer factor f_t. In some embodiments, the transfer factor f_t may be ad-hoc assigned. For example, f_t may be assigned 0.1 to indicate a 10% transfer or discount factor for a re-promotion, f_t may be assigned 0.2 to indicate a 10% transfer or discount factor for a re-promotion, etc. Similarly, f_t may be assigned 0.1 to indicate a 10% transfer or credit factor for an initial or original promotion, f_t may be assigned 0.2 to indicate a 10% transfer or credit factor for an initial or original promotion, etc.

At block 2114, a mutually reinforcing ranking of the social media accounts and contents may be calculated. The mutually reinforcing ranking of the social media accounts and contents may be calculated based on the basic link strengths between the social media accounts and contents (e.g., as calculated at block 2110) and/or the adjusted link strengths between the social media accounts and contents (e.g., as calculated at block 2112). For example, a mutually reinforcing learning ranking technique may be used to calculate the mutually reinforcing ranking of the social media accounts and contents.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 23 illustrates an example system 2300, according to at least one embodiment described herein. The system 2300 may include any suitable system, apparatus, or device configured to identify and extract information. The system 2300 may include a processor 2310, a memory 2320, a data storage 2330, and a communication device 2340, which all may be communicatively coupled. The data storage 2330 may include various types of data, such as author objects and social media account objects.

Generally, the processor 2310 may include any suitable special-purpose or general-purpose computer, computing entity, or processing device including various computer hardware or software modules and may be configured to execute instructions stored on any applicable computer-readable storage media. For example, the processor 2310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 23, it is understood that the processor 2310 may include any number of processors distributed across any number of network or physical locations that are configured to perform individually or collectively any number of operations described herein. In some embodiments, the processor 2310 may interpret and/or execute program instructions and/or process data stored in the memory 2320, the data storage 2330, or the memory 2320 and the data storage 2330. In some embodiments, the processor 2310 may fetch program instructions from the data storage 2330 and load the program instructions into the memory 2320.

After the program instructions are loaded into the memory 2320, the processor 2310 may execute the program instructions, such as instructions to perform the flows 200, 600, 1900, and/or 2000 and/or the methods 300, 400, 500, 700, 800, 900, 1000, 1100, 1200, 1300, 1400, 1600, 1700, 1800, and/or 2100 of FIGS. 2, 6, 19, 20, 3, 4, 5, 7, 8 9, 10, 11, 12, 13, 14, 16, 17, 18 and 21, respectively. For example, the processor 2310 may create the author objects and the social media account objects using information from publication systems and social media systems, respectively. The processor 2310 may compare the information from the author objects and the social media account objects to identify social media accounts associated with authors from the author objects.

The memory 2320 and the data storage 2330 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 2310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2310 to perform a certain operation or group of operations.

The communication unit 2340 may include any component, device, system, or combination thereof that is configured to transmit or receive information over a network. In some embodiments, the communication unit 2340 may communicate with other devices at other locations, the same location, or even other components within the same system. For example, the communication unit 2340 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, and/or others), and/or the like. The communication unit 2340 may permit data to be exchanged with a network and/or any other devices or systems described in the present disclosure. For example, the communication unit 2340 may allow the system 2300 to communicate with other systems, such as the publication systems 120, the social media systems 130, the device 140, and the web hosting systems 150 of FIG. 1.

Modifications, additions, or omissions may be made to the system 2300 without departing from the scope of the present disclosure. For example, the data storage 2330 may be multiple different storage mediums located in multiple locations and accessed by the processor 2310 through a network.

As indicated above, the embodiments described herein may include the use of a special purpose or general purpose computer (e.g., the processor 2310 of FIG. 23) including various computer hardware or software modules, as discussed in greater detail below. Further, as indicated above, embodiments described herein may be implemented using computer-readable media (e.g., the memory 2320 or data storage 2330 of FIG. 23) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," and/or others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, and/or others Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer implemented method to rank social media accounts and contents based on a mutually reinforcing relationship between the social media accounts and contents, the method comprising:

identifying a plurality of social media accounts of entities associated with a particular domain of knowledge;

determining a general type weight for each social media account of the plurality of social media accounts, the general type weight being based on a social media account type corresponding to the social media account and being based on a relationship between the social media account type and a likelihood of self-promotion by the social media account type;

determining an individual weight for each of the respective social media accounts of the plurality of social media accounts, wherein the individual weight is based on popularity indications of the respective social media account;

encoding a mutually reinforcing relationship between each of the social media accounts of the plurality of social media accounts and contents promoted by each of the social media accounts of the plurality of social media accounts, the mutually reinforcing relationship being encoded as a promotional link between each of the social media accounts and a content item of the contents promoted by each of the social media accounts of the plurality of social media accounts;

calculating basic link strengths, wherein a basic link strength is calculated for each promotional link, the basic link strength being based on the general type weight for each social media account associated with the promotional link and the individual weight for each of the social media accounts of the plurality of social media accounts;

calculating adjusted link strengths, wherein a respective adjusted link strength for each promotional link is an adjustment of the basic link strength calculated for the promotional link and wherein the respective adjusted link strength is based on at least one of: a preference factor; a type of promotion, and a transfer factor; and calculating, with respect to quality of content related to the particular domain of knowledge, a mutually reinforcing ranking of the plurality of social media accounts and contents based on the adjusted link strengths.

2. The method of claim 1, whereon the basic link strength is further based on a promotion timeliness.

3. The method of claim 2, wherein the promotion timeliness includes a monotonically decreasing function.

4. A non-transitory computer-readable medium containing instructions that, in response to being executed by one or more processors, are configured to perform and/or control performance of operations, the operations comprising:

identifying a plurality of social media accounts of entities associated with a particular domain of knowledge;

determining a general type weight for each social media account of the plurality of social media accounts, the general type weight being based on a social media account type corresponding to the social media account and being based on a relationship between the social media account type and a likelihood of self-promotion by the social media account type;

determining an individual weight for each of the respective social media accounts of the plurality of social media accounts, wherein the individual weight is based on popularity indications of the respective social media account;

encoding a mutually reinforcing relationship between each of the social media accounts of the plurality of social media accounts and contents promoted by each of the social media accounts of the plurality of social media accounts, the mutually reinforcing relationship being encoded as a promotional link between each of the social media accounts and a content item of the contents promoted by each of the social media accounts of the plurality of social media accounts;

calculating basic link strengths, wherein a basic link strength is calculated for each promotional link, the basic link strength being based on the general type weight for each social media account associated with the promotional link and the individual weight for each of the social media accounts of the plurality of social media accounts;

calculating adjusted link strengths, wherein a respective adjusted link strength for each promotional link is an adjustment of the basic link strength calculated for the promotional link and wherein the respective adjusted link strength is based on at least one of: a preference factor; a type of promotion, and a transfer factor; and calculating, with respect to quality of content related to the particular domain of knowledge, a mutually reinforcing ranking of the plurality of social media accounts and contents based on the adjusted link strengths.

5. The computer-readable medium of claim 4, wherein the basic link strength is further based on a promotion timeliness.

6. The computer-readable medium of claim 5, wherein the promotion timeliness includes a monotonically decreasing function.

7. A system comprising:
one or more social media servers; and
a computing device including:
one or more processors, and
a non-transitory computer-readable medium containing instructions that, in response to being executed by the one or more processors, are configured to perform and/or control performance of operations, the operations comprising:

identifying a plurality of social media accounts of entities associated with a particular domain of knowledge;

determining a general type weight for each social media account of the plurality of social media accounts, the general type weight being based on a social media account type corresponding to the social media account and being based on a relationship between the social media account type and a likelihood of self-promotion by the social media account type;

determining an individual weight for each of the respective social media accounts of the plurality of social media accounts, wherein the individual weight is based on popularity indications of the respective social media account;

encoding a mutually reinforcing relationship between each of the social media accounts of the plurality of social media accounts and contents promoted by each of the social media accounts of the plurality of social media accounts, the mutually reinforcing relationship being encoded as a promotional link between each of the social media accounts and a content item of the contents promoted by each of the social media accounts of the plurality of social media accounts;

calculating adjusted link strengths, wherein a respective adjusted link strength for each promotional link is an adjustment of a basic link strength calculated for the promotional link and wherein the respective adjusted link strength is based on at least one of: a preference factor; a type of promotion, and a transfer factor; and calculating, with respect to quality of content related to the particular domain of knowledge, a mutually reinforcing ranking of the plurality of social media accounts and contents based on the adjusted link strengths.

8. The system of claim 7, wherein the basic link strength is further based on a promotion timeliness, wherein the promotion timeliness includes a monotonically decreasing function.

* * * * *